US012594758B2

(12) United States Patent
Takamuku

(10) Patent No.: US 12,594,758 B2
(45) Date of Patent: Apr. 7, 2026

(54) LIQUID DISCHARGING APPARATUS

(71) Applicant: SEIKO EPSON CORPORATION, Tokyo (JP)

(72) Inventor: Makoto Takamuku, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 18/403,780

(22) Filed: Jan. 4, 2024

(65) Prior Publication Data

US 2024/0253345 A1 Aug. 1, 2024

(30) Foreign Application Priority Data

Jan. 6, 2023 (JP) ................................ 2023-000916

(51) Int. Cl.
*B41J 2/045* (2006.01)

(52) U.S. Cl.
CPC ....... *B41J 2/04541* (2013.01); *B41J 2/04581* (2013.01); *B41J 2/04588* (2013.01)

(58) Field of Classification Search
CPC ................ B41J 2/04541; B41J 2/04581; B41J 2/04588; B41J 2/0451; B41J 2/04596; B41J 2/04548
See application file for complete search history.

(56) References Cited

U.S. PATENT DOCUMENTS

2017/0057217 A1* 3/2017 Hayashi ............... B41J 2/04588
2020/0238689 A1* 7/2020 Yajima ................ B41J 2/04593

FOREIGN PATENT DOCUMENTS

JP 2020-049798 A 4/2020

* cited by examiner

*Primary Examiner* — Stephen D Meier
*Assistant Examiner* — Thomas Ray Knief
(74) *Attorney, Agent, or Firm* — Spencer Fane LLP

(57) ABSTRACT

A liquid discharging apparatus includes: a first drive circuit outputting a first drive signal based on the second base drive signal; and a first discharging head including a first discharging portion and a first switching circuit, in which when the state information signal does not include information indicating an abnormality in a state, the second control circuit outputs the second discharge control signal based on the first discharge control signal, and when the state information signal includes the information indicating an abnormality in the state, the second control circuit outputs the second discharge control signal for controlling the first switching circuit not to supply the first drive signal to the first discharging portion.

9 Claims, 26 Drawing Sheets

| [LTa, LTb] ( [SIH, SIL] ) | S | | |
|---|---|---|---|
| | t1(Q0) | t2(Q1) | t3(Q2) |
| [1, 1] | SP00 | SP10 | SP20 |
| [1, 0] | SP01 | SP11 | SP21 |
| [0, 1] | SP02 | SP12 | SP22 |
| [0, 0] | SP03 | SP13 | SP23 |

FIG. 18

| [LTa, LTb] ( [SIH, SIL] ) | S | | |
|---|---|---|---|
| | t1(Q0) | t2(Q1) | t3(Q2) |
| [1, 1] | 1 | 1 | 0 |
| [1, 0] | 1 | 0 | 0 |
| [0, 1] | 0 | 1 | 0 |
| [0, 0] | 0 | 0 | 1 |

FIG. 21

| [LTa, LTb] ([SIH, SIL]) | S | | |
|---|---|---|---|
| | t1(Q0) | t2(Q1) | t3(Q2) |
| [1, 1] | 1 | 1 | 1 |
| [1, 0] | 1 | 1 | 1 |
| [0, 1] | 1 | 1 | 1 |
| [0, 0] | 1 | 1 | 1 |

FIG. 23

| [LTa, LTb] ( [SIH, SIL] ) | S | | |
|---|---|---|---|
| | t1(Q0) | t2(Q1) | t3(Q2) |
| [1, 1] | 0 | 0 | 0 |
| [1, 0] | 0 | 0 | 0 |
| [0, 1] | 0 | 0 | 0 |
| [0, 0] | 0 | 0 | 0 |

LIQUID DISCHARGING APPARATUS

The present application is based on, and claims priority from JP Application Serial Number 2023-000916, filed Jan. 6, 2023, the disclosure of which is hereby incorporated by reference herein in its entirety.

BACKGROUND

1. Technical Field

The present disclosure relates to a liquid discharging apparatus.

2. Related Art

As a liquid discharging apparatus that discharges liquid, an ink jet printer or the like, which forms an image or a document on a medium by discharging ink as the liquid, is known. For example, JP-A-2020-049798 discloses a printer including a main substrate, a head drive substrate, and a plurality of ink heads, in which ink is discharged from the ink head by a drive signal generation portion, which is provided on the head drive substrate, generating a drive signal for driving an actuator included in the ink head, and by the drive signal being supplied to the actuator under an instruction of a head control portion provided on the main substrate.

In recent years, from a viewpoint of improving the discharge accuracy and improving the discharging speed of liquid, the number of nozzles in which the liquid discharging apparatus discharges liquid has increased. However, in a liquid discharging apparatus described in JP-A-2020-049798, when the number of nozzles included in the liquid discharging apparatus is increased, processing where the head control portion is responsible for is increased, and as a result, problems such as a delay in an operation of the liquid discharging apparatus and an inability to complete the corresponding processing within predetermined time may occur.

SUMMARY

According to an aspect of the present disclosure, there is provided a liquid discharging apparatus that discharges liquid on a medium including: a first control circuit outputting a first discharge control signal, a first base drive signal, and a transport control signal for controlling transport of the medium; a second control circuit receiving the first discharge control signal, the first base drive signal, and a state information signal indicating a state of the liquid discharging apparatus, and outputting a second discharge control signal and a second base drive signal; a first drive circuit outputting a first drive signal based on the second base drive signal; a first substrate provided with the first control circuit; a second substrate provided with the second control circuit and the first drive circuit; and a first discharging head including a first discharging portion that discharges liquid in response to the first drive signal and a first switching circuit that switches whether or not to supply the first drive signal to the first discharging portion based on the second discharge control signal, in which when the state information signal does not include information indicating an abnormality in the state, the second control circuit outputs the second discharge control signal based on the first discharge control signal, and when the state information signal includes the information indicating an abnormality in the state, the second control circuit outputs the second discharge control signal for controlling the first switching circuit not to supply the first drive signal to the first discharging portion.

BRIEF DESCRIPTION OF THE DRAWINGS

FIG. 18 is a diagram illustrating a specific example of the decoding content of the decoder when the head control signal DIo including a waveform selection signal SP illustrated in FIG. 17 is input to the drive signal selection circuit.

FIG. 21 is a diagram illustrating a specific example of the decoding content of the decoder when the head control signal DIo including the waveform selection signal SP illustrated in FIG. 20 is input to the drive signal selection circuit.

FIG. 23 is a diagram illustrating a specific example of the decoding content of the decoder when the head control signal DIo including the waveform selection signal SP illustrated in FIG. 22 is input to the drive signal selection circuit.

DESCRIPTION OF EMBODIMENTS

Hereinafter, preferred embodiments of the present disclosure will be described with reference to the drawings. The drawings used are for convenience of explanation. Note that the embodiments described below do not unduly limit the contents of the present disclosure described in the aspects. Further, not all of the components described below are necessarily essential component requirements of the present disclosure.

1. First Embodiment

1.1 Overview of Liquid Discharging Apparatus

Figure 1:
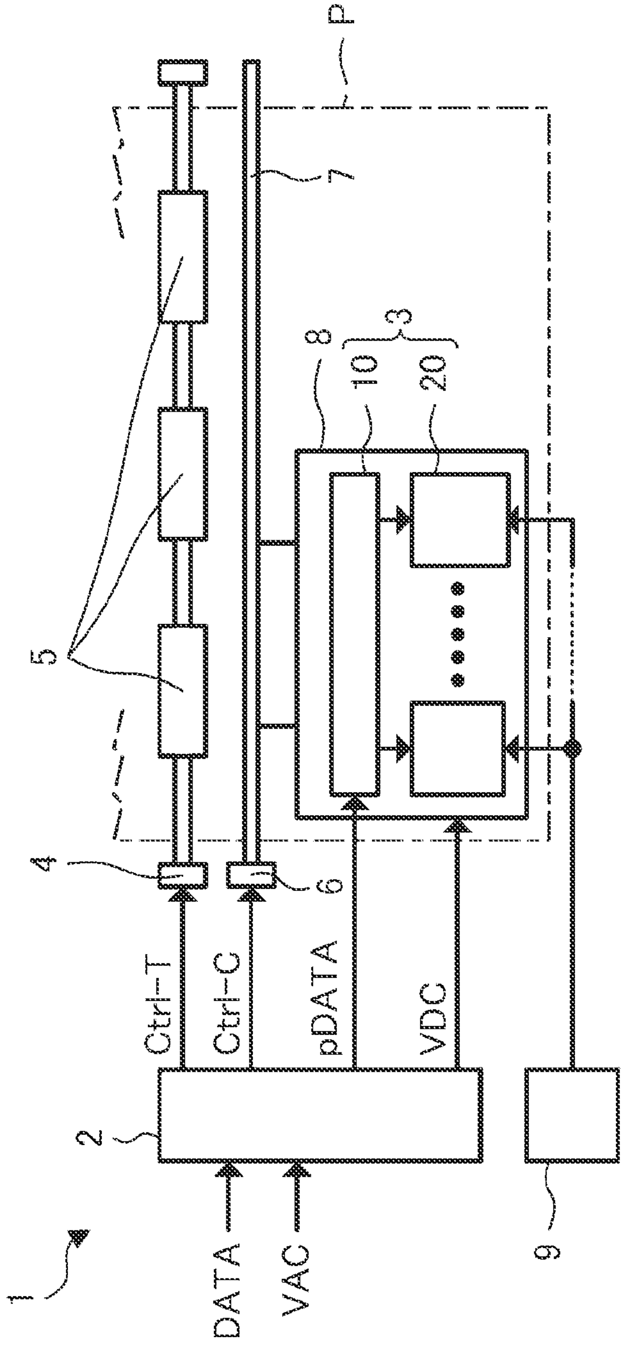
FIG. 1 is a diagram illustrating a schematic configuration of a liquid discharging apparatus.

FIG. 1 is a diagram illustrating a schematic configuration of a liquid discharging apparatus 1. The liquid discharging apparatus 1 of a first embodiment is a so-called ink jet printer that forms a desired image on a front side of a medium P by discharging ink, which is an example of liquid, to the transported medium P at a desired timing. Here, in the following description, a direction in which the medium P is transported may be referred to as a transporting direction.

As illustrated in FIG. 1, the liquid discharging apparatus 1 includes a control unit 2, a head unit 3, a transporting motor 4, a transporting roller 5, a carriage motor 6, a carriage guide shaft 7, a carriage 8, and a liquid container 9.

The control unit 2 generates a control signal for controlling each element of the liquid discharging apparatus 1 based on image data DATA supplied from an external apparatus such as a host computer (not illustrated) provided outside the liquid discharging apparatus 1 and outputs the control signal to the corresponding configuration. Further, the control unit 2 generates a voltage signal VDC used for a power supply voltage of each portion of the liquid discharging apparatus 1 from a commercial voltage VAC of an AC voltage supplied to the liquid discharging apparatus 1 and supplies the voltage signal VDC to each portion of the liquid discharging apparatus 1.

Specifically, the control unit 2 generates a transport control signal Ctrl-T as a control signal for controlling each element of the liquid discharging apparatus 1 and outputs the transport control signal Ctrl-T to the transporting motor 4. The transporting motor 4 is driven based on the input transport control signal Ctrl-T. The transporting roller 5 is rotationally driven by the drive of the transporting motor 4. The medium P is transported along the transporting direction by a driving force generated by the rotational drive of the transporting roller 5. That is, the transporting motor 4 and the transporting roller 5 transport the medium P in response to the transport control signal Ctrl-T output by the control unit 2.

Further, the control unit 2 generates a carriage control signal Ctrl-C as a control signal for controlling each element of the liquid discharging apparatus 1 and outputs the carriage control signal Ctrl-C to the carriage motor 6. The carriage motor 6 is driven based on the input carriage control signal Ctrl-C. The driving force generated by driving the carriage motor 6 is transmitted to the carriage 8 supported by the carriage guide shaft 7 via a timing belt (not illustrated). The carriage guide shaft 7 extends along the direction intersecting the transporting direction and supports the carriage 8. Then, the carriage 8 supported by the carriage guide shaft 7 by the driving force generated by the drive of the carriage motor 6 moves along the carriage guide shaft 7. That is, the carriage motor 6 and the carriage guide shaft 7 move the carriage 8 along the carriage guide shaft 7 in response to the carriage control signal Ctrl-C output by the control unit 2.

Further, the control unit 2 generates a print data signal pDATA as a control signal for controlling each element of the liquid discharging apparatus 1 and outputs the print data signal pDATA to the head unit 3. The head unit 3 includes a discharge control module 10 and a plurality of liquid discharging modules 20. The print data signal pDATA output by the control unit 2 is input to the discharge control module 10. The discharge control module 10 generates a control signal for controlling the operation of each of the plurality of liquid discharging modules 20 based on the input print data signal pDATA and outputs the control signal to the corresponding liquid discharging module 20. The liquid discharging module 20 discharges the liquid on the medium P by being driven based on the input control signal.

The ink discharged from the liquid discharging module 20 is stored in the liquid container 9. The ink stored in the liquid container 9 is supplied to the liquid discharging module 20 via a tube (not illustrated) or the like. As the liquid container 9, an ink cartridge, a bag-shaped ink pack made of a flexible film, an ink tank capable of replenishing ink, and the like can be used.

As described above, in the liquid discharging apparatus 1, the control unit 2 controls the transport of the medium P, the movement of the carriage 8, and the discharge timing of the ink from the liquid discharging module 20 mounted on the carriage 8. As a result, the ink can land on the medium P at a desired position, and as a result, a desired image is formed on the medium P. That is, the liquid discharging apparatus 1 of the first embodiment forms a desired image on the medium P by discharging ink, which is an example of liquid, on the medium P.

1.2 Structure of Head Unit

Figure 2:
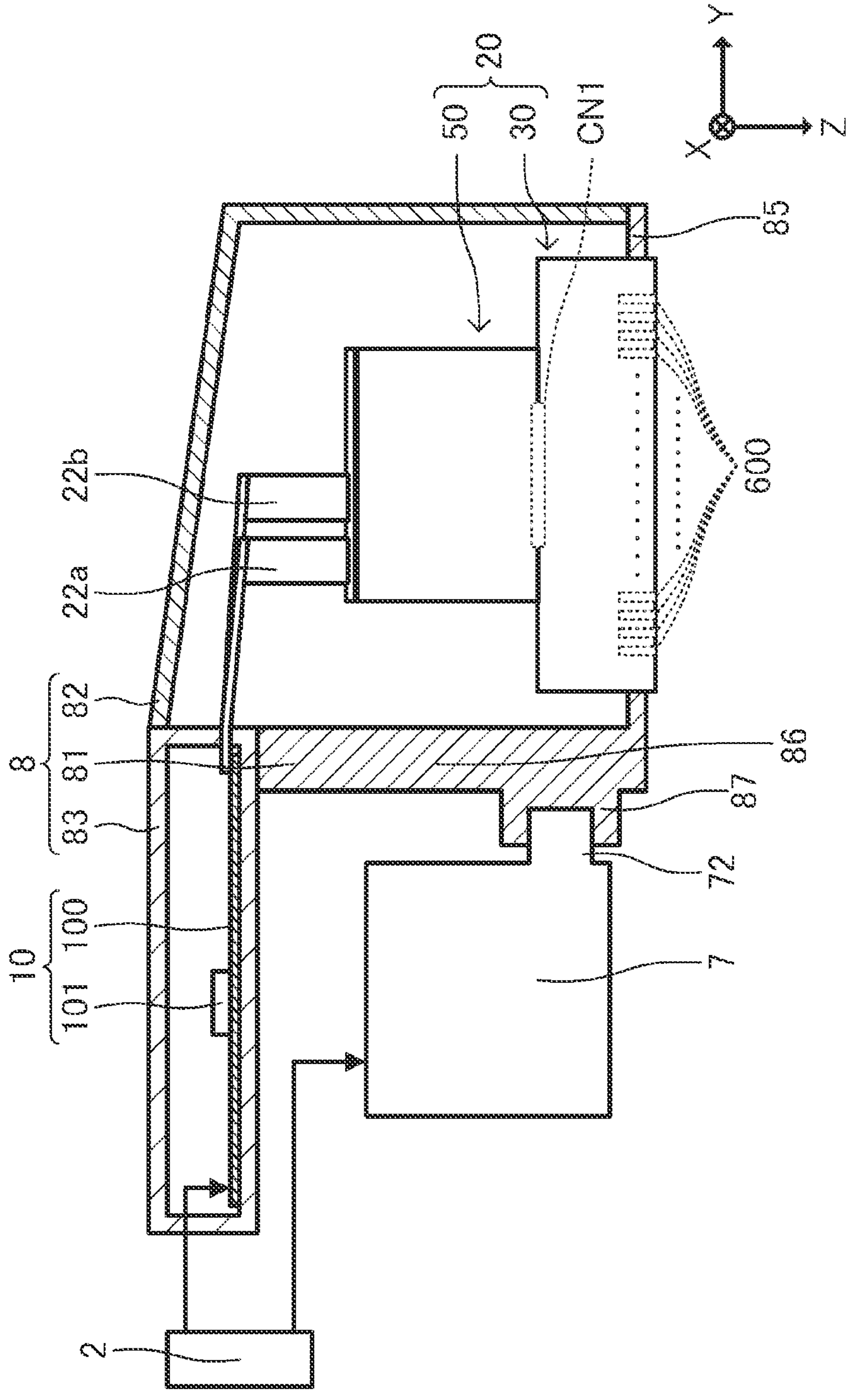
FIG. 2 is a side view illustrating a structure of a carriage in which a head unit is mounted.
Figure 3:
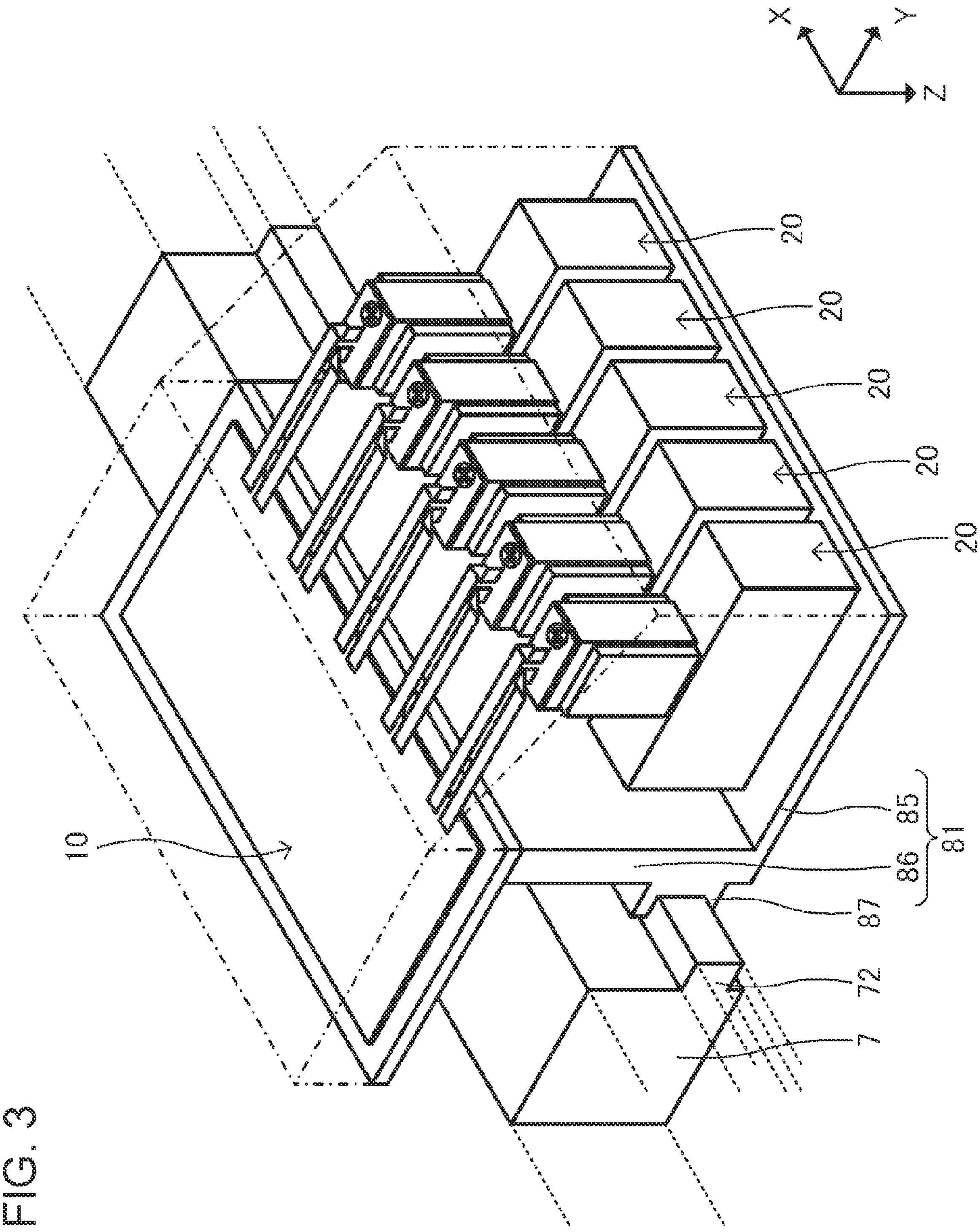
FIG. 3 is a perspective view illustrating a peripheral structure of the carriage in which the head unit is mounted.

Next, the structure of the head unit 3 in the liquid discharging apparatus 1 will be described. FIG. 2 is a side view illustrating a structure of the carriage 8 in which the head unit 3 is mounted. FIG. 3 is a perspective view illustrating a peripheral structure of the carriage 8 in which the head unit 3 is mounted. Here, in the following description, a description will be made by illustrating the X axis, the Y axis, and the Z axis that are orthogonal to each other. Further, in the following description, the starting point side of the arrow along the X axis in the drawing may be referred to as the −X side, and the front end side thereof may be referred to as the +X side. The starting point side of the arrow along the Y axis in the drawing may be referred to as the −Y side, and the front end side thereof may be referred to as the +Y side. The starting point side of the arrow along the Z axis in the drawing may be referred to as the −Z side, and the front end side thereof may be referred to as the +Z side. Further, in the following description, a plane composed of the X axis and the Y axis may be referred to as an XY plane, a plane composed of the X axis and the Z axis may be referred to as an XZ plane, and a plane composed of the Y axis and the Z axis may be referred to as a YZ plane.

As illustrated in FIGS. 2 and 3, the carriage 8 includes a carriage main body 81, a carriage cover 82, and an accommodation case 83. The carriage main body 81 includes a placement portion 85 and a fixing portion 86. The placement portion 85 is a plate-shaped member extending along the XY plane, and the fixing portion 86 is a plate-shaped member that extends along the XZ plane from the end portion of the placement portion 85 on the −Y side toward the −Z side. That is, the carriage main body 81 has an L-shaped cross section when viewed along the X axis. The carriage cover 82 is positioned on the −Z side of the carriage main body 81 and is detachably attached to the carriage main body 81. In this case, the carriage main body 81 and the carriage cover 82 form a closed space. The accommodation case 83 has a substantially rectangular parallelepiped shape including an accommodation space that can accommodate various configurations inside, and on the −Y side of the carriage main body 81, the end portion of the accommodation case 83 on the +Y side is fixed to the end portion of the fixing portion 86 on the −Z side.

Further, a carriage support portion 87 is formed on a surface on the −Y side of the fixing portion 86 included in the carriage main body 81. A guide rail 72 formed on the +Y side of the carriage guide shaft 7 is fitted to the carriage support portion 87, and accordingly, the carriage support portion 87 is movably supported by the carriage guide shaft 7. As a result, the carriage 8 can move along the carriage guide shaft 7.

The discharge control module 10 is accommodated in the internal space of the carriage 8 configured as described above, which is the accommodation space formed inside the accommodation case 83. The discharge control module 10 includes a discharge control circuit substrate 100 and an integrated circuit 101 mounted on the discharge control circuit substrate 100. Further, the plurality of liquid discharging modules 20 and a plurality of FFC cables 22*a* and 22*b* corresponding to the plurality of liquid discharging modules 20 are accommodated in the closed space that is the internal space of the carriage 8 and formed by the carriage main body 81 and the carriage cover 82. Here, a description will be made on the assumption that the liquid discharging apparatus 1 of the first embodiment includes five liquid discharging modules 20. That is, five liquid discharging modules 20, and five FFC cables 22*a* and 22*b* are accommodated in the internal space of the carriage 8 of the first embodiment. The number of liquid discharging modules 20 included in the liquid discharging apparatus 1 is not limited to five.

The five FFC cables 22*a* and 22*b* are provided corresponding to the five liquid discharging modules 20. One end of each of the five FFC cables 22*a* and 22*b* is electrically coupled to the discharge control circuit substrate 100 of the discharge control module 10. Further, the other end of each of the five FFC cables 22*a* and 22*b* is electrically coupled to the corresponding liquid discharging module 20. That is, the other ends of the FFC cable 22*a* and 22*b* are electrically coupled to each of the five liquid discharging modules 20. As such FFC cables 22*a* and 22*b*, for example, a flexible flat cable (FFC) can be used.

As illustrated in FIGS. 2 and 3, each of the five liquid discharging modules 20 includes a drive circuit module 50 and a print head 30. The five liquid discharging modules 20 are mounted on the placement portion 85 at equal intervals along the X axis in the closed space formed by the carriage main body 81 and the carriage cover 82.

The other end of each of the FFC cables 22*a* and 22*b* is electrically coupled to the drive circuit module 50 on the −Z side of the drive circuit module 50 included in the corresponding liquid discharging module 20. Further, the print head 30 is positioned on the +Z side of the drive circuit module 50. The print heads 30 are mounted on the placement portion 85 at equal intervals along the X axis. In this case, the plurality of discharging portions 600 included in the print head 30 are exposed from the −Z side surface of the placement portion 85. As a result, the ink, which is discharged from the plurality of discharging portions 600 included in the print head 30, is discharged on the medium P.

Further, in the liquid discharging module 20, the print head 30 and the drive circuit module 50 are electrically coupled with a connector CN1. As the connector CN1, it is preferable to use a board-to-board (B-to-B) connector. The B-to-B connector can electrically couple a configuration in which one of the two connectors is provided and a configuration in which the other of the two connectors is provided to each other by directly fitting the two connectors without using a cable. Therefore, without adding a new configuration, a configuration in which one of the two connectors is provided and a configuration in which the other of the two connectors is provided can be electrically coupled to each other, and the relative disposition relationship between the configurations can be determined.

Specifically, when the B-to-B connector is used as the connector CN1 that electrically couples the print head 30 and the drive circuit module 50, the relative disposition relationship between the print head 30 and the drive circuit module 50 is fixed. Therefore, the carriage 8 may secure a region for fixing at least one of the print head 30 and the drive circuit module 50. That is, the mounting area of the print head 30 and the drive circuit module 50 on the carriage 8 can be reduced. As a result, the print head 30 and the drive circuit module 50 can be disposed at a high density, and the size of the carriage 8 can be reduced. Further, by electrically coupling the print head 30 and the drive circuit module 50 using the B-to-B connector as the connector CN1, the influence of the impedance that can occur in the cable is eliminated, and as a result, the accuracy of signals propagated between the print head 30 and the drive circuit module 50 is improved. Therefore, the discharge accuracy of the ink discharged from the print head 30 is improved.

Here, the cables that electrically couple the discharge control module 10 and the liquid discharging module 20 are not limited to two cables of the FFC cables 22*a* and 22*b*, and the discharge control module 10 and the liquid discharging module 20 may be electrically coupled with one, or three or more cables. Therefore, when it is not necessary to distinguish the FFC cables 22*a* and 22*b* in the following description, the FFC cables 22*a* and 22*b* may be collectively referred to as an FFC cable 22. That is, the discharge control module 10 and the liquid discharging module 20 may be described as being electrically coupled with the FFC cable 22. Further, the FFC cable 22 may electrically couple the discharge control module 10 and the liquid discharging module 20 to each other. Therefore, in place of or in addition to the FFC cable 22, a thin-line coaxial cable group including a plurality of thin-line coaxial cables may be used.

Figure 4:
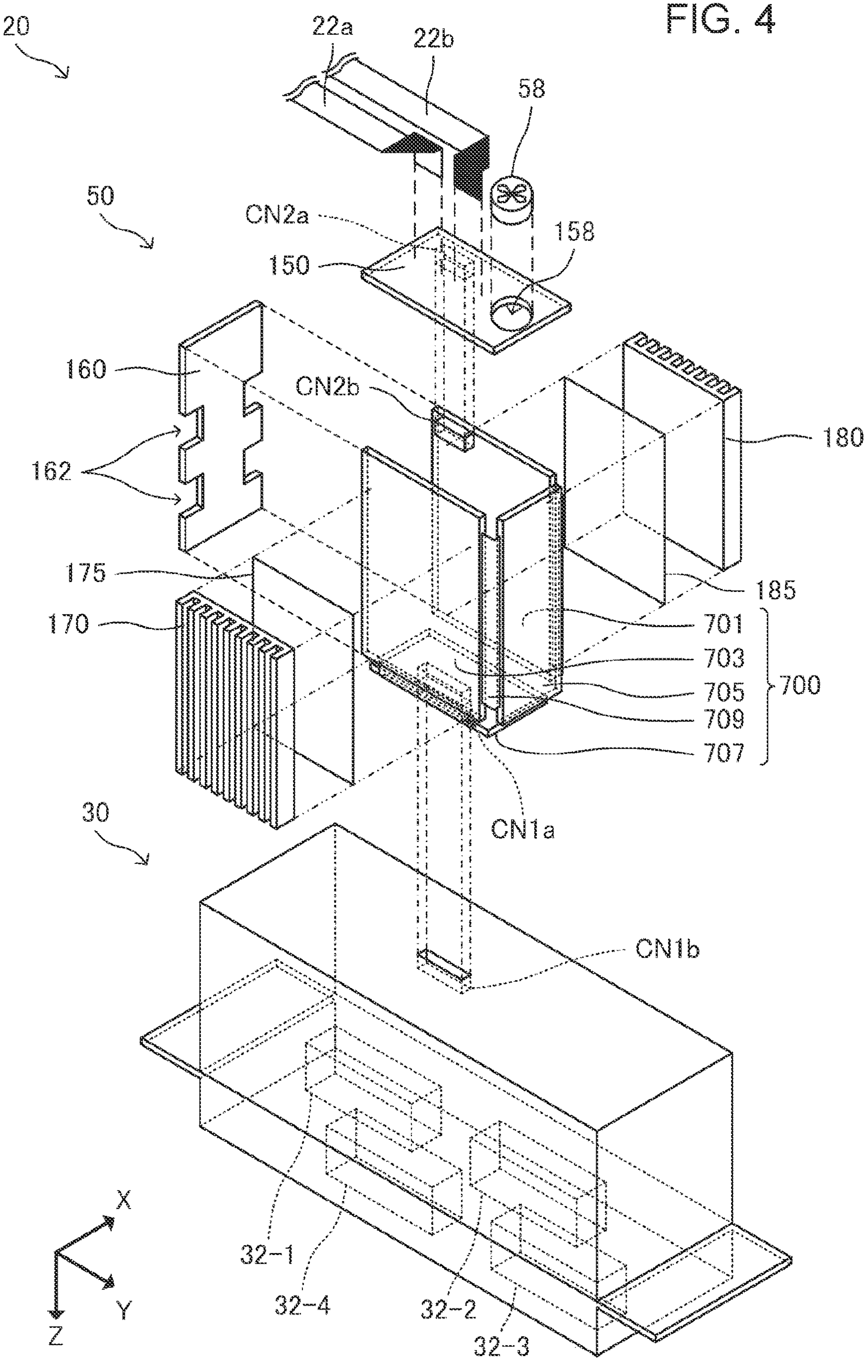
FIG. 4 is an exploded perspective view illustrating an example of a structure of a liquid discharging module.

Here, a specific example of the structure of the liquid discharging module 20 included in the head unit 3 will be described. FIG. 4 is an exploded perspective view illustrating an example of a structure of the liquid discharging module 20. As illustrated in FIG. 4, the liquid discharging module 20 includes the print head 30 that discharges a liquid, and the drive circuit module 50 that is electrically coupled to the print head 30. Further, the drive circuit module 50 includes a relay substrate 150, a drive circuit substrate 700, an opening plate 160, heat sinks 170 and 180, and heat conductive members 175 and 185, and the print head 30 includes discharging modules 32-1 to 32-4. The disposition of the discharging modules 32-1 to 32-4 in the print head 30 is not limited to the example illustrated in FIG. 4.

The relay substrate 150 is a plate-shaped member extending along the XY plane. The other end of each of the FFC cables 22*a* and 22*b* is electrically coupled to a surface of the relay substrate 150 on the −Z side. A connector CN2*a* is provided on the surface of the relay substrate 150 on the +Z side. Further, a through hole 158 that penetrates the relay substrate 150 in a direction along the Z axis is formed on the relay substrate 150. A cooling fan 58 is attached to the through hole 158. As a result, the cooling fan 58 is fixed to the relay substrate 150 to generate an air flow in a direction along the Z axis.

The drive circuit substrate 700 is positioned on the +Z side of the relay substrate 150 and includes rigid wiring members 701, 703, 705, and 707 and a flexible wiring member 709. Each of the rigid wiring members 701, 703, 705, and 707 is a so-called multi-layer rigid substrate including a base material in which a plurality of hard composite materials such as glass and epoxy are laminated, and a plurality of wiring layers in which a wiring pattern positioned between the layers of the base material and propagating various signals are formed. Further, the flexible wiring member 709 is a so-called flexible substrate having flexibility, which includes one or a plurality of wiring layers in which wiring patterns through which various signals propagate are formed on a base material in which one or a plurality of plastic films, polyimides, and the like are laminated. In the drive circuit substrate 700, the flexible wiring member 709 is positioned such that at least one of the plurality of wiring layers included in each of the rigid wiring members 701, 703, 705, and 707 is configured. As a result, the rigid wiring members 701, 703, 705, and 707 are electrically coupled to each other via the flexible wiring member 709.

That is, the drive circuit substrate 700 is a so-called rigid flexible substrate including the rigid wiring members 701, 703, 705, and 707 and the flexible wiring member 709, which are more flexible than the rigid wiring members 701, 703, 705, and 707. Various circuits including a discharge control circuit 52 and a drive signal output circuit 54, which will be described later, or the connectors CN1*a* and CN2*b* are mounted on each of the rigid wiring members 701, 703, 705, and 707 included in the drive circuit substrate 700.

The rigid wiring member 701 is a plate-shaped member extending along the YZ plane, and the end portion on the −Z side is positioned along the end portion of the relay substrate 150 on the +X side. The rigid wiring member 703 is a plate-shaped member extending along the YZ plane, and the end portion on the −Z side is positioned along the end portion of the relay substrate 150 on the −X side. That is, the rigid wiring member 701 is positioned on the +X side of the rigid wiring member 703, and the rigid wiring member 701 and the rigid wiring member 703 are positioned facing each other along the X axis.

The rigid wiring member 705 is a plate-shaped member extending along the XZ plane, the end portion on the −Z side is positioned along the end portion of the relay substrate 150 on the +Y side, the end portion on the +X side is positioned along the end portion of the rigid wiring member 701 on the +Y side, and the end portion on the −X side is positioned along the end portion of the rigid wiring member 703 on the +Y side. That is, the rigid wiring member 705 is positioned to intersect both the rigid wiring member 701 and the rigid wiring member 703.

The rigid wiring member 707 is a plate-shaped member extending along the XY plane, the end portion on the +X side is positioned along the end portion on the +Z side of the rigid wiring member 701, the end portion on the −X side is positioned along the end portion of the rigid wiring member 703 on the +Z side, and the end portion on the +Y side is positioned along the end portion of the rigid wiring member 705 on the +Z side. That is, the rigid wiring member 707 is positioned to intersect the rigid wiring member 701, the rigid wiring member 703, and the rigid wiring member 705.

As described above, in the drive circuit substrate 700, the rigid wiring member 701 and the rigid wiring member 703 are positioned facing each other in a direction along the X axis when the flexible wiring member 709 is bent, and the rigid wiring member 705 and the rigid wiring member 707 are positioned to cover at least a part of a space created between the rigid wiring member 701 and the rigid wiring member 703 when the flexible wiring member 709 is bent.

A connector CN2*b* is a surface of the rigid wiring member 701 on the −X side and is provided along the end portion of the rigid wiring member 701 on the −Z side. That is, the connector CN2*b* is provided in the vicinity of the relay substrate 150. The connector CN2*b* is fitted to the connector CN2*a* provided on the surface of the relay substrate 150 on the +Z side. As a result, the drive circuit substrate 700, which includes the rigid wiring member 701, and the relay substrate 150 are electrically coupled to each other. That is, the connector CN2*a* and the connector CN2*b* configure the B-to-B connector that electrically couples the drive circuit substrate 700 and the relay substrate 150 by being directly fitted to each other. Here, in the following description, the B-to-B connector including the connector CN2*a* and the connector CN2*b* may be collectively referred to as a connector CN2.

The connector CN1*a* is provided on the surface of the rigid wiring member 707 on the +Z side. The drive circuit substrate 700 is electrically coupled to the print head 30 via the connector CN1*a*. That is, the connector CN1*a* corresponds to one of the connectors CN1 which are B-to-B connectors that electrically couple the drive circuit substrate 700 and the print head 30.

The heat sink 170 is positioned on the −X side of the rigid wiring member 703 and is attached to the rigid wiring member 703 via the heat conductive member 175. Further, the heat sink 180 is positioned on the +X side of the rigid wiring member 701 and is attached to the rigid wiring member 701 via the heat conductive member 185. The heat sinks 170 and 180, and the heat conductive members 175 and 185 absorb heat generated in the rigid wiring members 703 and 701, and release the heat into the atmosphere. As a result, the heat sink 170 cools various circuits provided in the rigid wiring member 703, and the heat sink 180 cools various circuits provided in the rigid wiring member 701. As the heat sinks 170 and 180, a metal such as copper, a copper alloy, aluminum, and an aluminum alloy is used from the viewpoints of heat conductivity performance, processability of the material, availability of the material, and the like. Further, by increasing the adhesion between each of the heat sinks 170 and 180 and each of the rigid wiring members 703 and 701, the heat conductive members 175 and 185 increase the efficiency of heat absorption by the heat sinks 170 and 180, ensure the insulation performance between the heat sink 170 and the rigid wiring member 703, and ensure the insulation performance between the heat sink 180 and the rigid wiring member 701. From the above viewpoint, the heat conductive members 175 and 185 are substances having flame retardancy and electrical insulation, and include, for example, silicone or acrylic resin, and a gel sheet or a rubber sheet having heat conductivity is used.

The opening plate 160 is a plate-shaped member extending along the XZ plane, the end portion on the +X side is positioned along the end portion of the rigid wiring member 701 on the −Y side, the end portion on the −X side is positioned along the end portion of the rigid wiring member 703 on the −Y side, the end portion on the +Z side is positioned along the end portion of the rigid wiring member 707 on the −Y side, and the end portion on the −Z side is positioned along the end portion of the relay substrate 150 on the −Y side. That is, the opening plate 160 is positioned to cover at least a part of the space generated between the rigid wiring member 701 and the rigid wiring member 703 positioned facing each other along the X axis.

Further, the opening plate 160 includes a plurality of openings 162 through which an air flow generated by the cooling fan 58 passes. As described above, the cooling fan 58 is positioned on the −Z side of the drive circuit substrate 700 and generates an air flow along the Z direction. That is, the cooling fan 58 generates an air flow in a space between the rigid wiring member 701 and the rigid wiring member 703 positioned facing each other. In this case, the space between the rigid wiring member 701 and the rigid wiring member 703 is covered with the rigid wiring members 705 and 707, the relay substrate 150, and the opening plate 160. Therefore, the air flow generated by the cooling fan 58 passes through the opening 162. The opening 162 through which the air flow generated by the cooling fan 58 passes can adjust a flow rate and flow velocity of the air flow generated in the space between the rigid wiring member 701 and the rigid wiring member 703 by changing the size and shape of the opening 162. As a result, by optimizing the dispositions or sizes of the plurality of openings 162 included in the opening plate 160, the air flow generated by the cooling fan 58 can be efficiently supplied to a heat generating place of the drive circuit module 50, and the cooling efficiency of the drive circuit module 50 by the cooling fan 58 can be increased.

The print head 30 is positioned on the +Z side of the drive circuit module 50 and includes the discharging modules 32-1 to 32-4 and the connector CN1*b*. The discharging modules 32-1 to 32-4 are positioned on the +Z side of the print head 30, and at least a part thereof is provided to be exposed from the surface of the print head 30 on the +Z side. In this case, the discharging modules 32-1 and 32-2 are positioned side by side such that the discharging module 32-1 is on the −Y side and the discharging module 32-2 is on the +Y side along the Y axis, and the discharging modules 32-3 and 32-4 are positioned side by side such that the discharging module 32-3 is on the +Y side and the discharging module 32-4 is on the −Y side along the Y axis on the −X side of the discharging modules 32-1 and 32-2 described above. That is, the discharging modules 32-1 and 32-2 are positioned side by side along the end portion of the print head 30 on the +X side, and the discharging modules 32-3 and 32-4 are positioned side by side along the end portion of the print head 30 on the −X side.

The connector CN1*b* is positioned on the −Z side of the print head 30 and is provided such that at least a part thereof is exposed from the surface of the print head 30 on the −Z side. The connector CN1*a* included in the drive circuit module 50 is fitted to the connector CN1*b*. As a result, the drive circuit substrate 700 and the print head 30 are electrically coupled. That is, the connector CN1*b* corresponds to the other of the connector CN1 which is a B-to-B connector that electrically couples the drive circuit module 50 including the drive circuit substrate 700 and the print head 30, and the connector CN1*a* and the connector CN1*b* configure the connector CN1 which is a B-to-B connector.

Figure 5:
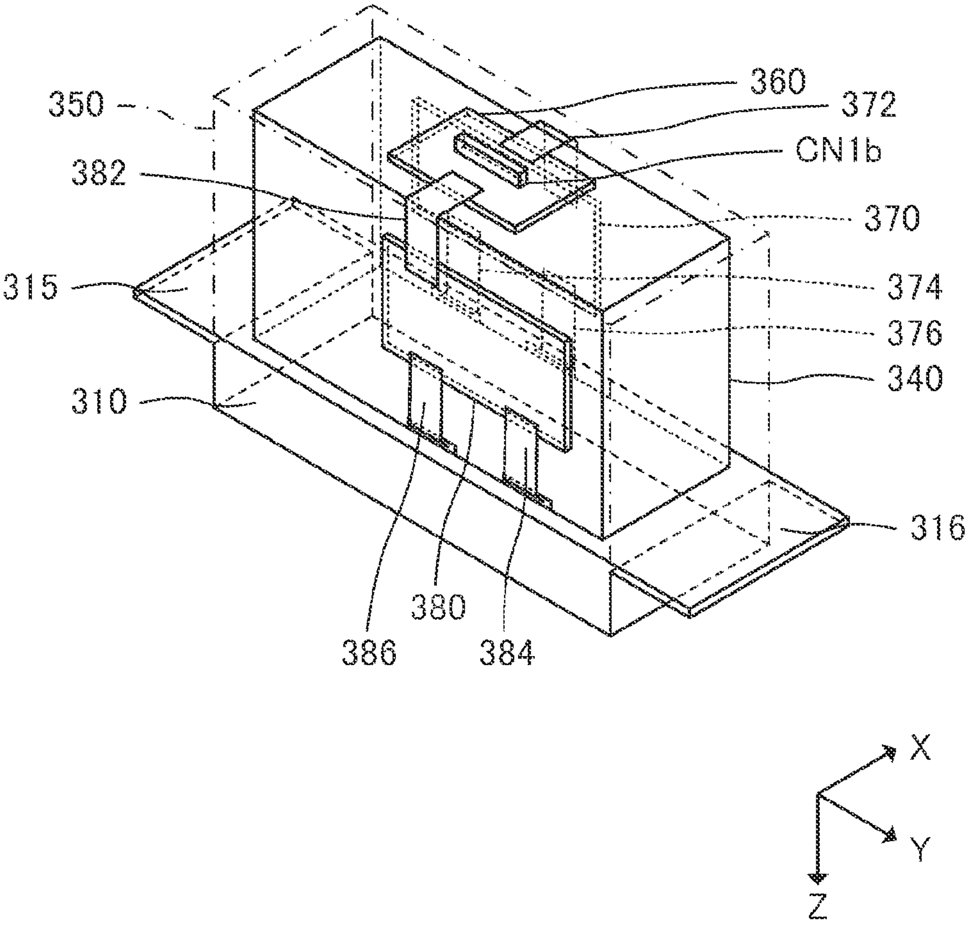
FIG. 5 is a perspective view illustrating an example of an internal structure of a print head.

Here, a specific structure of the print head 30 will be described. FIG. 5 is a perspective view illustrating an example of an internal structure of the print head 30. In FIG. 5, a head cover 350 included in the print head 30 is illustrated by a broken line, and the internal configuration of the head cover 350 is illustrated by a solid line. That is, FIG. 5 illustrates a state where the head cover 350 included in the print head 30 is removed.

As illustrated in FIG. 5, the print head 30 includes a head holder 310 and the head cover 350. A flange 315 is provided at the end portion of the head holder 310 on the −Y side, and a flange 316 is provided at the end portion of the head holder 310 on the +Y side. The head holder 310 is exposed from the +Z side of the placement portion 85 of the carriage main body 81. In this case, the print head 30 is supported by the carriage main body 81 in a state where the flanges 315 and 316 are supported by the placement portion 85 and the plurality of discharging portions 600 are exposed from the −Z side surface of the placement portion 85. The flanges 315 and 316 may be fixed to the placement portion 85 by a screw or the like (not illustrated).

The head cover 350 is positioned on the −Z side of the head holder 310 and includes an accommodation space inside. The head cover 350 functions as a protection member that protects various configurations of the print head 30 from ink mist and impact by accommodating various configurations of the print head 30 in the accommodation space.

A flow path member 340, a head substrate 360, head relay substrates 370 and 380, and FPC 372, 374, 376, 382, 384, and 386 are accommodated in the accommodation space of the head cover 350.

In the flow path member 340, an ink flow path (not illustrated) for supplying the ink supplied from the liquid container 9 to the plurality of discharging portions 600 is formed.

The head substrate 360 is positioned on the −Z side of the flow path member 340 and extends along the XY plane. The connector CN1*b* is provided on the surface of the head substrate 360 on the −Z side. At least a part of the connector CN1*b* is exposed to the outside of the print head 30 by inserting a through hole (not illustrated) formed in the head cover 350.

The head relay substrate 370 is positioned on the +X side of the flow path member 340 and extends along the YZ plane. The head relay substrate 370 is electrically coupled to the head substrate 360 via the FPC 372. Further, one end of the FPC 374 and one end of the FPC 376 are coupled to the head relay substrate 370. The other end of the FPC 374 is electrically coupled to the discharging module 32-1 and the other end of the FPC 376 is electrically coupled to the discharging module 32-2.

The head relay substrate 380 is positioned on the −X side of the flow path member 340 and extends along the YZ plane. The head relay substrate 380 is electrically coupled to the head substrate 360 via the FPC 382. Further, one end of the FPC 384 and one end of the FPC 386 are coupled to the head relay substrate 380. The other end of the FPC 384 is electrically coupled to the discharging module 32-3, and the other end of the FPC 386 is electrically coupled to the discharging module 32-4.

Various signals output by the drive circuit module 50 are input to the print head 30 configured as described above via the connector CN1*b*. The signal input via the connector CN1*b* is branched by the head substrate 360 and the head relay substrates 370 and 380, and then supplied to each of the discharging modules 32-1 to 32-4.

Figure 6:
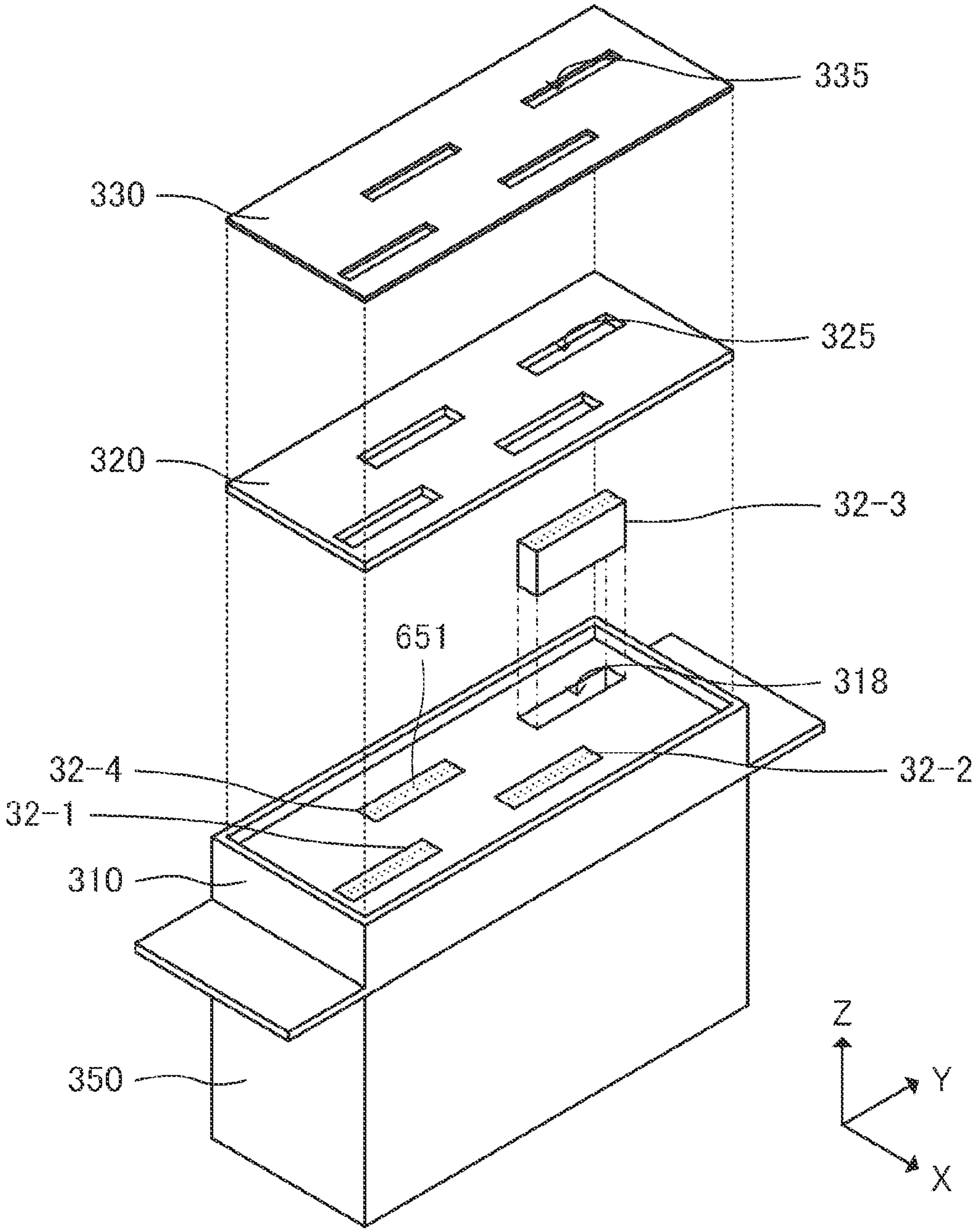
FIG. 6 is an exploded perspective view of the print head.

FIG. 6 is an exploded perspective view of the print head 30 when the print head 30 is viewed from the +Z side along the Z axis. As illustrated in FIG. 6, the head holder 310 of the print head 30 is provided with a reinforcing plate 320, a fixing plate 330, and the discharging modules 32-1 to 32-4.

The head holder 310 is made of a conductive material, such as metal having a higher intensity than that of the reinforcing plate 320. On the surface of the head holder 310 on the +Z side, four accommodation portions 318 for accommodating each of the discharging modules 32-1 to 32-4 are provided.

The four accommodation portions 318 have a recessed shape that opens on the +Z side, and individually accommodate the discharging modules 32-1 to 32-4 fixed by the fixing plate 330. In this case, the opening of the accommodation portion 318 is sealed by the fixing plate 330. In other words, the discharging modules 32-1 to 32-4 are individually accommodated on the inside of a space formed by the accommodation portion 318 and the fixing plate 330. The accommodation portion 318 may be individually provided corresponding to each of the discharging modules 32-1 to 32-4 and may have a shape for collectively accommodating the discharging modules 32-1 to 32-4.

The reinforcing plate 320 and the fixing plate 330 are laminated in this order from the −Z side to the +Z side along the Z axis on the surface of the head holder 310 provided with the accommodation portion 318. The fixing plate 330 is configured with a plate-shaped member formed of a conductive material, such as metal. Further, on the fixing plate 330, an opening 335, through which a nozzle 651 included in the plurality of discharging portions 600 included in each of the discharging modules 32-1 to 32-4 is exposed, is provided penetrating along the Z axis. The openings 335 are individually provided corresponding to each of the discharging modules 32-1 to 32-4. It is preferable that the reinforcing plate 320 be made of a material having a higher intensity than that of the fixing plate 330. On the reinforcing plate 320, an opening 325 corresponding to each of the discharging modules 32-1 to 32-4 joined to the fixing plate 330 and having an inner diameter larger than the outer periphery of each of the discharging modules 32-1 to 32-4 is provided to penetrate along the Z axis. Each of the discharging modules 32-1 to 32-4, which is inserted through the opening 325 of the reinforcing plate 320, is joined to the fixing plate 330 such that the nozzle 651 included in the discharging portion 600 is exposed from the opening 335 of the fixing plate 330.

Figure 7:
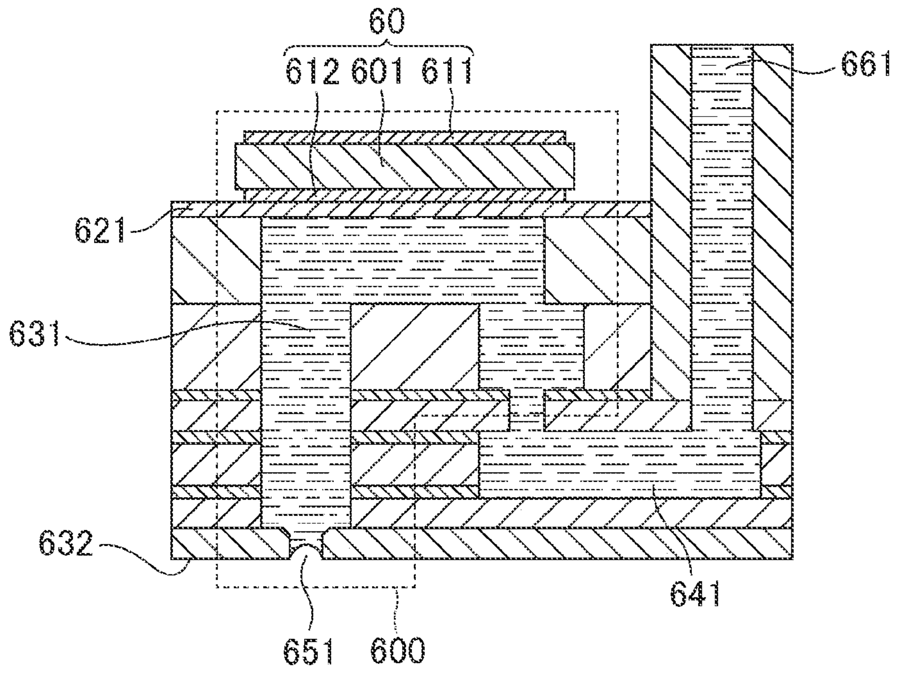
FIG. 7 is a diagram illustrating an example of a configuration of a discharging portion.

Further, in each of the discharging modules 32-1 to 32-4, two rows of nozzles 651 included in the discharging portion 600 for discharging ink are provided along the X axis in a state of being arranged side by side along the Y axis. FIG. 7 is a diagram illustrating an example of a configuration of the discharging portion 600 included in each of the discharging modules 32-1 to 32-4. In addition to the discharging portion 600, FIG. 7 illustrates a nozzle plate 632, a reservoir 641, and a supply port 661 included in each of the discharging modules 32-1 to 32-4.

As illustrated in FIG. 7, the discharging portion 600 includes a piezoelectric element 60, a vibrating plate 621, a cavity 631, and the nozzle 651. The piezoelectric element 60 includes a piezoelectric body 601 and electrodes 611 and 612. The piezoelectric element 60 is configured such that the electrodes 611 and 612 are positioned to interpose the piezoelectric body 601. The piezoelectric element 60 is driven such that the center part is displaced in the up-down direction according to the potential difference between the voltage supplied to the electrode 611 and the voltage supplied to the electrode 612.

The vibrating plate 621 is positioned below the piezoelectric element 60 in FIG. 7. In other words, the piezoelectric element 60 is formed on the upper surface of the vibrating plate 621 in FIG. 7. The vibrating plate 621 is displaced in the up-down direction as the piezoelectric element 60 is driven in the up-down direction.

The cavity 631 is positioned below the vibrating plate 621 in FIG. 7. Ink is supplied to the cavity 631 from the reservoir 641. Ink stored in a liquid container 9 is introduced into the reservoir 641 via the supply port 661. In other words, the inside of the cavity 631 is filled with the ink stored in the liquid container 9. An internal volume of the cavity 631 expands or contracts as the vibrating plate 621 is displaced in the up-down direction. That is, the vibrating plate 621 functions as a diaphragm that changes the internal volume of the cavity 631, and the cavity 631 functions as a pressure chamber of which the internal pressure changes as the vibrating plate 621 is displaced in the up-down direction.

The nozzle 651 is an opening provided on the nozzle plate 632 and communicates with the cavity 631. When the internal volume of the cavity 631 changes, the ink filled the inside of the cavity 631 is discharged from the nozzle 651 according to the change in the internal volume.

In the discharging portion 600 configured as described above, when the piezoelectric element 60 is driven to bend in the upward direction, the vibrating plate 621 is displaced in the upward direction. As a result, the internal volume of the cavity 631 expands, and as a result, the ink stored in the reservoir 641 is drawn into the cavity 631. On the other hand, when the piezoelectric element 60 is driven to bend in the downward direction, the vibrating plate 621 is displaced in the downward direction. As a result, the internal volume of the cavity 631 contracts, and as a result, the ink having an amount corresponding to the degree of contraction of the internal volume of the cavity 631 is discharged from the nozzles 651.

It is sufficient that the piezoelectric element 60 has a structure that can be driven according to a potential difference between the voltage supplied to the electrode 611 and the voltage supplied to the electrode 612 and can discharge the ink from the nozzle 651 when the piezoelectric element 60 is driven, and is not limited to the structure shown in FIG. 7.

1.3 Functional Configuration of Liquid Discharging Apparatus

Figure 8A:
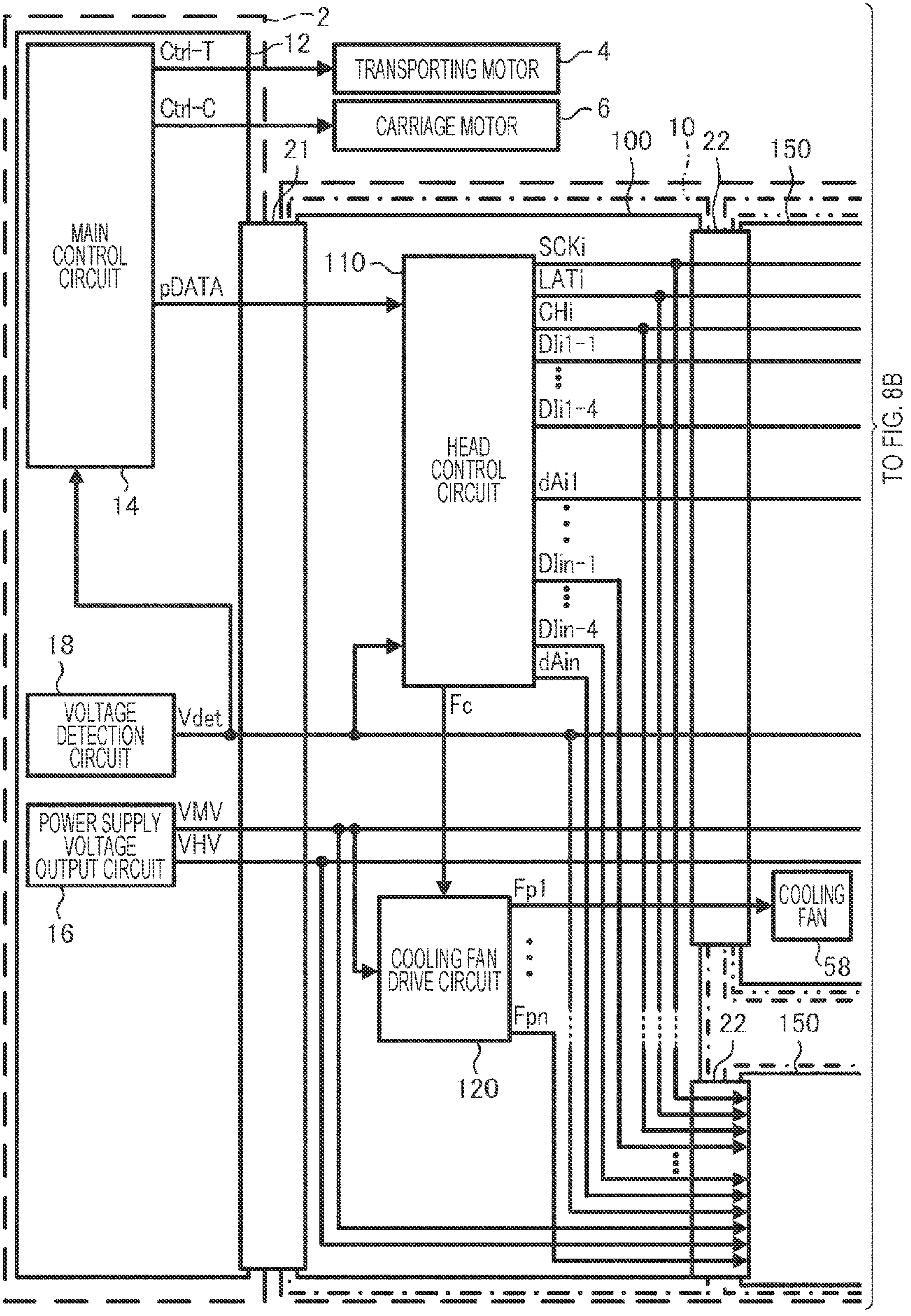
FIGS. 8A and 8B are diagrams illustrating an example of a functional configuration of the liquid discharging apparatus.
Figure 8B:
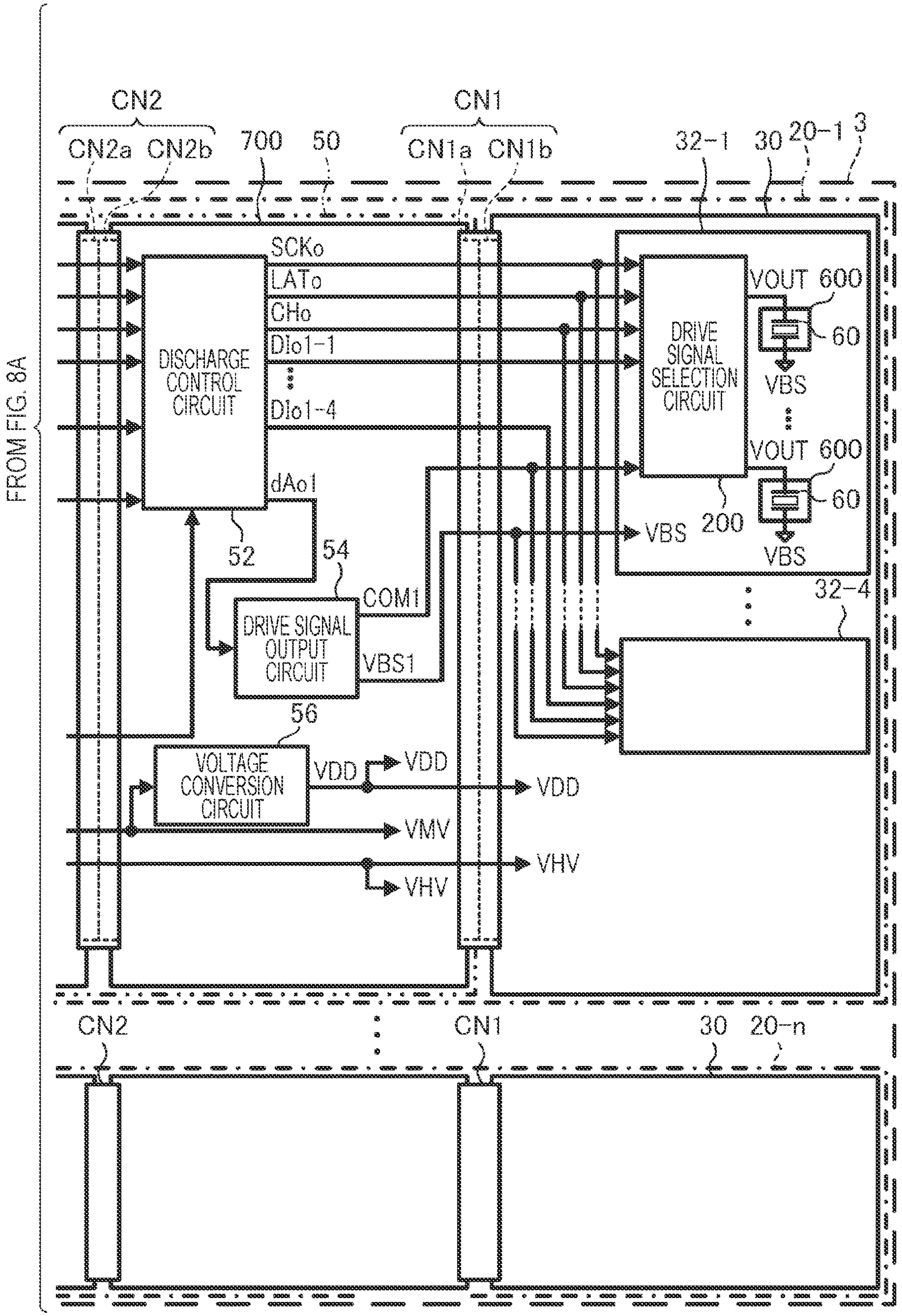

Next, a functional configuration of the liquid discharging apparatus 1 will be described. FIGS. 8A and 8B are diagrams illustrating an example of the functional configuration of the liquid discharging apparatus 1. As illustrated in FIGS. 8A and 8B, the liquid discharging apparatus 1 includes the control unit 2 and the head unit 3.

The control unit 2 includes a main control circuit substrate 12, a main control circuit 14, a voltage detection circuit 18, and a power supply voltage output circuit 16. The control unit 2 generates a control signal for controlling each element of the liquid discharging apparatus 1 based on the image data DATA supplied from the external apparatus (not illustrated) and outputs the control signal to the corresponding configuration, and generates the voltage signal VDC used for the power supply voltage of each portion of the liquid discharging apparatus 1 from the commercial voltage VAC of the AC voltage supplied to the liquid discharging apparatus 1 and supplies the voltage signal VDC to each portion of the liquid discharging apparatus 1.

A plurality of circuits including the main control circuit 14, the voltage detection circuit 18, and the power supply voltage output circuit 16 included in the control unit 2 are mounted on the main control circuit substrate 12, and one end of the FFC cable 21 is coupled to the main control circuit substrate 12. Although FIGS. 8A and 8B illustrate only one main control circuit substrate 12, the control unit 2 may include a plurality of main control circuit substrates 12. That is, the main control circuit 14 is provided on the main control circuit substrate 12.

The main control circuit 14 includes a processing circuit such as a central processing unit (CPU) or a field programmable gate array (FPGA), and a storage circuit (not illustrated). The image data DATA is input to the main control circuit 14 from the external apparatus (not illustrated). The main control circuit 14 generates a transport control signal Ctrl-T, a carriage control signal Ctrl-C, and a print data signal pDATA by performing predetermined signal processing on the input image data DATA, and outputs the generated signals to corresponding configurations of the transporting motor 4, the carriage motor 6, and the head unit 3. That is, the main control circuit 14 outputs the transport control signal Ctrl-T for controlling the transport of the medium P and the print data signal pDATA based on the image data DATA.

The power supply voltage output circuit 16 includes an AC/DC converter such as a flyback circuit and a DC/DC converter such as a step-down circuit or a booster circuit. The power supply voltage output circuit 16 generates a voltage signal VHV, which is a DC voltage signal having a voltage value of 42 V, and a voltage signal VMV, which is a DC voltage signal having a voltage value of 24 V, as the voltage signal VDC from the commercial voltage VAC input from the outside of the liquid discharging apparatus 1, and outputs the generated signals to the head unit 3. The voltage signal VHV and the voltage signal VMV may be output to various configurations of the liquid discharging apparatus 1 in addition to the head unit 3. Further, the voltage value of the voltage signal VHV and the voltage value of the voltage signal VMV are not limited to 42 V and 24 V. Further, the power supply voltage output circuit 16 may output a DC voltage signal having a different voltage value as the voltage signal VDC in place of or in addition to the voltage signals VHV and VMV.

The voltage detection circuit 18 detects a voltage value of the commercial voltage VAC. The voltage detection circuit 18 outputs a voltage detection signal Vdet in accordance with the voltage value of the commercial voltage VAC. That is, the voltage detection circuit 18 detects whether or not the commercial voltage VAC is supplied to the liquid discharging apparatus 1, generates the voltage detection signal Vdet in accordance with the detection result, and outputs the voltage detection signal Vdet to the main control circuit 14 and the head unit 3. That is, the voltage detection circuit 18 outputs the voltage detection signal Vdet including information indicating the state of the liquid discharging apparatus 1, that is information on the voltage value of the commercial voltage VAC, which is the power supply voltage supplied to the liquid discharging apparatus 1. In other words, the voltage detection signal Vdet is a signal indicating the state of the liquid discharging apparatus 1 and includes the information on the voltage value of the commercial voltage VAC, which is the power supply voltage supplied to the liquid discharging apparatus 1, as information indicating the state of the liquid discharging apparatus 1.

When the voltage detection signal Vdet indicating a fact that the commercial voltage VAC is not supplied to the liquid discharging apparatus 1 is input to the main control circuit 14, the main control circuit 14 executes stop processing for stopping an operation of the liquid discharging apparatus 1. Examples of the stop processing executed by the main control circuit 14 include medium ejecting processing for ejecting the medium P, carriage movement processing for moving the carriage 8 to a predetermined home position, and storage processing of storing operation information of the liquid discharging apparatus 1 in a storage circuit.

Here, a description will be made on the assumption that the voltage detection circuit 18 of the first embodiment outputs the voltage detection signal Vdet that becomes an L level when an effective value or average value of the commercial voltage VAC, which is the voltage value of the commercial voltage VAC, is less than a predetermined threshold value, and that becomes an H level when the effective value or average value of the commercial voltage VAC, which is the voltage value of the commercial voltage VAC, is equal to or higher than the predetermined threshold value. The voltage detection circuit 18 may detect the voltage value of the voltage signal VHV or the voltage signal VMV in place of or in addition to the commercial voltage VAC and output the voltage detection signal Vdet in accordance with the detection result. Further, the voltage detection circuit 18 may output the voltage detection signal Vdet that becomes an L level when the effective value or average value of the commercial voltage VAC is equal to or higher than the predetermined threshold value, and that becomes an H level when the effective value or average value of the commercial voltage VAC is less than the predetermined threshold value.

The head unit 3 includes the discharge control module 10 and n liquid discharging modules 20, and is electrically coupled to the control unit 2 via the FFC cable 21. Here, when the n liquid discharging modules 20 included in the head unit 3 are distinguished, the n liquid discharging modules 20 may be referred to as liquid discharging modules 20-1 to **20-*n***.

The discharge control module 10 includes the discharge control circuit substrate 100, a head control circuit 110, and a cooling fan drive circuit 120. When the discharge control module 10 operates using the voltage signals VHV and VMV output by the power supply voltage output circuit 16 or the DC voltage signals generated from the voltage signals VHV and VMV as the power supply voltage, the discharge control module 10 generates a control signal for controlling the operation of n liquid discharging modules 20 based on the print data signal pDATA and outputs the control signal to the corresponding liquid discharging module 20.

The other end of the FFC cable 21 is coupled to the discharge control circuit substrate 100. As a result, the discharge control circuit substrate 100 and the main control circuit substrate 12 are electrically coupled to each other. Further, a plurality of circuits including the head control circuit 110 and the cooling fan drive circuit 120 are mounted on the discharge control circuit substrate 100, and one end of an FFC cable 22 is coupled to the discharge control circuit substrate 100. Although FIGS. 8A and 8B illustrate only one discharge control circuit substrate 100, the discharge control module 10 may include a plurality of discharge control circuit substrates 100. That is, the head control circuit 110 is provided in the discharge control circuit substrate 100.

The head control circuit 110 includes a processing circuit such as a CPU or an FPGA and a storage circuit such as a semiconductor memory, and at least a part thereof is mounted on the integrated circuit 101. The print data signal pDATA is input to the head control circuit 110. The head control circuit 110 generates a clock signal SCKi, a latch signal LATi, and a change signal CHi, which are common to the n liquid discharging modules 20, head control signals DIi1-1 to DIin-1, DIi1-2 to DIin-2, DIi1-3 to DIin-3, and DIi1-4 to DIin-4, which correspond to each of the n liquid discharging modules 20, and base drive signals dAi1 to dAin, based on the input print data signal pDATA.

Specifically, the print data signals pDATA are a pair of differential signals generated based on the image data DATA, and include the clock signal SCKi, the latch signal LATi, the change signal CHi, the head control signals DIi1-1 to DIin-1, DIi1-2 to DIin-2, DIi1-3 to DIin-3, and DIi1-4 to DIin-4, and base drive signals dAi1 to dAin serially. The head control circuit 110 generates the clock signal SCKi, the latch signal LATi, and the change signal CHi, which are common to the n liquid discharging modules 20, the head control signals DIi1-1 to DIin-1, DIi1-2 to DIin-2, DIi1-3 to DIin-3, and DIi1-4 to DIin-4, which correspond to each of the n liquid discharging modules 20, and the base drive signals dAi1 to dAin, by restoring the input print data signal pDATA to a single-ended signal and deserializing the restored single-ended signal.

The head control circuit 110 outputs the generated clock signal SCKi, latch signal LATi, change signal CHi, head control signals DIi1-1, DIi1-2, DIi1-3, and DIi1-4, and base drive signal dAi1 to the corresponding liquid discharging module 20-1. Further, the head control circuit 110 outputs the generated clock signal SCKi, latch signal LATi, change signal CHi, head control signals DIin-1, DIin-2, DIin-3, and DIin-4, and base drive signal dAin to the corresponding liquid discharging module 20-*n*.

Here, in the following description, a description will be made on the assumption that the head control circuit 110 outputs the clock signal SCKi, the latch signal LATi, and the change signal CHi, the head control signals DIi-1, DIi-2, DIi-3, and DIi-4 as the head control signals DIi1-1 to DIin-1, DIi1-2 to DIin-2, DIi1-3 to DIin-3, and DIi1-4 to DIin-4, and the base drive signal dAi as the base drive signals dAi1 to dAin, to the liquid discharging module 20 via the FFC cable 22. That is, a description will be made on the assumption that the clock signal SCKi, the latch signal LATi, and the change signal CHi, the head control signals DIi-1, DIi-2, DIi-3, and DIi-4 as the head control signals DIi1-1 to DIin-1, DIi1-2 to DIin-2, DIi1-3 to DIin-3, and DIi1-4 to DIin-4, and the base drive signal dAi as the base drive signals dAi1 to dAin are input to the liquid discharging module 20.

Further, the head control circuit 110 generates a fan control signal Fc for controlling the operation of the cooling fan drive circuit 120 and outputs the fan control signal Fc to the cooling fan drive circuit 120. The voltage signal VMV is input to the cooling fan drive circuit 120 in addition to the fan control signal Fc. The cooling fan drive circuit 120 switches whether or not to output the voltage signal VMV as fan drive signals Fp1 to Fpn based on the input fan control signal Fc. For example, the cooling fan drive circuit 120 includes n switch circuits that switch whether or not to output the voltage signal VMV as the fan drive signals Fp1 to Fpn. The cooling fan drive circuit 120 switches whether or not to output the voltage signal VMV as the fan drive signals Fp1 to Fpn by controlling a conduction state of each of the n switch circuits based on the input fan control signal Fc.

The cooling fan drive circuit 120 outputs the fan drive signals Fp1 to Fpn to the corresponding liquid discharging module 20. In the following description, a description will be made on the assumption that the fan drive signal Fp1 corresponds to the liquid discharging module 20-1 and the fan drive signal Fpn corresponds to the liquid discharging module 20-*n*. That is, the cooling fan drive circuit 120 outputs the fan drive signal Fp1 to the liquid discharging module 20-1 and outputs the fan drive signal Fpn to the liquid discharging module 20-*n*. Here, in the following description, a description will be made that the cooling fan drive circuit 120 outputs the fan drive signal Fp as the fan drive signals Fp1 to Fpn to the liquid discharging module 20.

Further, the voltage detection signal Vdet is input to the head control circuit 110. When the voltage detection signal Vdet indicating a fact that the commercial voltage VAC is not supplied to the liquid discharging apparatus 1 is input, the head control circuit 110 executes stop processing for stopping an operation of the liquid discharging apparatus 1. Examples of the stop processing executed by the head control circuit 110, which is discharge stop processing of stopping the discharge of the ink from the head unit 3, include COM output stop processing of the output of the drive signal COM from the drive signal output circuit 54, which will be described later or storage processing of storing operation information of the liquid discharging apparatus 1 in the storage circuit.

The liquid discharging module 20-1 includes the drive circuit module 50 and the print head 30. The clock signal SCKi, the latch signal LATi, the change signal CHi, the head control signals DIi1-1, DIi1-2, DIi1-3, and DIi1-4, the base drive signal dAi1, the fan drive signal Fp1, the voltage detection signal Vdet, and the voltage signals VHV and VMV, which are output by the discharge control module 10, are input to the liquid discharging module 20-1. The liquid discharging module 20-1 operates using the voltage signals VHV and VMV or the DC voltage generated from the voltage signals VHV and VMV as the power supply voltage and discharges ink onto the medium P in an amount defined based on the head control signals DIi1-1, DIi1-2, DIi1-3, and DIi1-4 at a timing defined based on the latch signal LATi and the change signal CHi.

The drive circuit module 50 includes the relay substrate 150, the drive circuit substrate 700, the discharge control circuit 52, the drive signal output circuit 54, a voltage conversion circuit 56, and the cooling fan 58.

The other end of the FFC cable 22 is coupled to the relay substrate 150. As a result, the relay substrate 150 and the discharge control circuit substrate 100 are electrically coupled to each other. Further, the connector CN2*a* is provided on the relay substrate 150, and the cooling fan 58 is fixed to the relay substrate 150. The relay substrate 150 relays the clock signal SCKi, the latch signal LATi, the change signal CHi, the head control signals DIi1-1, DIi1-2, DIi1-3, and DIi1-4, the base drive signal dAi1, the voltage detection signal Vdet, and the voltage signals VHV and VMV to the drive circuit substrate 700 and propagates the fan drive signal Fp1 to the cooling fan 58.

The cooling fan 58 is driven by using the fan drive signal Fp1 input via the relay substrate 150. As a result, the cooling fan 58 generates an air flow. The drive circuit module 50 is cooled by the air flow generated by the cooling fan 58. That is, the cooling fan 58 improves the operational stability of various circuits included in the drive circuit module 50 by cooling the drive circuit module 50.

The drive circuit substrate 700 is a rigid flexible substrate as described above, and the drive circuit substrate 700 is provided with the connector CN2*b*. The drive circuit substrate 700 and the relay substrate 150 are electrically coupled to each other by fitting the connector CN2*b* provided on the drive circuit substrate 700 and the connector CN2*a* provided on the relay substrate 150 to each other. Further, the discharge control circuit 52, the drive signal output circuit 54, the voltage conversion circuit 56, and the connector CN1*a* are provided on the drive circuit substrate 700. That is, the discharge control circuit 52 and the drive signal output circuit 54 are provided on the drive circuit substrate 700, and the drive circuit substrate 700, the discharge control circuit substrate 100, and the main control circuit substrate 12 are electrically coupled via the FFC cables 21 and 22, which are flexible flat cables.

The clock signal SCKi, the latch signal LATi, the change signal CHi, the head control signals DIi1-1, DIi1-2, DIi1-3, and DIi1-4, and the base drive signal dAi1 are input to the discharge control circuit 52. The discharge control circuit 52 generates a clock signal SCKo based on the clock signal SCKi, a latch signal LATo based on the latch signal LATi, a change signal CHo based on the change signal CHi, and head control signals DIo1-1, DIo1-2, DIo1-3, and DIo1-4 each based on the head control signals DIi1-1, DIi1-2, DIi1-3, and DIi1-4, and outputs the generated signals to the print head 30.

Further, the discharge control circuit 52 generates a base drive signal dAo1 based on the base drive signal dAi1 and outputs the base drive signal dAo1 to the drive signal output circuit 54. The base drive signal dAo1, which is output by the discharge control circuit 52, is a signal that is the base of a drive signal COM1 output by the drive signal output circuit 54 and is a signal for defining a signal waveform of the drive signal COM1. The drive signal output circuit 54 performs digital-analog conversion of the input base drive signal dAo1, performs class D amplification to generate the drive signal COM1, and outputs the drive signal COM1 to the print head 30.

That is, the head control signals DIi1-1, DIi1-2, DIi1-3, and DIi1-4, and the base drive signal dAi1 are input to the discharge control circuit 52 included in the liquid discharging module 20-1, the discharge control circuit 52 included in the liquid discharging module 20-1 outputs the head control signals DIo1-1, DIo1-2, DIo1-3, and DIo1-4, and the base drive signal dAo1, and the drive signal output circuit 54 included in the liquid discharging module 20-1 outputs the drive signal COM1 based on the base drive signal dAo1.

Here, although a description is made on the assumption that the drive signal output circuit 54 generates the drive signal COM1 by performing the class D amplification of the signal waveform defined based on the base drive signal dAo1, the drive signal output circuit 54 may generate the drive signal COM1 by performing class A amplification, class B amplification, or class AB amplification of the signal waveform defined based on the base drive signal dAo1. However, the drive signal output circuit 54 consumes a large amount of power and therefore generates a large amount of heat. Such a drive signal output circuit 54 is required to generate the drive signal COM1 with high efficiency from the viewpoint of reducing power consumption and suppressing heat generation amount. From the above viewpoint, the drive signal output circuit 54 is preferably configured to include class D amplification that can amplify the signal waveform defined based on the base drive signal dAo1 with high efficiency. The details of the configuration of the drive signal output circuit 54 including the class D amplification will be described later.

Further, the drive signal output circuit 54 generates a reference voltage signal VBS1 and outputs the reference voltage signal VBS1 to the print head 30. The reference voltage signal VBS1 functions as a reference potential for driving a piezoelectric element 60 included in the print head 30. The reference voltage signal VBS1 may be generated by a circuit configured separately from the drive signal output circuit 54.

Further, the voltage detection signal Vdet is input to the discharge control circuit 52. That is, the voltage detection signal Vdet including one of the states of the liquid discharging apparatus 1, that is information on the voltage value of the commercial voltage VAC, which is the power supply voltage supplied to the liquid discharging apparatus 1, is input to the discharge control circuit 52. When the voltage detection signal Vdet indicating a fact that the commercial voltage VAC is not supplied to the liquid discharging apparatus 1 is input, the discharge control circuit 52 executes stop processing for stopping an operation of the liquid discharging apparatus 1. Examples of the stop processing executed by the discharge control circuit 52, which is the discharge stop processing of stopping the discharge of the ink from the head unit 3, include VOUT output stop processing of forcibly controlling the drive signal selection circuit 200 to be non-conductive, which will be described later. Here, the details of the discharge control circuit 52 will be described later.

Further, the voltage signals VHV and VMV propagating through the discharge control module 10 are input to the drive circuit module 50. The voltage signal VHV propagates inside the drive circuit module 50, is supplied to various configurations of the drive circuit module 50, and is also supplied to the print head 30. The voltage signal VMV propagates inside the drive circuit module 50, is supplied to various configurations of the drive circuit module 50, and is also supplied to the voltage conversion circuit 56. The voltage conversion circuit 56 steps down the input voltage signal VMV to generate and output a voltage signal VDD. The voltage signal VDD output by the voltage conversion circuit 56 is used as a power supply voltage for various circuits included in the drive circuit module 50 and is also supplied to the print head 30. The voltage signal VDD is, for example, a DC voltage such as 5 V or 3.3 V. The voltage signal VDD output by the voltage conversion circuit 56 is not limited to one, and the voltage conversion circuit 56 may output a plurality of voltage signals VDD having different voltage values. Further, the voltage signal VMV may be supplied to the print head 30 together with the voltage signals VHV and VDD.

The print head 30 includes the connector CN1*b*. The print head 30 and the drive circuit substrate 700 are electrically coupled to each other by fitting the connector CN1*b* provided on the print head 30 and the connector CN1*a* provided on the drive circuit substrate 700. That is, the drive circuit substrate 700 and the print head 30 are electrically coupled with the connector CN1 which is a B-to-B connector. Further, the print head 30 includes discharging modules 32-1 to 32-4, and each of the discharging modules 32-1 to 32-4 includes the drive signal selection circuit 200 and the plurality of discharging portions 600.

The drive signal selection circuit 200 included in the discharging module 32-1 operates using the voltage signals VHV and VDD or the DC voltage generated from the voltage signals VHV and VDD as the power supply voltage.

Further, the clock signal SCKo, the latch signal LATo, the change signal CHo, and the head control signal DIo1-1, which are output by the discharge control circuit 52, and the drive signal COM1, which is output by the drive signal output circuit 54, are input to the drive signal selection circuit 200. The drive signal selection circuit 200 generates and outputs a drive signal VOUT corresponding to each of the plurality of discharging portions 600 by selecting or deselecting the signal waveform included in the drive signal COM1 based on the head control signal DIo1-1 in each of periods defined based on the latch signal LATo and the change signal CHo. That is, when the discharging module 32-1 includes p discharging portions 600, the drive signal selection circuit 200 generates p drive signals VOUT corresponding to each of the p discharging portions 600, and outputs the p drive signals VOUT to the corresponding discharging portions 600.

The drive signal VOUT, which is output by the drive signal selection circuit 200, is supplied to, for example, the electrode 611, which is one end of the piezoelectric element 60 included in the corresponding discharging portion 600. Further, the reference voltage signal VBS is commonly supplied to, for example, the electrode 612, which is the other end of the plurality of piezoelectric elements 60 included in each of the plurality of discharging portions 600. As a result, the plurality of piezoelectric elements 60 are driven such that a center part is displaced in the up-down direction according to a potential difference between the drive signal VOUT and the reference voltage signal VBS. As a result, the ink having an amount corresponding to the displacement of the piezoelectric element 60 is discharged from the nozzle 651 included in the corresponding discharging portion 600. Further, the details of the operation of the drive signal selection circuit 200 that outputs the drive signal VOUT will be described later.

Here, the discharging modules 32-2 to 32-4 included in the print head 30 of the liquid discharging module 20-1 have the same configuration as that of the discharging module 32-1 except that the input signals are different, and execute the same operation. Therefore, the detailed description of the discharging modules 32-2 to 32-4 included in the print head 30 of the liquid discharging module 20-1 will be omitted.

That is, each of the discharging modules 32-2 to 32-4 included in the print head 30 of the liquid discharging module 20-1 includes the drive signal selection circuit 200 and the plurality of discharging portions 600. The drive signal selection circuit 200 included in each of the discharging modules 32-2 to 32-4, which is included in the print head 30 of the liquid discharging module 20-1, outputs the drive signal VOUT corresponding to each of the plurality of discharging portions 600 by selecting or deselecting the signal waveform included in the drive signal COM1 based on the corresponding head control signals DIo1-2 to DIo1-4 in each of the periods defined based on the input latch signal LATo and change signal CHo. As a result, the ink having an amount corresponding to the potential difference between the input drive signal VOUT and reference voltage signal VBS is discharged from each of the plurality of discharging portions 600 included in each of the discharging modules 32-2 to 32-4.

In other words, the discharging module 32-1 of the print head 30 of the liquid discharging module 20-1 includes the plurality of discharging portions 600 that discharge the ink in response to the drive signal COM1 and the drive signal selection circuit 200 that switches whether or not to supply the drive signal COM1 to the plurality of discharging portions 600 based on the head control signal DIo1-1, and similarly, each of the discharging modules 32-2 to 32-4 of the print head 30 of the liquid discharging module 20-1 includes the plurality of discharging portions 600 that discharge the ink in response to the drive signal COM1 and the drive signal selection circuit 200 that switches whether or not to supply the drive signal COM1 to the plurality of discharging portions 600 based on the corresponding head control signals DIo1-2 to DIo1-4.

Further, as described above, all the liquid discharging modules 20-2 to 20-*n* have the same configuration and execute the same operation. Therefore, the detailed description of the liquid discharging modules 20-2 to 20-*n* will be omitted.

That is, the liquid discharging module 20-2 includes the drive circuit module 50 and the print head 30. The discharge control circuit 52 included in the liquid discharging module 20-2 generates the clock signal SCKo, the latch signal LATo, the change signal CHo, and head control signals DIo2-1, DIo2-2, DIo2-3, and DIo2-4 and outputs the generated signals to the print head 30 included in the liquid discharging module 20-2. Further, the discharge control circuit 52 included in the liquid discharging module 20-2 generates a base drive signal dAo2 and outputs the base drive signal dAo2 to the drive signal output circuit 54 included in the liquid discharging module 20-2. The drive signal output circuit 54 included in the liquid discharging module 20-2 generates a drive signal COM2 by amplifying the signal waveform defined based on the base drive signal dAo2 and outputs the drive signal COM2 to the print head 30 included in the liquid discharging module 20-2, and generates a reference voltage signal VBS2 and outputs the reference voltage signal VBS2 to the print head 30.

The print head 30 included in the liquid discharging module 20-2 generates and outputs the drive signal VOUT corresponding to each of the plurality of discharging portions 600 included in the liquid discharging module 20-2 by selecting or deselecting the signal waveform included in the drive signal COM2 based on the head control signals DIo2-1, DIo2-2, DIo2-3, and DIo2-4 at a timing defined based on the latch signal LATo and change signal CHo. As a result, the piezoelectric element 60 included in each of the plurality of discharging portions 600 is driven by the potential difference between the drive signal VOUT based on the drive signal COM2 and the reference voltage signal VBS2, and the ink having an amount corresponding to the driving amount of the piezoelectric element 60 is discharged from the liquid discharging module 20-2.

That is, the discharge control circuit 52 and the drive signal output circuit 54 are provided on the drive circuit substrate 700 of the liquid discharging module 20-2, and the drive circuit substrate 700, the discharge control circuit substrate 100, and the main control circuit substrate 12 are electrically coupled via the FFC cables 21 and 22, which are flexible flat cables. The head control signals DIi2-1, DIi2-2, DIi2-3, and DIi2-4, the base drive signal dAi2, and the voltage detection signal Vdet are input to the discharge control circuit 52 included in the liquid discharging module 20-2, the discharge control circuit 52 included in the liquid discharging module 20-2 outputs the head control signals DIo2-1, DIo2-2, DIo2-3, and DIo2-4, and the base drive signal dAo2, and the drive signal output circuit 54 included in the liquid discharging module 20-2 outputs the drive signal COM2 based on the base drive signal dAo2. Further, in the liquid discharging module 20-2, the drive circuit substrate 700 and the print head 30 are electrically coupled with the connector CN1 which is a B-to-B connector. Each of the discharging modules 32-1 to 32-4 of the print head 30 of the liquid discharging module 20-2 includes the plurality of discharging portions 600 that discharge the ink in response to the drive signal COM2 and the drive signal selection circuit 200 that switches whether or not to supply the drive signal COM2 to the plurality of discharging portions 600 based on the corresponding head control signals DIo2-1 to DIo2-4.

Further, the liquid discharging module 20-*n* includes the drive circuit module 50 and the print head 30. The discharge control circuit 52 included in the liquid discharging module 20-*n* generates the clock signal SCKo, the latch signal LATo, the change signal CHo, and head control signals DIon-1, DIon-2, DIon-3, and DIon-4 and outputs the generated signals to the print head 30 included in the liquid discharging module 20-*n*. Further, the discharge control circuit 52 included in the liquid discharging module 20-*n* generates a base drive signal dAon and outputs the base drive signal dAon to the drive signal output circuit 54 included in the liquid discharging module 20-*n*. The drive signal output circuit 54 included in the liquid discharging module 20-*n* generates a drive signal COMn by amplifying the signal waveform defined based on the base drive signal dAon and outputs the drive signal COMn to the print head 30 included in the liquid discharging module 20-*n*, and generates a reference voltage signal VBSn and outputs the reference voltage signal VBSn to the print head 30.

The print head 30 included in the liquid discharging module 20-*n* generates and outputs the drive signal VOUT corresponding to each of the plurality of discharging portions 600 included in the liquid discharging module 20-*n* by selecting or deselecting the signal waveform included in the drive signal COMn based on the head control signals DIon-1, DIon-2, DIon-3, and DIon-4 at the timing defined based on the latch signal LATo and change signal CHo. As a result, the piezoelectric element 60 included in each of the plurality of discharging portions 600 is driven by the potential difference between the drive signal VOUT based on the drive signal COMn and the reference voltage signal VBSn, and the ink having an amount corresponding to the driving amount of the piezoelectric element 60 is discharged from the liquid discharging module 20-*n*.

That is, the discharge control circuit 52 and the drive signal output circuit 54 are provided on the drive circuit substrate 700 of the liquid discharging module 20-*n*, and the drive circuit substrate 700, the discharge control circuit substrate 100, and the main control circuit substrate 12 are electrically coupled via the FFC cables 21 and 22, which are flexible flat cables. The head control signals DIin-1, DIin-2, DIin-3, and DIin-4, the base drive signal dAin, and the voltage detection signal Vdet are input to the discharge control circuit 52 included in the liquid discharging module 20-*n*, the discharge control circuit 52 included in the liquid discharging module 20-*n* outputs the head control signals DIon-1, DIon-2, DIon-3, and DIon-4, and the base drive signal dAon, and the drive signal output circuit 54 included in the liquid discharging module 20-*n* outputs the drive signal COMn based on the base drive signal dAon. Further, in the liquid discharging module 20-*n*, the drive circuit substrate 700 and the print head 30 are electrically coupled with the connector CN1 which is a B-to-B connector. Each of the discharging modules 32-1 to 32-4 of the print head 30 of the liquid discharging module 20-*n* includes the plurality of discharging portions 600 that discharge the ink in response to the drive signal COMn and the drive signal selection circuit 200 that switches whether or not to supply the drive signal COMn to the plurality of discharging portions 600 based on the corresponding head control signals DIon-1 to DIon-4.

Here, in the following description, when it is not necessary to distinguish the discharging modules 32-1 to 32-4 from each other, the discharging modules 32-1 to 32-4 may be simply referred to as a discharging module 32. A description may be made on the assumption that the head control signal DIo1 as the head control signals DIo1-1 to DIo1-4 is input to the discharging module 32 included in the liquid discharging module 20-1, and the head control signal DIon as the head control signals DIon-1 to DIon-4 is input to the discharging module 32 included in the liquid discharging module 20-*n*. Further, a description may be made on the assumption that the head control signal DIo as the head control signals DIo-1, DIo-2, DIo-3, and DIo-4 is input to the discharging module 32 included in the liquid discharging module 20.

That is, a description may be made on the assumption that the drive signal selection circuit 200 of the discharging module 32 included in the liquid discharging module 20-1 outputs the drive signal VOUT corresponding to each of the plurality of discharging portions 600 by selecting or deselecting the signal waveform included in the drive signal COM1 based on the head control signal DIo1 in each of the periods defined based on the latch signal LATo and the change signal CHo, the drive signal selection circuit 200 of the discharging module 32 included in the liquid discharging module 20-*n* outputs the drive signal VOUT corresponding to each of the plurality of discharging portions 600 by selecting or deselecting the signal waveform included in the drive signal COMn based on the head control signal DIon in each of the periods defined based on the latch signal LATo and the change signal CHo, and the drive signal selection circuit 200 of the discharging module 32 included in the liquid discharging module 20 outputs the drive signal VOUT corresponding to each of the plurality of discharging portions 600 by selecting or deselecting the signal waveform included in the drive signal COM as the drive signals COM1 to COMn based on the head control signal DIo in each of the periods defined based on the latch signal LATo and the change signal CHo.

As described above, the liquid discharging apparatus 1 includes the print head 30 that discharges the ink, the drive circuit module 50 that is electrically coupled to the print head 30, the discharge control module 10 that controls the operation of the liquid discharging module 20 including the print head 30 and the drive circuit module 50, and the control unit 2 that controls the operation of the head unit 3 including the liquid discharging module 20 and the discharge control module 10. When the head unit 3 is driven using the voltage signals VHV and VMV, which is input from the control unit 2, as the power supply voltages and discharges the ink at a timing based on the print data signal pDATA, an image corresponding to the print data signal pDATA, that is, an image in accordance with the image data DATA is formed on the medium P.

1.4 Functional Configuration of Discharge Control Circuit

Figure 9:
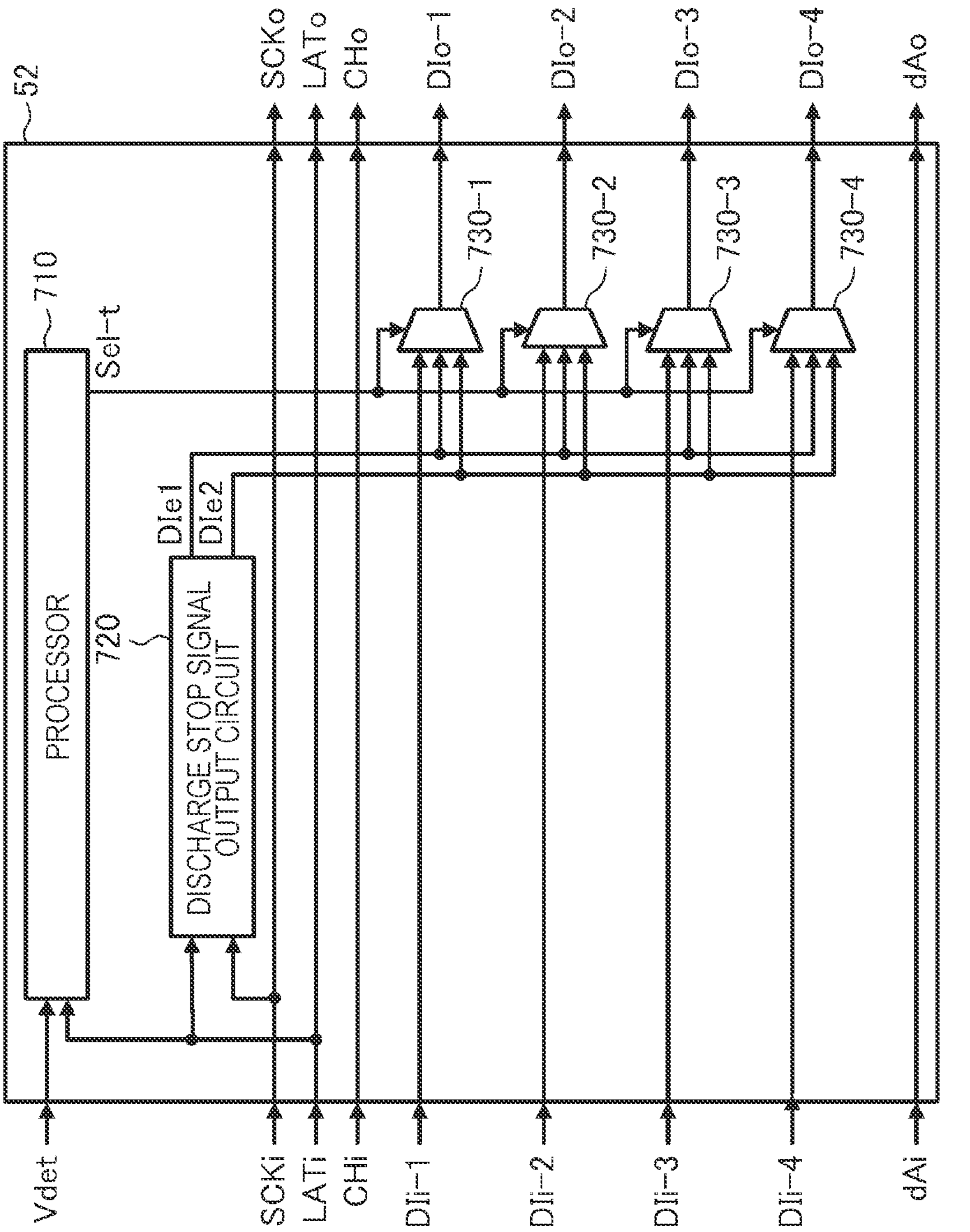
FIG. 9 is a diagram illustrating a configuration of a discharge control circuit.

Next, the configuration and operation of the discharge control circuit 52 included in the liquid discharging module 20 will be described. FIG. 9 is a diagram illustrating the configuration of the discharge control circuit 52. As illustrated in FIG. 9, the clock signal SCKi, the latch signal LATi, the change signal CHi, the head control signals DIi-1 to DIi-4, the base drive signal dAi, and the voltage detection signal Vdet are input to the discharge control circuit 52 included in the liquid discharging module 20. The discharge control circuit 52 included in the liquid discharging module 20 generates and outputs the clock signal SCKo, the latch signal LATo, the change signal CHo, the head control signals DIo-1 to DIo-4, which are input to the drive signal selection circuit 200, and the base drive signal dAo, which is input to the drive signal output circuit 54.

Here, the discharge control circuit 52 of the first embodiment outputs the clock signal SCKi as the clock signal SCKo, outputs the latch signal LATi as the latch signal LATo, outputs the change signal CHi as the change signal CHo, and outputs the base drive signal dAi as the base drive signal dAo. That is, in the first embodiment, each of the clock signal SCKi, the latch signal LATi, the change signal CHi, and the base drive signal dAi, which is input to the discharge control circuit 52, and each of the clock signal SCKo, the latch signal LATo, the change signal CHo, and the base drive signal dAo, which is output by the discharge control circuit 52, are the same signal.

As illustrated in FIG. 9, the discharge control circuit 52 includes a processor 710, a discharge stop signal output circuit 720, and multiplexers 730-1 to 730-4.

The voltage detection signal Vdet and the latch signal LATi are input to the processor 710. The processor 710 generates a signal selection signal Sel-t for controlling signal selection in each of the multiplexers 730-1 to 730-4, which will be described later. Then, the processor 710 outputs the generated signal selection signal Sel-t to the multiplexers 730-1 to 730-4 at a timing defined based on the voltage detection signal Vdet and the latch signal LATi.

The latch signal LATi and the clock signal SCKi are input to the discharge stop signal output circuit 720. The discharge stop signal output circuit 720 generates discharge stop processing signals DIe1 and DIe2 synchronized with the clock signal SCKi for each cycle tp defined based on the latch signal LATi and outputs the discharge stop processing signals DIe1 and DIe2 to the multiplexers 730-1 to 730-4. That is, the discharge control circuit 52 includes the discharge stop signal output circuit 720 that outputs the discharge stop processing signals DIe1 and DIe2.

The head control signal DIi-1, which is input to the discharge control circuit 52, the discharge stop processing signals DIe1 and DIe2, which are output by the discharge stop signal output circuit 720, and the signal selection signal Sel-t, which is output by the processor 710, are input to the multiplexer 730-1. The multiplexer 730-1 selects any one of the head control signal DIi-1, the discharge stop processing signal DIe1, and the discharge stop processing signal DIe2 in response to the input signal selection signal Sel-t, and outputs the selected signal as the head control signal DIo-1. That is, the discharge control circuit 52 includes the multiplexer 730-1 that receives the head control signal DIi-1 and the discharge stop processing signals DIe1 and DIe2, and that selects whether to output the head control signal DIi-1 as the head control signal DIo-1, to output the discharge stop processing signal DIe1 as the head control signal DIo-1, or to output the discharge stop processing signal DIe2 as the head control signal DIo-1.

The head control signal DIi-2, which is input to the discharge control circuit 52, the discharge stop processing signals DIe1 and DIe2, which are output by the discharge stop signal output circuit 720, and the signal selection signal Sel-t, which is output by the processor 710, are input to the multiplexer 730-2. The multiplexer 730-2 selects any one of the head control signal DIi-2, the discharge stop processing signal DIe1, and the discharge stop processing signal DIe2 in response to the input signal selection signal Sel-t, and outputs the selected signal as the head control signal DIo-2. That is, the discharge control circuit 52 includes the multiplexer 730-2 that receives the head control signal DIi-2 and the discharge stop processing signals DIe1 and DIe2, and that selects whether to output the head control signal DIi-2 as the head control signal DIo-2, to output the discharge stop processing signal DIe1 as the head control signal DIo-2, or to output the discharge stop processing signal DIe2 as the head control signal DIo-2.

The head control signal DIi-3, which is input to the discharge control circuit 52, the discharge stop processing signals DIe1 and DIe2, which are output by the discharge stop signal output circuit 720, and the signal selection signal Sel-t, which is output by the processor 710, are input to the multiplexer 730-3. The multiplexer 730-3 selects any one of the head control signal DIi-3, the discharge stop processing signal DIe1, and the discharge stop processing signal DIe2 in response to the input signal selection signal Sel-t, and outputs the selected signal as the head control signal DIo-3. That is, the discharge control circuit 52 includes the multiplexer 730-3 that receives the head control signal DIi-3 and the discharge stop processing signals DIe1 and DIe2, and that selects whether to output the head control signal DIi-3 as the head control signal DIo-3, to output the discharge stop processing signal DIe1 as the head control signal DIo-3, or to output the discharge stop processing signal DIe2 as the head control signal DIo-3.

The head control signal DIi-4, which is input to the discharge control circuit 52, the discharge stop processing signals DIe1 and DIe2, which are output by the discharge stop signal output circuit 720, and the signal selection signal Sel-t, which is output by the processor 710, are input to the multiplexer 730-4. The multiplexer 730-4 selects any one of the head control signal DIi-4, the discharge stop processing signal DIe1, and the discharge stop processing signal DIe2 in response to the input signal selection signal Sel-t, and outputs the selected signal as the head control signal DIo-4. That is, the discharge control circuit 52 includes the multiplexer 730-4 that receives the head control signal DIi-4 and the discharge stop processing signals DIe1 and DIe2, and that selects whether to output the head control signal DIi-4 as the head control signal DIo-4, to output the discharge stop processing signal DIe1 as the head control signal DIo-4, or to output the discharge stop processing signal DIe2 as the head control signal DIo-4.

The discharge control circuit 52 configured as described above outputs the clock signal SCKi as the clock signal SCKo, outputs the latch signal LATi as the latch signal LATo, outputs the change signal CHo as the change signal CHo, outputs the base drive signal dAi as the base drive signal dAo, selects any one of the head control signal DIi-1, the discharge stop processing signal DIe1, and the discharge stop processing signal DIe2 and outputs the selected signal as the head control signal DIo-1, selects any one of the head control signal DIi-2, the discharge stop processing signal DIe1, and the discharge stop processing signal DIe2 and outputs the selected signal as the head control signal DIo-2, selects any one of the head control signal DIi-3, the discharge stop processing signal DIe1, and the discharge stop processing signal DIe2 and outputs the selected signal as the head control signal DIo-3, and selects any one of the head control signal DIi-4, the discharge stop processing signal DIe1, and the discharge stop processing signal DIe2 and outputs the selected signal as the head control signal DIo-4, based on a logic level of the voltage detection signal Vdet.

Here, the multiplexers 730-1 to 730-4 differ only in the input signals, and all have the same configuration. Therefore, in the following description, when it is not necessary to distinguish the multiplexers 730-1 to 730-4, the multiplexers 730-1 to 730-4 are referred to as a multiplexer 730. A description will be made on the assumption that the multiplexer 730 selects any one of the head control signal DIi as the head control signals DIi-1 to DIi-4, the discharge stop processing signal DIe1, and the discharge stop processing signal DIe2 and outputs the head control signal DIo as the head control signals DIo-1 to DIo-4.

1.5 Functional Configuration of Drive Signal Output Circuit

Next, the configuration and operation of the drive signal output circuit 54 included in each of the liquid discharging modules 20-1 to 20-*n* will be described. Here, as described above, all the drive signal output circuits 54 included in each of the liquid discharging modules 20-1 to 20-*n* have the same configuration. Therefore, in the following description, a description will be made by illustrating the drive signal output circuit 54 included in the liquid discharging module 20. At that time, the drive signal output circuit 54 included in the liquid discharging module 20 outputs the drive signal COM as the drive signals COM1 to COMn and outputs the reference voltage signal VBS as the reference voltage signals VBS1 to VBSn by amplifying the signal waveform defined based on the base drive signal dAo as the base drive signals dAo1 to dAon.

Figure 10:
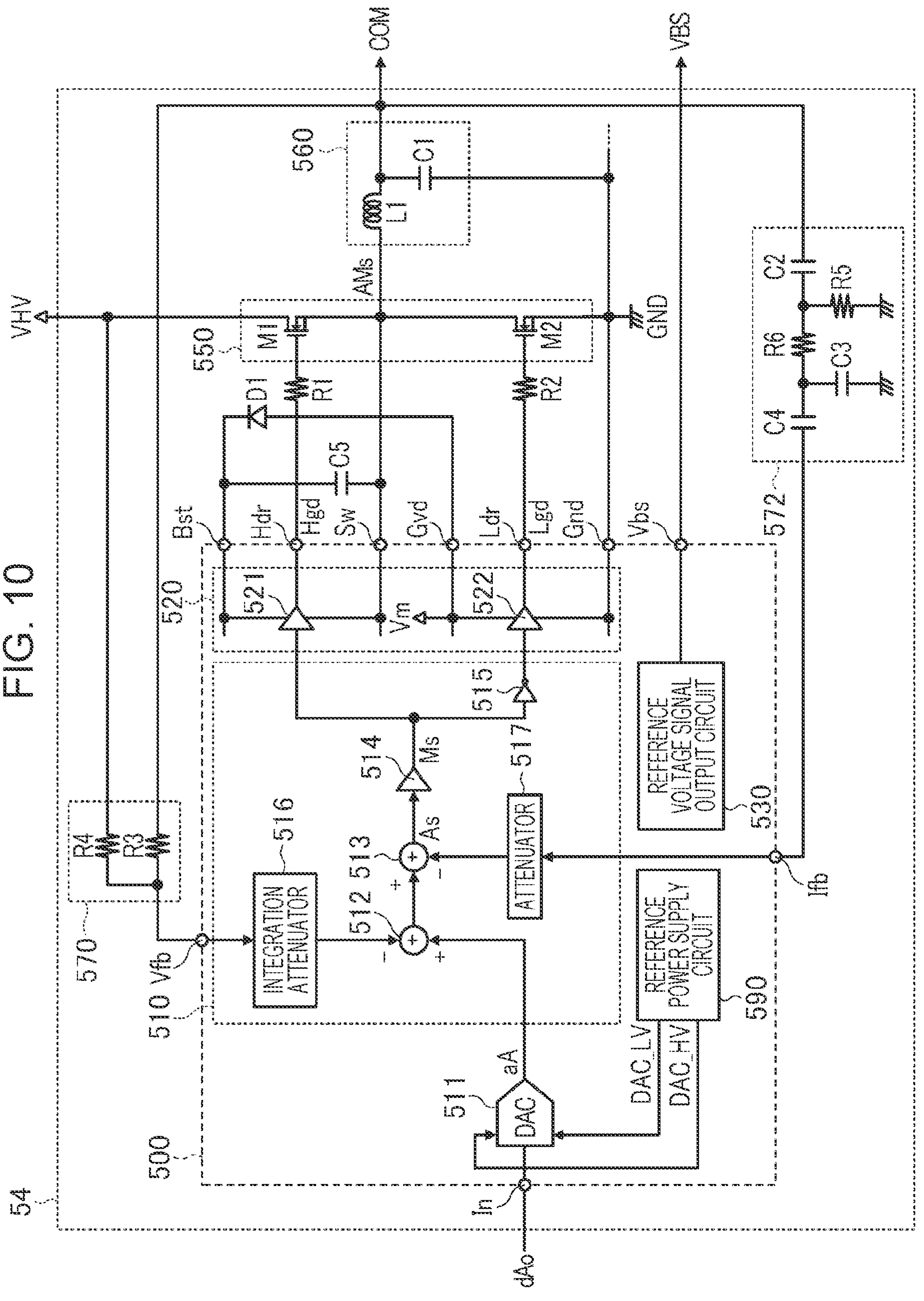
FIG. 10 is a diagram illustrating a configuration of a drive signal output circuit.

FIG. 10 is a diagram illustrating a configuration of the drive signal output circuit 54. The drive signal output circuit 54 includes an integrated circuit 500, an amplification circuit 550, a demodulation circuit 560, feedback circuits 570 and 572, and other electronic components.

The integrated circuit 500 includes a plurality of terminals including a terminal In, a terminal Bst, a terminal Hdr, a terminal Sw, a terminal Gvd, a terminal Ldr, a terminal Gnd, a terminal Vbs, a terminal Vfb, and a terminal Ifb. The integrated circuit 500 is electrically coupled to an externally provided substrate (not illustrated) via the plurality of terminals. Further, the integrated circuit 500 includes a digital to analog converter (DAC) 511, a modulation circuit 510, a gate drive circuit 520, and a reference power supply circuit 590.

The reference power supply circuit 590 generates a voltage signal DAC_HV and a voltage signal DAC_LV, and supplies the voltage signals DAC_HV and DAC_LV to a DAC 511. Further, the digital base drive signal dAo for defining the signal waveform of the drive signal COM is input to the DAC 511. The DAC 511 converts the input base drive signal dAo into a base drive signal aA that is an analog signal of a voltage value between a voltage value of the voltage signal DAC_HV and a voltage value of the voltage signal DAC_LV, and outputs the base drive signal aA to the modulation circuit 510. That is, the maximum value of the voltage amplitude of the base drive signal aA is defined based on the voltage signal DAC_HV, and the minimum value is defined based on the voltage signal DAC_LV. The signal obtained by amplifying the base drive signal aA output by the DAC 511 corresponds to the drive signal COM.

The modulation circuit 510 generates a modulation signal Ms obtained by modulating the base drive signal aA and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via the terminal Vfb and outputs the drive signal COM to an input end of the adder 512 on the − side. The base drive signal aA is input to an input end of the adder 512 on the + side. The adder 512 outputs a voltage obtained by subtracting and integrating a voltage input to the input end on the − side from a voltage input to the input end on the + side to an input end of the adder 513 on the + side.

The attenuator 517 outputs a voltage obtained by attenuating a high frequency component of the drive signal COM input via the terminal Ifb to an input end of the adder 513 on the − side. The voltage output from the adder 512 is input to the input end of the adder 513 on the + side. The adder 513 generates a voltage signal As obtained by subtracting the voltage input to the input end on the − side from the voltage input to the input end on the + side and outputs a voltage signal As to the comparator 514.

The comparator 514 outputs the modulation signal Ms obtained by pulse-modulating the voltage signal As input from the adder 513. Specifically, the comparator 514 generates and outputs the modulation signal Ms that becomes an H level in a case where the voltage value of the voltage signal As input from the adder 513 is equal to or higher than a predetermined threshold value Vth1 when the voltage value is increased, and that becomes an L level in a case where the voltage value of the voltage signal As is less than a predetermined threshold value Vth2 when the voltage value is decreased. Here, the threshold values Vth1 and Vth2 are set in a relationship of threshold value Vth1 threshold value Vth2.

The modulation signal Ms output by the comparator 514 is input to a gate driver 521 included in the gate drive circuit 520, and is also input to a gate driver 522 included in the gate drive circuit 520 via the inverter 515. That is, a signal having a relationship in which the logic levels are exclusive is input to the gate driver 521 and the gate driver 522. Here, the relationship in which the logic levels are exclusive includes that the logic levels of the signals input to the gate driver 521 and the gate driver 522 do not simultaneously be an H level. Therefore, the modulation circuit 510 may include a timing control circuit controlling timings of the modulation signal Ms input to the gate driver 521 and the signal in which the logic level of the modulation signal Ms input to the gate driver 522 is inverted, instead of or in addition to the inverter 515.

The gate drive circuit 520 includes the gate driver 521 and the gate driver 522. The gate driver 521 level-shifts the modulation signal Ms output from the comparator 514 to generate an amplified control signal Hgd and output the amplified control signal Hgd from the terminal Hdr.

Specifically, within a power supply voltage for the gate driver 521, a voltage is supplied to the high level side via the terminal Bst, and a voltage is supplied to the low level side via the terminal Sw. The terminal Bst is coupled to one end of a capacitor C5 and a cathode of a diode D1 for preventing a reverse flow. The terminal Sw is coupled to the other end of the capacitor C5. Further, an anode of the diode D1 is coupled to the terminal Gvd. A voltage signal Vm, which is a DC voltage of, for example, 7.5 V, output by a power supply circuit (not illustrated) is supplied to the terminal Gvd. That is, the voltage signal Vm is supplied to the anode of the diode D1. Therefore, the potential difference between the terminal Bst and the terminal Sw is approximately equal to the voltage value of the voltage signal Vm. As a result, the gate driver 521 generates the amplified control signal Hgd having a voltage value greater than that of the terminal Sw by the voltage signal Vm according to the input modulation signal Ms, and outputs the amplified control signal Hgd from the terminal Hdr.

The gate driver 522 operates on the lower potential side than the gate driver 521. The gate driver 522 level-shifts the signal in which the logic level of the modulation signal Ms output from the comparator 514 is inverted by the inverter 515 to generate an amplified control signal Lgd, and outputs the amplified control signal Lgd from the terminal Ldr.

Specifically, the voltage signal Vm is supplied to the high level side of the power supply voltage of the gate driver 522, and a ground potential GND is supplied to the low level side via the terminal Gnd. The gate driver 522 outputs, from the terminal Ldr, the amplified control signal Lgd having a voltage value greater than that of the terminal Gnd by the voltage signal Vm according to the signal in which the logic level of the input modulation signal Ms is inverted. Here, the ground potential GND is a reference potential of the drive signal output circuit 54, and is, for example, 0 V.

The amplification circuit 550 includes a transistor M1 and a transistor M2.

The transistor M1 is a surface mount-type field effect transistor (FET), and a voltage signal VHV is supplied to a drain of the transistor M1 as a power supply voltage for amplification of the amplification circuit 550. A gate of the transistor M1 is electrically coupled to one end of a resistor R1 and the other end of the resistor R1 is electrically coupled to the terminal Hdr of the integrated circuit 500. That is, the amplified control signal Hgd is input to the gate of the transistor M1. A source of the transistor M1 is electrically coupled to the terminal Sw of the integrated circuit 500.

The transistor M2 is a surface mount-type FET, and a drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplified control signal Lgd is input to the gate of the transistor M2. Further, the ground potential GND is supplied to a source of the transistor M2.

When the drain and the source of the transistor M1 are controlled to be non-conductive and the drain and the source of the transistor M2 are controlled to be conductive, the potential of the node to which the terminal Sw is coupled is the ground potential GND. Therefore, the voltage signal Vm is supplied to the terminal Bst. On the other hand, when the drain and the source of the transistor M1 are controlled to be conductive and the drain and the source of the transistor M2 are controlled to be non-conductive, the potential of the node to which the terminal Sw is coupled is the voltage value of the voltage signal VHV. Therefore, a voltage corresponding to a potential of a sum of the voltage value of the voltage signal VHV and the voltage value of the voltage signal Vm is supplied to the terminal Bst. That is, using the capacitor C5 as a floating power supply, the potential of the terminal Sw changes to the ground potential GND or the voltage value of the voltage signal VHV according to the operations of the transistor M1 and the transistor M2, and accordingly, the gate driver 521 that drives the transistor M1 generates the amplified control signal Hgd where an L level is the voltage value of the voltage signal VHV and an H level is the voltage value of the sum of the voltage value of the voltage signal VHV and the voltage value of the voltage signal Vm and output the amplified control signal Hgd to the gate of the transistor M1.

On the other hand, the gate driver 522 that drives the transistor M2 generates the amplified control signal Lgd of the voltage value where an L level is the ground potential GND and an H level is the voltage value of the voltage signal Vm, regardless of the operations of the transistor M1 and the transistor M2 and outputs the amplified control signal Lgd to the gate of the transistor M2.

The amplification circuit 550 configured as described above generates an amplified modulation signal AMs obtained by amplifying the modulation signal Ms based on the voltage signal VHV at a coupling point between the source of the transistor M1 and the drain of the transistor M2. The amplification circuit 550 outputs the generated amplified modulation signal AMs to the demodulation circuit 560.

The demodulation circuit 560 demodulates the amplified modulation signal AMS output by the amplification circuit 550 to generate the drive signal COM and output the drive signal COM from the drive signal output circuit 54. The demodulation circuit 560 includes an inductor Li and a capacitor C1. One end of the inductor Li is coupled to one end of the capacitor C1. The amplified modulation signal AMs is input to the other end of the inductor Li. Further, the ground potential GND is supplied to the other end of the capacitor C1. That is, in the demodulation circuit 560, the inductor Li and the capacitor C1 configure a low pass filter. The demodulation circuit 560 demodulates the amplified modulation signal AMs by smoothing the amplified modulation signal AMs with the low pass filter and outputs the demodulated signal as the drive signal COM. That is, the drive signal output circuit 54 outputs the drive signal COM from one end of the inductor Li included in the demodulation circuit 560 and one end of the capacitor C1.

The feedback circuit 570 includes a resistor R3 and a resistor R4. The drive signal COM is supplied to one end of the resistor R3, and the other end is coupled to the terminal Vfb and one end of the resistor R4. The voltage signal VHV is supplied to the other end of the resistor R4. As a result, the drive signal COM that has passed through the feedback circuit 570 is fed back to the terminal Vfb in a state of being pulled up by the voltage value of the voltage signal VHV.

The feedback circuit 572 includes capacitors C2, C3, and C4 and resistors R5 and R6. The drive signal COM is input to one end of the capacitor C2, and the other end is coupled to one end of the resistor R5 and one end of the resistor R6. The ground potential GND is supplied to the other end of the resistor R5. As a result, the capacitor C2 and the resistor R5 function as a high pass filter. Further, the other end of the resistor R6 is coupled to one end of the capacitor C4 and one end of the capacitor C3. The ground potential GND is supplied to the other end of the capacitor C3. As a result, the resistor R6 and the capacitor C3 function as a low pass filter. That is, the feedback circuit 572 includes a high pass filter and a low pass filter, and functions as a band pass filter through which a signal in a predetermined frequency range included in the drive signal COM passes.

The other end of the capacitor C4 is coupled to the terminal Ifb of the integrated circuit 500. As a result, of the high frequency components of the drive signal COM passing through the feedback circuit 572 that functions as the band pass filter, the signal in which the direct-current component is cut is fed back to the terminal Ifb.

The drive signal COM is a signal obtained by the demodulation circuit 560 smoothing the amplified modulation signal AMs based on the base drive signal dAo. The drive signal COM is integrated and subtracted via the terminal Vfb, and then fed back to the adder 512. As a result, the drive signal output circuit 54 self-oscillates at a frequency determined by the feedback delay and the feedback transfer function. However, the feedback path via the terminal Vfb has a large delay amount. Therefore, it may not be possible to raise the frequency of self-oscillation to such an extent that the accuracy of the drive signal COM can be sufficiently ensured only by feedback via the terminal Vfb. Therefore, by providing a path for feeding back the high frequency component of the drive signal COM via the terminal Ifb separately from the path via the terminal Vfb, the delay in the entire circuit is reduced. As a result, a frequency of the voltage signal As can be made high enough to sufficiently ensure the accuracy of the drive signal COM compared to a case where the path via the terminal Ifb does not exist.

Further, the integrated circuit 500 includes a reference voltage signal output circuit 530. The reference voltage signal output circuit 530 outputs the reference voltage signal VBS. The reference voltage signal output circuit 530 is generated by, for example, stepping down or boosting the voltage signal Vm based on the reference potential, using the band gap reference voltage generated in the integrated circuit 500 as the reference potential. Then, the reference voltage signal output circuit 530 outputs the generated reference voltage signal VBS from the drive signal output circuit 54 via the terminal Vbs.

As described above, the drive signal output circuit 54 generates the drive signal COM by class D amplifying the analog signal after performing digital/analog conversion of the input base drive signal dAo, outputs the generated drive signal COM, and generates and outputs the reference voltage signal VBS. The reference voltage signal output circuit 530 that generates the reference voltage signal VBS may have a configuration different from that of the drive signal output circuit 54, but has the same configuration as the drive signal output circuit 54 and is incorporated in one integrated circuit 500. Accordingly, the circuit size of the drive signal output circuit 54 and the drive circuit module 50 including the drive signal output circuit 54 can be reduced.

Figure 11:
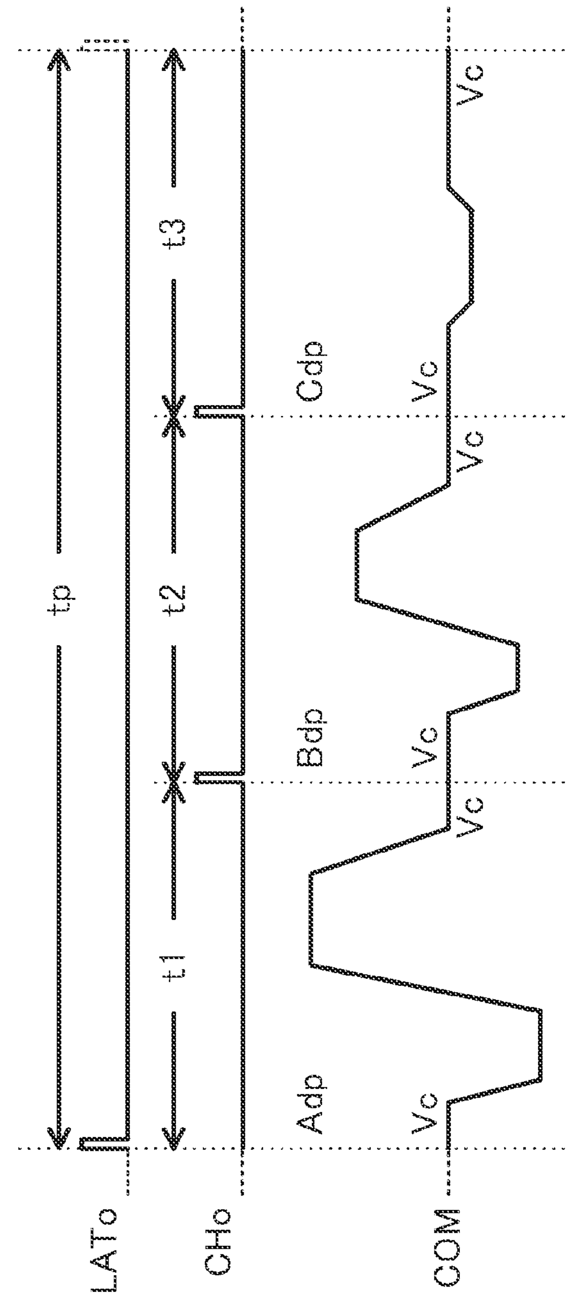
FIG. 11 is a diagram illustrating an example of a signal waveform of a drive signal COM.

Here, an example of the signal waveform of the drive signal COM output by the drive signal output circuit 54 will be described. FIG. 11 is a diagram illustrating an example of the signal waveform of the drive signal COM. As illustrated in FIG. 11, the drive signal COM includes the signal waveform in which a trapezoidal waveform Adp disposed in a period t1 after the latch signal LATo rises until the change signal CHo rises, a trapezoidal waveform Bdp disposed in the period t2 after the change signal CHo rises until the next change signal CHo rises, and a trapezoidal waveform Cdp disposed in the period t3 after the change signal CHo rises until the latch signal LATo rises, are continuous.

The trapezoidal waveform Adp is a signal waveform for driving the piezoelectric element 60 included in the discharging portion 600 to discharge a predetermined amount of ink from the nozzle 651 included in the discharging portion 600, the trapezoidal waveform Bdp is a signal waveform for driving the piezoelectric element 60 included in the discharging portion 600 to discharge a smaller amount of ink than the predetermined amount from the nozzle 651 included in the discharging portion 600, the trapezoidal waveform Cdp is a signal waveform for driving the piezoelectric element 60 included in the discharging portion 600 so as not to discharge ink from the nozzle 651 included in the discharging portion 600. Here, the trapezoidal waveform Cdp is a signal waveform for preventing an increase in ink viscosity by appropriately vibrating the ink in the vicinity of the opening portion of the corresponding nozzle 651. In the following description, when the trapezoidal waveform Cdp is supplied to the piezoelectric element 60, an operation of vibrating the ink in the vicinity of the opening portion of the nozzle 651 may be referred to as micro-vibration. In the following description, an amount of ink discharged when the trapezoidal waveform Adp is supplied to the discharging portion 600 may be referred to as a medium amount, and an amount of ink discharged when the trapezoidal waveform Bdp is supplied to the discharging portion 600 may be referred to as a small amount.

Furthermore, the voltage values at the start timing and end timing of each of the trapezoidal waveforms Adp, Bdp, and Cdp are the same voltage Vc in all cases. In other words, each of the trapezoidal waveforms Adp, Bdp, and Cdp is started at the voltage Vc and is ended at the voltage Vc.

As described above, the drive signal output circuit 54 outputs the drive signal COM including the trapezoidal waveforms Adp, Bdp, and Cdp as illustrated in FIG. 11. When the trapezoidal waveforms Adp, Bdp, and Cdp included in the drive signal COM are supplied to the discharging portion 600, the ink is discharged from the corresponding discharging portion 600. That is, the signal waveform of the drive signal COM illustrated in FIG. 11 is an example of a signal waveform for discharging the ink from the discharging portion 600.

Here, the signal waveform of the drive signal COM output by the drive signal output circuit 54 is not limited to a shape of the waveform described above, and any signal waveform can be used depending on the type or physical properties of the ink to be discharged and the specification environment of the liquid discharging apparatus 1. Further, the drive signal output circuit 54 is capable of outputting the drive signal COM having any signal waveform in response to the input base drive signal dAo and can also output the drive signal COM that includes the drive signal COM including a signal waveform having a constant voltage value or a signal waveform in which the voltage value gradually decreases or increases toward a predetermined value, for example.

1.6 Functional Configuration of Drive Signal Selection Circuit

Next, the configuration and operation of the drive signal selection circuit 200 included in each of the liquid discharging modules 20-1 to **20-*n* will be described. Here, all the drive signal selection circuit 200 included in each of the liquid discharging modules 20-1 to 20-*n* have the same configuration. Therefore, in the following description, a description will be made by illustrating the drive signal selection circuit 200 included in the discharging module 32 of the liquid discharging module 20. That is, the drive signal selection circuit 200 included in the discharging module 32 of the liquid discharging module 20 receives the clock signal SCKo, the latch signal LATo, the change signal CHo, the head control signal DIo, and the drive signal COM, and generates the drive signal VOUT corresponding to each of the plurality of discharging portions 600 by selecting or deselecting the signal waveform of the drive signal COM. Further, in the following description, a description will be made on the assumption that the discharging module 32 of the liquid discharging module 20 includes m discharging portions 600 as the plurality of discharging portions 600. In the following description, when the m discharging portions 600 are distinguished, the m discharging portions 600 may be referred to as discharging portions 600[1] to 600**[*m*].

Figure 12:
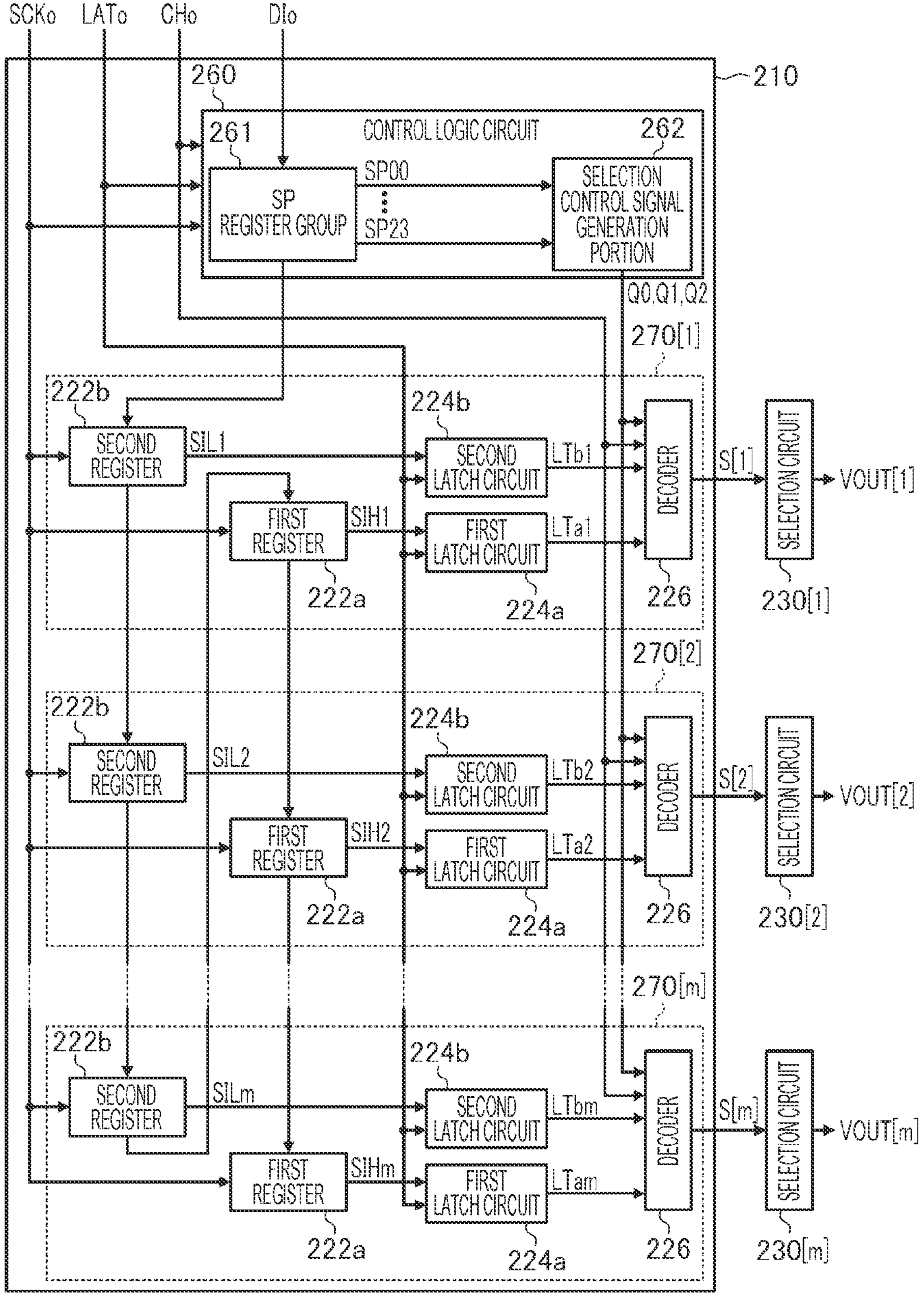
FIG. 12 is a diagram illustrating a configuration of a drive signal selection circuit.

FIG. 12 is a diagram illustrating a configuration of the drive signal selection circuit 200. As illustrated in FIG. 12, the drive signal selection circuit 200 includes a selection control circuit 210 and selection circuits 230[1] to 230[*m*] respectively corresponding to the discharging portions 600[1] to 600[*m*].

The clock signal SCKo, the latch signal LATo, the change signal CHo, and the head control signal DIo are input to the selection control circuit 210. The selection control circuit 210 selects the signal waveform included in the drive signal COM based on the input clock signal SCKo, latch signal LATo, change signal CHo, and head control signal DIo, and generates selection signals S[1] to S[m] for switching whether or not to output the drive signal VOUT. The selection signals S[1] to S[m] generated by the selection control circuit 210 are input to the corresponding selection circuits 230[1] to 230[m]. The selection circuits 230[1] to 230[m] generate the drive signals VOUT[1] to VOUT[m] corresponding to the discharging portions 600[1] to 600[m] by selecting or deselecting the signal waveform of the drive signal COM based on the input selection signals S[1] to S[m], and outputs the drive signals VOUT[1] to VOUT[m] to the corresponding discharging portions 600[1] to 600[m]. Here, all the selection circuits 230[1] to 230[m] have the same configuration, and the selection circuits 230[1] to 230[m] corresponding to the discharging portion 600 among the discharging portions 600[1] to 600[m] will be referred to as the selection circuit 230. In this case, a description will be made on the assumption that the selection circuit 230 selects or deselects the signal waveform of the drive signal COM based on the selection signal S among the selection signals S[1] to S[m].

Figure 13:
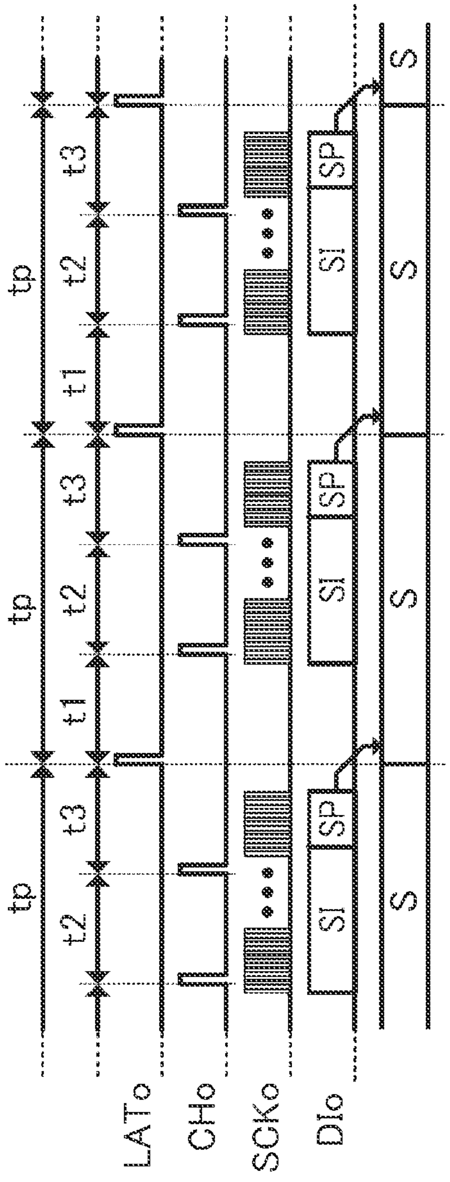
FIG. 13 is a diagram for describing a relationship between a latch signal LATo, a change signal CHo, a clock signal SCKo, and a head control signal DIo, and a selection signal S.

In describing the details of the operation of the selection control circuit 210, outlines of the latch signal LATo, the change signal CHo, the clock signal SCKo, and the head control signal DIo input to the selection control circuit 210 will be described. FIG. 13 is a diagram for describing a relationship between the latch signal LATo, the change signal CHo, the clock signal SCKo, and the head control signal DIo, and the selection signal S.

The latch signal LATo is a pulse signal based on a signal indicating a scanning position of the carriage 8 of the head unit 3 and is used for defining a cycle tp for forming dots on the medium P. The change signal CHo is a pulse signal for defining a switching timing of whether or not to supply the signal waveform included in the drive signal COM to the discharging portion 600, and divides the cycle tp into periods t1, t2, and t3. The drive signal selection circuit 200 generates the drive signal VOUT by selecting or deselecting the signal waveform included in the drive signal COM in each of the periods t1, t2, and t3 into which the cycle tp that is defined by the latch signal LATo is divided by the change signal CHo, and outputs the drive signal VOUT to the discharging portion 600.

The head control signal DIo serially includes a discharge control signal SI and a waveform selection signal SP. The discharge control signal SI is used for individually defining a discharging amount of the ink discharged by driving the piezoelectric element 60 of the discharging portion 600 for each of the discharging portions 600[1] to 600[m]. Further, the waveform selection signal SP is used for defining a relationship between the logic level of the selection signal S, which is output in each of the periods t1, t2, and t3, and the discharge control signal SI.

As illustrated in FIG. 13, the head control signal DIo is input to the selection control circuit 210 in synchronization with the clock signal SCKo in the cycle tp before the latch signal LATo rises. In this case, the head control signal DIo input to the selection control circuit 210 is stored in a register corresponding to each of the discharging portions 600[1] to 600[m]. The head control signal DIo stored in the register is latched all at once at a rising edge of the latch signal LATo. That is, at the timing of the start of the cycle tp, the head control signal DIo stored in the register is latched all at once. The selection control circuit 210 generates the selection signal S corresponding to each of the periods t1, t2, and t3 in the cycle tp after the latch signal LATo rises, based on the head control signal DIo latched all at once, and outputs the selection signal S to the selection circuit 230.

Figure 14:
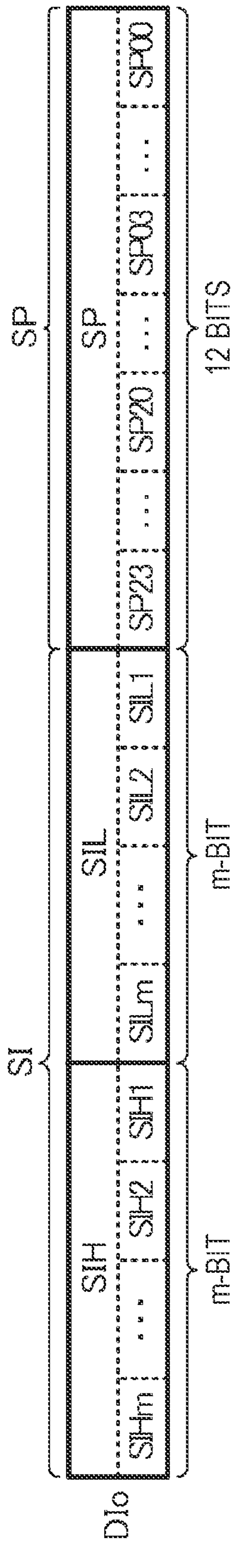
FIG. 14 is a diagram illustrating an example of a configuration of data of the head control signal DIo.

Here, details of the head control signal DIo including the discharge control signal SI and the waveform selection signal SP will be described. FIG. 14 is a diagram illustrating an example of a configuration of data of the head control signal DIo. As illustrated in FIG. 14, the head control signal DIo includes the discharge control signal SI and the waveform selection signal SP.

The discharge control signal SI is a signal for defining the discharging amount of the ink discharged by driving the piezoelectric element 60 included in the discharging portion 600, and includes upper discharge data SIH and lower discharge data SIL. That is, the discharge control signal SI includes 2-bit data of the upper discharge data SIH and the lower discharge data SIL for controlling driving of the piezoelectric element 60, corresponding to each of the discharging portions 600[1] to 600[m] including the piezoelectric element 60.

Specifically, the discharge control signal SI serially includes m-bit upper discharge data SIH corresponding to each of the discharging portions 600[1] to 600[m] in an order of the upper discharge data SIH corresponding to the discharging portion 600[m], the upper discharge data SIH corresponding to the discharging portion 600[m−1], . . . , the upper discharge data SIH corresponding to the discharging portion 600[1], and serially includes, following the upper discharge data SIH, m-bit lower discharge data SIL corresponding to each of the discharging portions 600[1] to 600[m] in an order of the lower discharge data SIL corresponding to the discharging portion 600[m], the lower discharge data SIL corresponding to the discharging portion 600[m−1], . . . , the lower discharge data SIL corresponding to the discharging portion 600[1]. That is, the discharge control signal SI is a 2 m-bit signal serially including m-bit upper discharge data SIH corresponding to the discharging portions 600[m] to 600[1] and m-bit lower discharge data SIL corresponding to the discharging portions 600[m] to 600[1]. The discharging amount of the ink discharged by driving the piezoelectric element 60 included in the discharging portions 600[p] (p is any one from 1 to m) is defined by 2 bits of the upper discharge data SIH corresponding to the discharging portion 600[p] and the lower discharge data SIL corresponding to the discharging portion 600[p].

Here, in the following description, there is a case where the upper discharge data SIH corresponding to the discharging portion 600[p] is referred to as an upper discharge data SIHp, and the lower discharge data SIL corresponding to the discharging portion 600[p] is referred to as a lower discharge data SILp. Here, in the following description, in some cases, the upper discharge data SIH and the lower discharge data SIL corresponding to the discharging portion 600 will be collectively referred to as discharge data [SIH, SIL], and the upper discharge data SIHp and the lower discharge data SILp corresponding to the discharging portion 600[p] will be collectively referred to as discharge data [SIHp, SILp]. That is, the discharging amount of the ink discharged by driving the piezoelectric element 60 included in the discharging portion 600[p] is defined based on the discharge data [SIHp, SILp].

The waveform selection signal SP is a signal for defining a drive pattern of the piezoelectric element 60 corresponding to the discharge data [SIH, SIL] in each of the periods t1, t2, and t3, and is used for defining a logic level of the selection signal S output in each of the periods t1, t2, and t3 corresponding to the discharge data [SIH, SIL]. The waveform selection signal SP in the first embodiment is a 12-bit signal including setting information SP00 to SP03, SP10 to SP13, and SP20 to SP23.

Specifically, the waveform selection signal SP serially includes the setting information SP00 to SP03 for defining a drive pattern of the piezoelectric element 60 in the period t1 determined by the discharge data [SIH, SIL], the setting information SP10 to SP13 for defining a drive pattern of the piezoelectric element 60 in the period t2 determined by the discharge data [SIH, SIL], and the setting information SP20 to SP23 for defining a drive pattern of the piezoelectric element 60 in the period t3 determined by the discharge data [SIH, SIL] in an order of the setting information SP23, SP22, SP21, SP20, SP13, SP12, SP11, SP10, SP03, SP02, SP01, and SP00. The waveform selection signal SP is not limited to a 12-bit signal, but may be a signal of 12 bits or more or a signal of 12 bits or less according to the number of periods into which the cycle tp is divided by the change signal CH or the number of drive patterns of the piezoelectric element 60 defined by the discharge control signal SI.

Returning to FIG. 12, the selection control circuit 210 includes a control logic circuit 260 and selection signal output portions 270[1] to 270[*m*] provided to correspond to the discharging portions 600[1] to 600[*m*]. The selection control circuit 210 generates the selection signals S[1] to S[m] respectively corresponding to the discharging portions 600[1] to 600[*m*] based on the head control signal DIo propagating in synchronization with the clock signal SCKo at a timing defined based on the input latch signal LATo and change signal CHo, and outputs the selection signals S[1] to S[m] to the corresponding selection circuits 230[1] to 230[*m*].

The control logic circuit 260 includes an SP register group 261 and a selection control signal generation portion 262. The SP register group 261 includes a plurality of serially coupled registers and configures a so-called shift register that causes the head control signal DIo that is input in synchronization with the clock signal SCK to sequentially propagate to the subsequent stage registers. When the supply of the clock signal SCKo is stopped, the SP register group 261 stores the setting information SP00 to SP23 included in the waveform selection signal SP in the head control signal DIo.

The selection control signal generation portion 262 latches the setting information SP00 to SP23 stored in the SP register group 261 at the rising edge of the latch signal LATo. The selection control signal generation portion 262 generates selection control signals Q0, Q1, and Q2 by translating the latched setting information SP00 to SP23, and outputs the selection control signals Q0, Q1, and Q2 to a decoder 226 of each of the selection signal output portions 270[1] to 270[*m*]. The selection control signal Q0 includes the setting information SP00, SP01, SP02, and SP03, and is used for defining a logic level of the selection signal S output from the selection control circuit 210 during the period t1. The selection control signal Q1 includes the setting information SP10, SP11, SP12, and SP13, and is used for defining a logic level of the selection signal S output from the selection control circuit 210 during the period t2. The selection control signal Q2 includes the setting information SP20, SP21, SP22, and SP23, and is used for defining a logic level of the selection signal S output from the selection control circuit 210 during the period t3. Here, in the following description, in some cases, the selection control signal Q0 including the setting information SP00, SP01, SP02, and SP03 will be referred to as a selection control signal Q0[SP00, SP01, SP02, SP03], the selection control signal Q1 including the setting information SP10, SP11, SP12, and SP13 will be referred to as a selection control signal Q1[SP10, SP11, SP12, SP13], and the selection control signal Q2 including the setting information SP20, SP21, SP22, and SP23 will be referred to as a selection control signal Q2[SP20, SP21, SP22, SP23].

Each of the selection signal output portions 270[1] to 270[*m*] includes a first register 222*a*, a second register 222*b*, a first latch circuit 224*a*, a second latch circuit 224*b*, and the decoder 226.

The second register 222*b* included in each of the selection signal output portions 270[1] to 270[*m*] is serially coupled to the subsequent stage of the SP register group 261 including a plurality of registers, and the first register 222*a* included in each of the selection signal output portions 270[1] to 270[*m*] is serially coupled to the subsequent stage of the m second registers 222*b*, which are serially coupled to each other.

Specifically, the second register 222*b* included in the selection signal output portion 270[1] is coupled to the subsequent stage of the SP register group 261, and the second register 222*b* included in the selection signal output portion 270[2], the second register 222*b* included in the selection signal output portion 270[3], . . . , and the second register 222*b* included in the selection signal output portion 270[*m*] are serially coupled in this order to the subsequent stage of the second register 222*b* included in the selection signal output portion 270[1]. The first register 222*a* included in the selection signal output portion 270[1] is coupled to the subsequent stage of the second register 222*b* included in the selection signal output portion 270[*m*]. The first register 222*a* included in the selection signal output portion 270[2], the first register 222*a* included in the selection signal output portion 270[3], . . . , and the first registers 222*a* included in the selection signal output portion 270[*m*] are serially coupled in this order to the subsequent stage of the first register 222*a* included in the selection signal output portion 270[1].

That is, the SP register group 261, the m second registers 222*b* respectively included in the selection signal output portions 270[1] to 270[*m*], and the m first registers 222*a* respectively included in the selection signal output portions 270[1] to 270[*m*] configure a shift register. The head control signal DIo input to the SP register group 261 propagates to the subsequent stage in the order of the m second registers 222*b* respectively included in the selection signal output portions 270[1] to 270[*m*] and the m first registers 222*a* respectively included in the selection signal output portions 270[1] to 270[*m*] in synchronization with the clock signal SCKo. Thereafter, when the supply of the clock signal SCKo is stopped, the lower discharge data SILp corresponding to the discharging portion 600[*p*] is stored in the second register 222*b* included in the selection signal output portion 270[*p*], and the upper discharge data SIHp corresponding to the discharging portion 600[*p*] is stored in the first register 222*a* included in the selection signal output portion 270[*p*].

The upper discharge data SIH stored in the first register 222*a* included in each of the selection signal output portions 270[1] to 270[*m*] is latched by the corresponding first latch circuit 224*a* at the rising edge of the latch signal LATo, and the lower discharge data SIL stored in the second register 222*b* included in each of the selection signal output portions 270[1] to 270[*m*] is latched by the corresponding second latch circuit 224*b* at the rising edge of the latch signal LATo. The first latch circuit 224*a* outputs the latched upper discharge data SIH to the decoder 226 as latch data LTa, and the second latch circuit 224*b* outputs the latched lower discharge data SIL to the decoder 226 as latch data LTb.

Here, in the following description, in some cases, the latch data LTa output by the first latch circuit 224*a* included in the selection signal output portion 270[*p*] will be referred to as latch data LTap, and the latch data LTb output by the second latch circuit 224*b* included in the selection signal output portion 270[*p*] will be referred to as latch data LTbp. In some cases, the latch data LTa and LTb will be collectively referred to as latch data [LTa, LTb], and the latch data LTap and LTbp corresponding to the selection signal output portion 270[*p*] will be collectively referred to as latch data [LTap, LTbp].

The selection control signal Q0[SP00, SP01, S0O2, SP03], the selection control signal Q1[SP10, SP11, SP12, SP13], and the selection control signal Q2[SP20, SP21, SP22, SP23] output by the selection control signal generation portion 262 are input in common to the decoder 226 included in each of the selection signal output portions 270[1] to 270[*m*], and the latch data [LTa, LTb] output by the corresponding first latch circuit 224*a* and second latch circuit 224*b* are input thereto. That is, the selection control signal Q0[SP00, SP01, SP02, SP03], the selection control signal Q1[SP10, SP11, SP12, SP13], and the selection control signal Q2[SP20, SP21, SP22, SP23] output by the selection control signal generation portion 262, and the latch data [LTap, LTbp] corresponding to the discharge data [SIHp, SILp] are input to the decoder 226 included in the selection signal output portion 270[*p*]. The decoder 226 included in the selection signal output portion 270[*p*] generates the selection signal S[p] by decoding the latch data [LTap, LTbp] based on the selection control signals Q0, Q1, and Q2, and outputs the selection signal S[p] to the selection circuit 230[*p*].

Figures 15, 16:
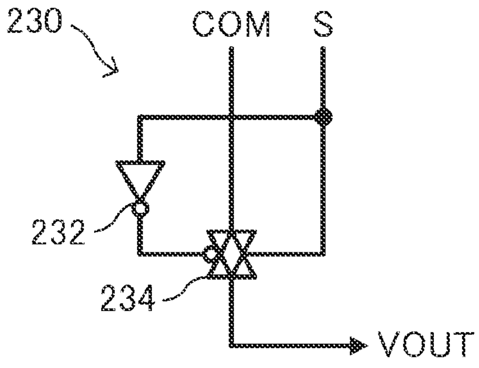
FIG. 15 is a diagram illustrating a decoding content of a decoder.
FIG. 16 is a diagram illustrating a configuration of the selection circuit corresponding to a piezoelectric element.

FIG. 15 is a diagram illustrating a decoding content of the decoder 226 based on the selection control signals Q0, Q1, and Q2. As illustrated in FIG. 15, the decoder 226 outputs the selection signal S with a logic level defined by the selection control signal Q0[SP00, SP01, SP02, SP03] in the period t1, outputs the selection signal S with a logic level defined by the selection control signal Q1[SP10, SP11, SP12, SP13] in the period t2, and outputs the selection signal S with a logic level defined by the selection control signal Q2[SP20, SP21, SP22, SP23] in the period t3.

Specifically, the decoder 226 outputs the logic levels of the setting information SP00, SP10, and SP20 as the selection signal S in each of the periods t1, t2, and t3 according to the content defined by the selection control signals Q0, Q1, and Q2 when the latch data [LTa, LTb]=[1, 1] is input to the decoder 226, the decoder 226 outputs the logic levels of the setting information SP01, SP11, and SP21 as the selection signal S in each of the periods t1, t2, and t3 according to the content defined by the selection control signals Q0, Q1, and Q2 when the latch data [LTa, LTb]=[1, 0] is input to the decoder 226, the decoder 226 outputs the logic levels of the setting information SP02, SP12, and SP22 as the selection signal S in each of the periods t1, t2, and t3 according to the content defined by the selection control signals Q0, Q1, and Q2 when the latch data [LTa, LTb]=[0, 1] is input to the decoder 226, and the decoder 226 outputs the logic levels of the setting information SP03, SP13, and SP23 as the selection signal S in each of the periods t1, t2, and t3 according to the content defined by the selection control signals Q0, Q1, and Q2 when the latch data [LTa, LTb]=[0, 0] is input to the decoder 226.

As described above, the selection control circuit 210 outputs the selection signals S[1] to S[m] for controlling the states of the selection circuits 230[1] to 230[*m*] respectively corresponding to the discharging portions 600[1] to 600[*m*] based on the clock signal SCKo, the latch signal LATo, the change signal CHo, and the head control signal DIo.

Next, configurations of the selection circuits 230[1] to 230[*m*] will be described. Here, the selection circuits 230[1] to 230[*m*] all have the same configuration. Therefore, when it is not necessary to distinguish the selection circuits 230[1] to 230[*m*], the selection circuits 230[1] to 230[*m*] may be simply referred to as a selection circuit 230. A description will be made assuming that the selection signal S among the selection signals S[1] to S[m] is input to the selection circuit 230.

FIG. 16 is a diagram illustrating a configuration of the selection circuit 230 corresponding to the piezoelectric element 60. As illustrated in FIG. 16, the selection circuit 230 includes an inverter 232 which is a NOT circuit, and a transfer gate 234.

While the selection signal S output by the selection control circuit 210 is input to a positive control end that is not marked with a circle at the transfer gate 234, the selection signal S is logically inverted by the inverter 232 and is also input to a negative control end that is marked with a circle at the transfer gate 234. The drive signal COM is supplied to an input end of the transfer gate 234. Specifically, the transfer gate 234 enables conductivity between the input end and an output end when the input selection signal S is an H level and enables non-conductivity between the input end and the output end when the input selection signal S is an L level. The drive signal VOUT is output from the output end of the transfer gate 234.

As described above, the drive signal selection circuit 200 according to the first embodiment generates the drive signals VOUT[1] to VOUT[m] respectively corresponding to the discharging portions 600[1] to 600[*m*] by selecting or deselecting the signal waveform of the drive signal COM based on the input clock signal SCKo, latch signal LATo, change signal CHo, and head control signal DIo, and outputs the drive signals VOUT[1] to VOUT[m] to the corresponding discharging portions 600[1] to 600[*m*]. In other words, the drive signal selection circuit 200 switches whether or not to supply the drive signal COM to the corresponding discharging portions 600[1] to 600[*m*] based on the clock signal SCKo, the latch signal LATo, the change signal CHo, and the head control signal DIo.

Here, the drive signal VOUT is a signal input to each of the corresponding discharging portions 600[1] to 600[*m*] by the drive signal selection circuit 200 selecting or deselecting the signal waveform of the drive signal COM. That is, the drive signal VOUT when the drive signal selection circuit 200 selects the signal waveform of the drive signal COM is a signal including the signal waveform included in the drive signal COM, the drive signal VOUT when the drive signal selection circuit 200 does not select the signal waveform of the drive signal COM is a signal having the voltage value stored by the piezoelectric element 60 of the corresponding discharging portion 600, and the drive signal VOUT in the case of the liquid discharging apparatus 1 of the first embodiment is a constant signal at a voltage Vc. In other words, the drive signal VOUT output by the drive signal selection circuit 200 means a signal supplied to the corresponding piezoelectric element 60.

Next, an example of a specific operation of the drive signal selection circuit 200 will be described. As described above, the head control signal DIo input to the drive signal selection circuit 200 is a signal in which any one of the head control signal DIi, the discharge stop processing signal DIe1, and the discharge stop processing signal DIe2 is selected in the discharge control circuit 52. In the following description, specific examples of the head control signal DIo when head control signal DIi is selected by multiplexer 730, the head control signal DIo when the discharge stop processing signal DIe1 is selected by the multiplexer 730, and the head control signal DIo when the discharge stop processing signal DIe2 is selected by the multiplexer 730, and specific operations of the drive signal selection circuit 200 will be described.

Figure 17:
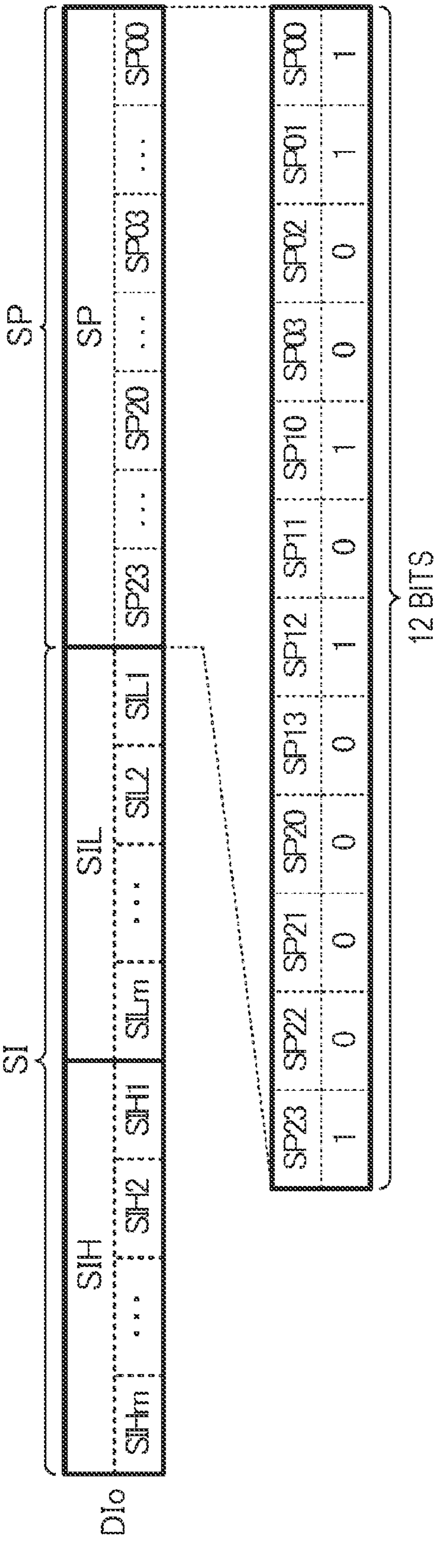
FIG. 17 is a diagram illustrating an example of the head control signal DIo input to the drive signal selection circuit when a multiplexer selects a head control signal DIi.

First, the specific operation of the drive signal selection circuit 200 when the multiplexer 730 selects the head control signal DIi will be described. FIG. 17 is a diagram illustrating an example of the head control signal DIo input to the drive signal selection circuit 200 when the multiplexer 730 selects the head control signal DIi. Here, the discharge control signal SI included in the head control signal DIo is used for defining the discharging amount of the ink discharged by driving the piezoelectric element 60 included in each of the m discharging portions 600 as described above. Therefore, the logic level of the discharge control signal SI is appropriately changed during a printing period in which the liquid discharging apparatus 1 discharges the ink and forms a desired image on the medium P. That is, the logic level of the discharge data [SIH, SIL] included in the discharge control signal SI is changed to either 0 or 1 according to the amount of the discharged ink. Therefore, in FIG. 17, only a specific logic level for the waveform selection signal SP is illustrated, and a specific logic level for the discharge control signal SI is omitted.

As illustrated in FIG. 17, when the multiplexer 730 selects the head control signal DIi, the head control signal DIo including the waveform selection signal SP in which the setting information SP00, SP01, SP02, SP03, SP10, SP11, SP12, SP13, SP20, SP21, SP22, and SP23 are respectively "1", "1", "0", "0", "1", "0", "1", "0", "0", "0", "0", and "1", is input to the drive signal selection circuit 200. Therefore, based on the waveform selection signal SP, the selection control signal Q0[SP00, SP01, SP02, SP03]=[1, 1, 0, 0], the selection control signal Q1[SP10, SP11, SP12, SP13]=[1, 0, 1, 0], and the selection control signal Q2[SP20, SP21, SP22, SP23]=[0, 0, 0, 1] are generated by the selection control signal generation portion 262 included in the control logic circuit 260 and output to the decoder 226.

FIG. 18 is a diagram illustrating a specific example of the decoding content of the decoder 226 when the head control signal DIo including the waveform selection signal SP illustrated in FIG. 17 is input to the drive signal selection circuit 200. A description will be made assuming that the decoder 226 of the first embodiment outputs the selection signal S with an H level when the corresponding setting information SP23 to SP20, SP13 to SP10, and SP03 to SP00 are "1", and outputs the selection signal S with an L level when the corresponding setting information SP23 to SP20, SP13 to SP10, and SP03 to SP00 are "0".

As illustrated in FIG. 18, when the latch data [LTa, LTb]=[1, 1] corresponding to the discharge data [SIH, SIL]=[1, 1] is input to the decoder 226, the decoder 226 outputs the selection signal S with H, H, and L levels in the periods t1, t2, and t3. When the latch data [LTa, LTb]=[1, 0] corresponding to the discharge data [SIH, SIL]=[1, 0] is input to the decoder 226, the decoder 226 outputs the selection signal S with H, L, and L levels in the periods t1, t2, and t3. When the latch data [LTa, LTb]=[0, 1] corresponding to the discharge data [SIH, SIL]=[0, 1] is input to the decoder 226, the decoder 226 outputs the selection signal S with L, H, and L levels in the periods t1, t2, and t3. When the latch data [LTa, LTb]=[0, 1] corresponding to the discharge data [SIH, SIL]=[0, 0] is input to the decoder 226, the decoder 226 outputs the selection signal S with L, L, and H levels in the periods t1, t2, and t3.

Figure 19:
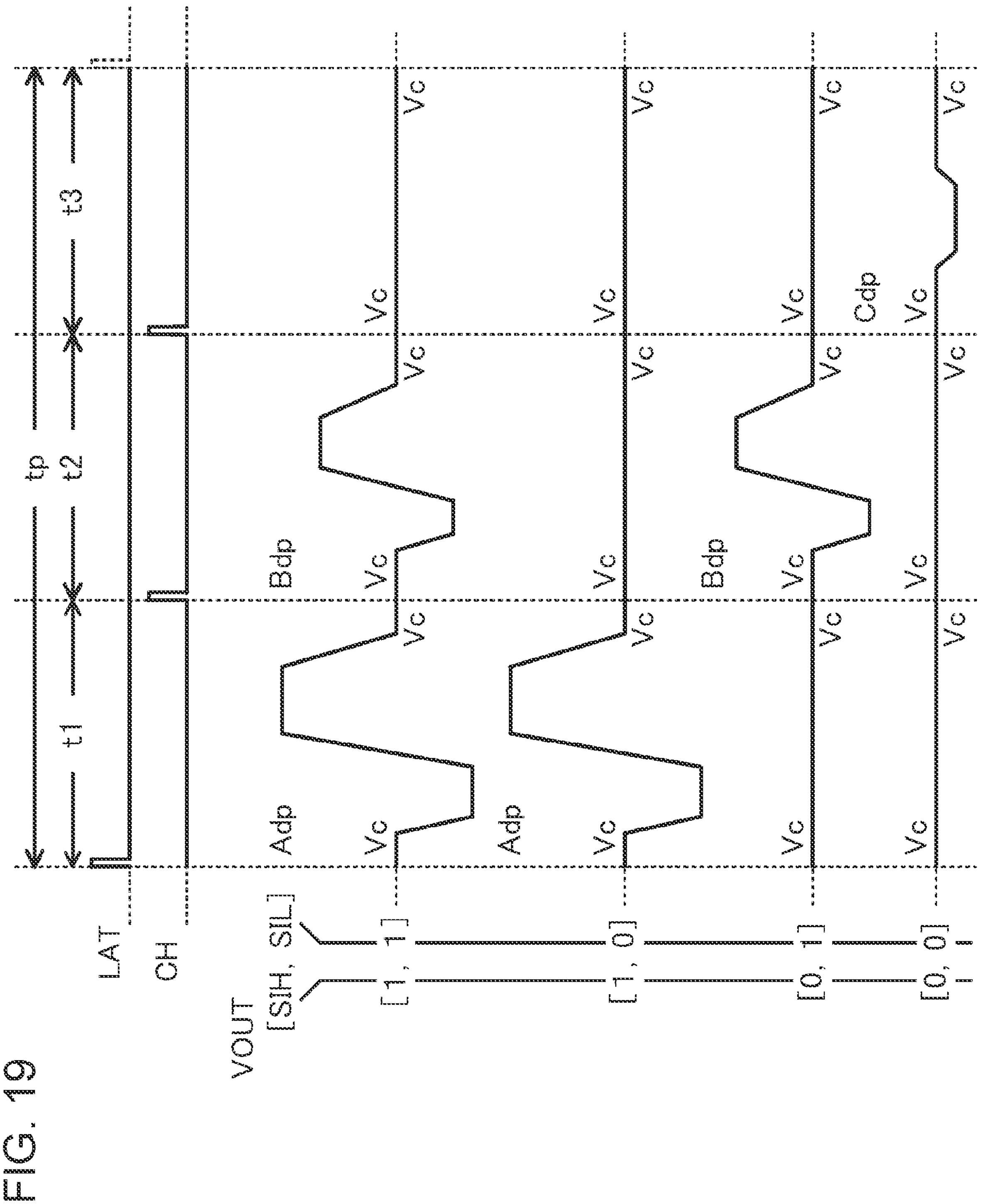
FIG. 19 is a diagram illustrating a drive signal VOUT output from a selection circuit when the selection signal S illustrated in FIG. 18 is supplied.

FIG. 19 is a diagram illustrating an example of the drive signal VOUT output from the selection circuit 230 when the selection signal S illustrated in FIG. 18 is supplied.

As illustrated in FIG. 19, when the latch data [LTa, LTb]=[1, 1] is input to the decoder 226, the logic levels of the selection signal S become H, H, and L levels in the periods t1, t2, and t3. Therefore, between an input end and output end of the selection circuit 230, conductive, conductive, and non-conductive are shown in the periods t1, t2, and t3. As a result, the selection circuit 230 outputs the drive signal VOUT, which has the trapezoidal waveform Adp during the period t1, has the trapezoidal waveform Bdp during the period t2, and is constant at the voltage Vc during the period t3. In this case, by driving the piezoelectric element 60, a medium amount of ink is discharged during the period t1, a small amount of ink is discharged during the period t2, and the ink is not discharged during the period t3. Therefore, in the cycle tp, a medium amount of ink and a small amount of ink land on the medium P, and a large dot is formed on the medium P by combining the medium amount of ink and the small amount of ink on the medium P.

Further, when the latch data [LTa, LTb]=[1, 0] is input to the decoder 226, the logic levels of the selection signal S become H, L, and L levels in the periods t1, t2, and t3. Therefore, between the input end and output end of the selection circuit 230, conductive, non-conductive, and non-conductive are shown in the periods t1, t2, and t3. As a result, the selection circuit 230 outputs the drive signal VOUT, which has the trapezoidal waveform Adp during the period t1, is constant at the voltage Vc during the period t2, and is constant at the voltage Vc during the period t3. In this case, by driving the piezoelectric element 60, a medium amount of ink is discharged during the period t1, the ink is not discharged during the period t2, and the ink is not discharged during the period t3. Therefore, in the cycle tp, a medium amount of ink lands on the medium P, and a medium dot is formed on the medium P.

Further, when the latch data [LTa, LTb]=[0, 1] is input to the decoder 226, the logic levels of the selection signal S become L, H, and L levels in the periods t1, t2, and t3. Therefore, between the input end and output end of the selection circuit 230, non-conductive, conductive, and non-conductive are shown in the periods t1, t2, and t3. As a result, the selection circuit 230 outputs the drive signal VOUT, which is constant at the voltage Vc during the period t1, has the trapezoidal waveform Bdp during the period t2, and is constant at the voltage Vc during the period t3. In this case, by driving the piezoelectric element 60, the ink is not discharged during the period t1, a small amount of ink is discharged during the period t2, and the ink is not discharged during the period t3. Therefore, in the cycle tp, a small amount of ink lands on the medium P, and a small dot is formed on the medium P.

Further, when the latch data [LTa, LTb]=[0, 0] is input to the decoder 226, the logic levels of the selection signal S become L, L, and H levels in the periods t1, t2, and t3. Therefore, between the input end and output end of the selection circuit 230, non-conductive, non-conductive, and conductive are shown in the periods t1, t2, and t3. As a result, the selection circuit 230 outputs the drive signal VOUT, which is constant at the voltage Vc during the period t1, is constant at the voltage Vc during the period t2, and has the trapezoidal waveform Cdp during the period t3. In this case, by driving the piezoelectric element 60, the ink is not discharged during the period t1, the ink is not discharged during the period t2, and the ink is not discharged and micro-vibration is performed during the period t3. Therefore, in the cycle tp, the ink does not land on the medium P, dots are not formed on the medium P, and the micro-vibration of the ink in the vicinity of the opening portion of the nozzle 651 corresponding to the piezoelectric element 60 is performed.

As described above, when the multiplexer 730 selects the head control signal DIi as the head control signal DIo, the drive signal selection circuit 200 outputs the drive signal VOUT for forming a large dot, a medium dot, and a small dot on the medium P. That is, the head control signal DIi is selected by the multiplexer 730 during the ink discharge period in which dots are formed on the medium P. In other words, the multiplexer 730 selects the head control signal DIi and outputs as the head control signal DIo during the period in which the liquid discharging apparatus 1 executes image forming processing of forming an image on the medium P.

On the other hand, the discharge stop processing signal DIe1 and the discharge stop processing signal DIe2 output by the discharge stop signal output circuit 720 are not signals for forming dots on the medium P and are selected by the multiplexer 730 during the period in which the liquid discharging apparatus 1 executes stop processing for stopping the operation.

Figure 20:
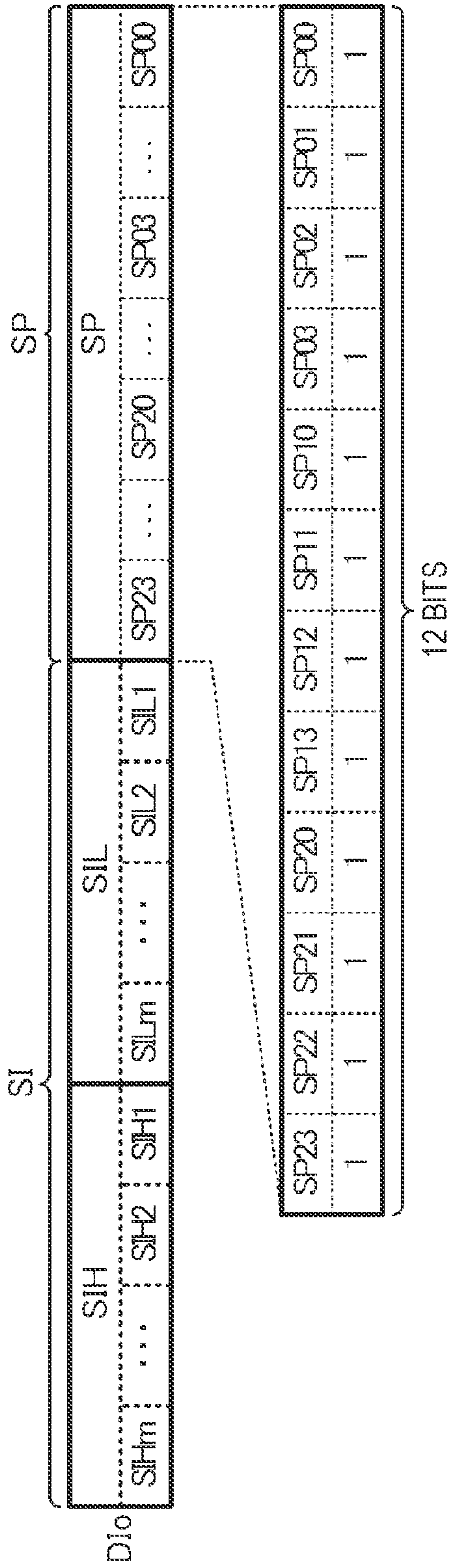
FIG. 20 is a diagram illustrating an example of the head control signal DIo input to the drive signal selection circuit when the multiplexer selects a discharge stop processing signal DIe1.

FIG. 20 is a diagram illustrating an example of the head control signal DIo input to the drive signal selection circuit 200 when the multiplexer 730 selects the discharge stop processing signal DIe1. As illustrated in FIG. 20, when the multiplexer 730 selects the discharge stop processing signal DIe1, the head control signal DIo including the waveform selection signal SP in which the setting information SP00, SP01, SP02, SP03, SP10, SP11, SP12, SP13, SP20, SP21, SP22, and SP23 are respectively "1", "1", "1", "1", "1", "1", "1", "1", "1", "1", "1", and "1", is input to the drive signal selection circuit 200. Therefore, based on the waveform selection signal SP, the selection control signal Q0[SP00, SP01, SP02, SP03]=[1, 1, 1, 1], the selection control signal Q1[SP10, SP11, SP12, SP13]=[1, 1, 1, 1], and the selection control signal Q2[SP20, SP21, SP22, SP23]=[1, 1, 1, 1] are generated by the selection control signal generation portion 262 included in the control logic circuit 260 and output to the decoder 226.

FIG. 21 is a diagram illustrating a specific example of the decoding content of the decoder 226 when the head control signal DIo including the waveform selection signal SP illustrated in FIG. 20 is input to the drive signal selection circuit 200. As illustrated in FIG. 21, when the head control signal DIo based on the discharge stop processing signal DIe1 is input to the drive signal selection circuit 200, the decoder 226 outputs the selection signal S, which becomes H, H, and H levels in the periods t1, t2, and t3, in any case, when the latch data [LTa, LTb]=[1, 1] corresponding to the discharge data [SIH, SIL]=[1, 1] is input, when the latch data [LTa, LTb]=[1, 0] corresponding to the discharge data [SIH, SIL]=[1, 0] is input, when the latch data [LTa, LTb]=[0, 1] corresponding to the discharge data [SIH, SIL]=[0, 1] is input, and when the latch data [LTa, LTb]=[0, 1] corresponding to the discharge data [SIH, SIL]=[0, 0] is input.

That is, the head control signal DIo based on the discharge stop processing signal DIe1 is a signal for controlling all of the m selection circuits 230 included in the drive signal selection circuit 200 to be conductive in the cycle tp including the periods t1, t2, and t3, regardless of the logic levels of the upper discharge data SIH and the lower discharge data SIL included in the discharge control signal SI. The head control signal DIo based on such discharge stop processing signal DIe1 is used, for example, when controlling the voltage value at one end of all the respective m piezoelectric elements 60 of the m discharging portions 600 to desired voltage value defined with the drive signal VOUT based on the drive signal COM during the period in which the liquid discharging apparatus 1 executes the stop processing.

Figure 22:
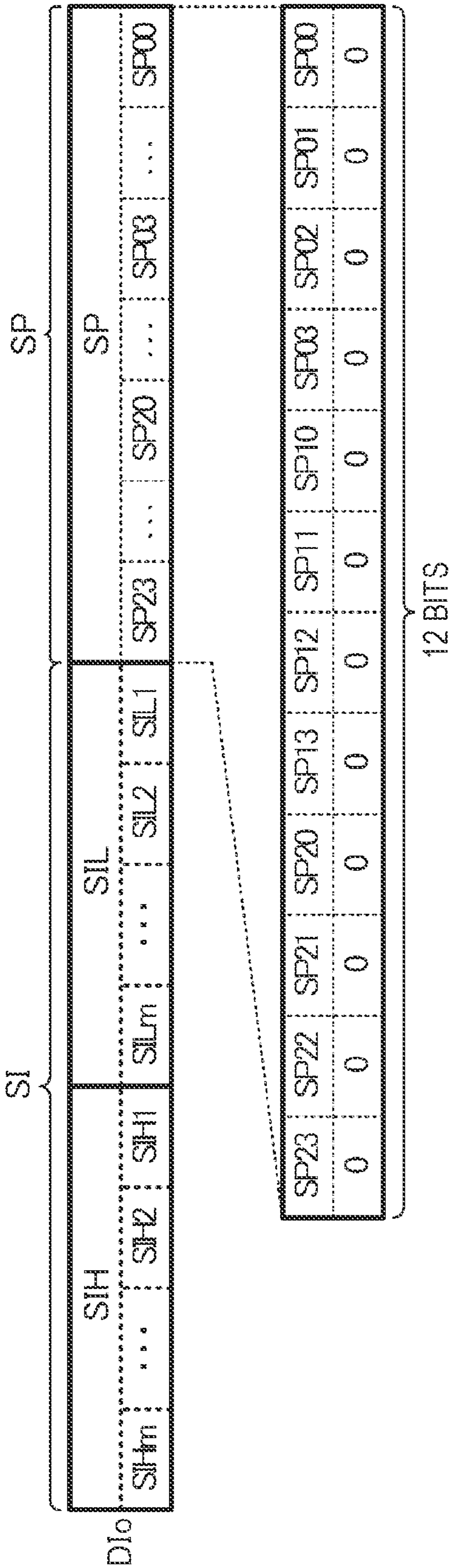
FIG. 22 is a diagram illustrating an example of the head control signal DIo input to the drive signal selection circuit when the multiplexer selects a discharge stop processing signal DIe2.

FIG. 22 is a diagram illustrating an example of the head control signal DIo input to the drive signal selection circuit 200 when the multiplexer 730 selects the discharge stop processing signal DIe2. As illustrated in FIG. 22, when the multiplexer 730 selects the discharge stop processing signal DIe2, the head control signal DIo including the waveform selection signal SP in which the setting information SP00, SP01, SP02, SP03, SP10, SP11, SP12, SP13, SP20, SP21, SP22, and SP23 are respectively "0", "0", "0", "0", "0", "0", "0", "0", "0", "0", "0", and "0", is input to the drive signal selection circuit 200. Therefore, based on the waveform selection signal SP, the selection control signal Q0[SP00, SP01, SP02, SP03]=[0, 0, 0, 0], the selection control signal Q1[SP10, SP11, SP12, SP13]=[0, 0, 0, 0], and the selection control signal Q2[SP20, SP21, SP22, SP23]=[0, 0, 0, 0] are generated by the selection control signal generation portion 262 included in the control logic circuit 260 and output to the decoder 226.

FIG. 23 is a diagram illustrating a specific example of the decoding content of the decoder 226 when the head control signal DIo including the waveform selection signal SP illustrated in FIG. 22 is input to the drive signal selection circuit 200. As illustrated in FIG. 23, when the head control signal DIo based on the discharge stop processing signal DIe2 is input to the drive signal selection circuit 200, the decoder 226 outputs the selection signal S, which becomes L, L, and L levels in the periods t1, t2, and t3, in any case, when the latch data [LTa, LTb]=[1, 1] corresponding to the discharge data [SIH, SIL]=[1, 1] is input, when the latch data [LTa, LTb]=[1, 0] corresponding to the discharge data [SIH, SIL]=[1, 0] is input, when the latch data [LTa, LTb]=[0, 1] corresponding to the discharge data [SIH, SIL]=[0, 1] is input, and when the latch data [LTa, LTb]=[0, 1] corresponding to the discharge data [SIH, SIL]=[0, 0] is input.

That is, the head control signal DIo based on the discharge stop processing signal DIe2 is a signal for controlling all of the m selection circuits 230 included in the drive signal selection circuit 200 to be non-conductive in the cycle tp including the periods t1, t2, and t3, regardless of the logic levels of the upper discharge data SIH and the lower discharge data SIL included in the discharge control signal SI. The head control signal DIo based on such discharge stop processing signal DIe2 is used, for example, to stop the supply of the drive signal VOUT based on the drive signal COM to one end of the piezoelectric element 60 included in the m discharging portions 600 and is used to store the voltage value at one end of the piezoelectric element 60 to the immediately preceding voltage value during the period in which the stop processing for stopping the operation of the liquid discharging apparatus 1 is executed. That is, the discharge stop processing signal DIe2 and the head control signal DIo based on the discharge stop processing signal DIe2 are signals for controlling the drive signal selection circuit 200 so as not to supply the drive signal COM to the discharging portion 600 included in the print head 30.

The discharge stop processing signals DIe1 and DIe2 as described above are selected by the multiplexer 730 during the period in which the liquid discharging apparatus 1 executes the stop processing. When the multiplexer 730 selects the discharge stop processing signal DIe1 as the head control signal DIo, the drive signal selection circuit 200 controls such that the drive signal VOUT based on the drive signal COM is supplied to all of the m corresponding discharging portions 600 regardless of the logic level of the upper discharge data SIH and lower discharge data SIL included in the discharge control signal SI. Thereby, the voltage value of one end of all the respective m piezoelectric elements 60 included in the m discharging portions 600 is controlled to be a common value. Thereafter, when the multiplexer 730 selects the discharge stop processing signal DIe2 as the head control signal DIo, the drive signal selection circuit 200 controls such that the drive signal VOUT based on the drive signal COM is not supplied to all of the m corresponding discharging portions 600 regardless of the logic level of the upper discharge data SIH and lower discharge data SIL included in the discharge control signal SI. As a result, the voltage value of one end of the piezoelectric element 60 included in each of the m discharging portions 600 corresponding to the drive signal selection circuit 200 is stored at the voltage value of the signal supplied immediately before. As a result, even after the stop processing of the liquid discharging apparatus 1 is completed, the possibility that the voltage value supplied to one end of the piezoelectric element 60 becomes unstable is reduced, and the possibility that unintended stress is continuously applied to the piezoelectric element 60 is reduced. As a result, the possibility of damage such as cracks occurring in the piezoelectric element 60 is reduced, and the possibility of deterioration of the discharge accuracy of the ink discharged from the discharging portion 600, which includes the piezoelectric element 60, is reduced.

Figure 24:
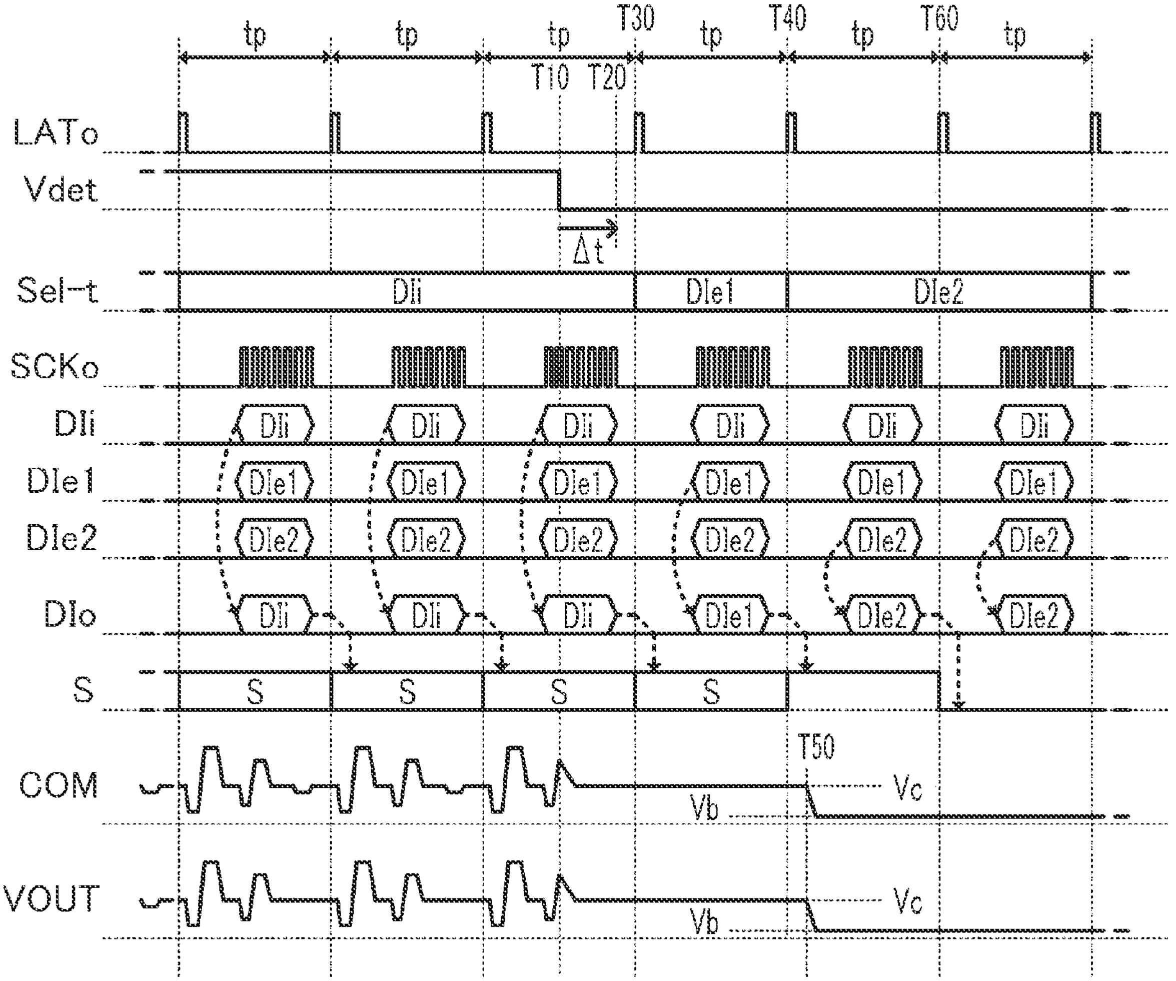
FIG. 24 is a diagram for describing a relationship between an operation of the liquid discharging apparatus and an operation of the multiplexer.

1.7 Relationship Between Operation of Liquid Discharging Apparatus and Operation of Multiplexer Here, the switching timing, at which the multiplexer 730 included in the discharge control circuit 52 switches the selection between the head control signal DIi, the discharge stop processing signal DIe1, and the discharge stop processing signal DIe2, will be described in relation to the operation of the liquid discharging apparatus 1. FIG. 24 is a diagram for describing a relationship between the operation of the liquid discharging apparatus 1 and the operation of the multiplexer 730.

As illustrated in FIG. 24, before time T10, the voltage detection circuit 18 outputs the voltage detection signal Vdet with an H level. That is, before the time T10, the commercial voltage VAC having a normal voltage value is supplied to the liquid discharging apparatus 1. In this case, when the image data DATA is input to the liquid discharging apparatus 1 from the external apparatus, the liquid discharging apparatus 1 starts forming an image in accordance with the image data DATA input to the medium P. That is, the liquid discharging apparatus 1 starts the image forming processing.

Specifically, before the time T10, the voltage detection circuit 18 outputs the voltage detection signal Vdet with an H level. The voltage detection signal Vdet with an H level output by the voltage detection circuit 18 is input to at least the head control circuit 110 and the discharge control circuit 52.

The head control circuit 110 generates a plurality of signals including the base drive signal dAi for generating the drive signal COM, which includes trapezoidal waveforms Adp, Bdp, and Cdp as illustrated in FIG. 11, and the head control signal DIi based on the image data DATA during the period in which the voltage detection signal Vdet with an H level is input, and outputs the plurality of signals to the discharge control circuit 52.

The discharge control circuit 52 propagates the input base drive signal dAi and outputs the base drive signal dAi as the base drive signal dAo to the drive signal output circuit 54. The drive signal output circuit 54 generates the drive signal COM including the trapezoidal waveforms Adp, Bdp, and Cdp based on the input base drive signal dAo and outputs the drive signal COM to the print head 30.

Further, the discharge control circuit 52 outputs the input head control signal DIi as the head control signal DIo during the period before the time T10 when the voltage detection signal Vdet with an H level is input. Specifically, the voltage detection signal Vdet is input to the processor 710 included in the discharge control circuit 52. When the logic level of the input voltage detection signal Vdet is an H level, the processor 710 generates the signal selection signal Sel-t for selecting the head control signal DIi as the head control signal DIo and outputs the signal selection signal Sel-t to the multiplexer 730. As a result, the multiplexer 730 selects the head control signal DIi output by the head control circuit 110 as the head control signal DIo and outputs the head control signal DIi to the print head 30.

That is, before the time T10 when the voltage detection circuit 18 outputs an H level voltage detection signal Vdet, a plurality of signals, which include the drive signal COM including the trapezoidal waveforms Adp, Bdp, and Cdp, and the head control signal DIo based on the head control signal DIi, are input to the print head 30. As a result, the drive signal selection circuit 200 included in the print head 30 generates the selection signal S corresponding to each of the plurality of discharging portions 600 in response to the head control signal DIo based on the input head control signal DIi, and outputs the selection signal S to the corresponding selection circuit 230. As a result, the drive signal selection circuit 200 outputs the drive signal VOUT corresponding to each of the plurality of discharging portions 600. As a result, the image in accordance with the image data DATA is formed on the medium P.

That is, when the logic level of the voltage detection signal Vdet is an H level, and when the voltage detection signal Vdet does not include information indicating an abnormality in the commercial voltage VAC, which is the power supply voltage supplied to the liquid discharging apparatus 1, the multiplexer 730 selects the head control signal DIi as the head control signal DIo, and the discharge control circuit 52 outputs a head control signal DIo based on the head control signal DIi.

At the time T10, when the supply of the commercial voltage VAC to the liquid discharging apparatus 1 is stopped or the voltage value of the commercial voltage VAC is decreased, the voltage detection circuit 18 sets the logic level of the voltage detection signal Vdet to an L level. As a result, the liquid discharging apparatus 1 starts the stop processing.

Specifically, at the time T10, when the supply of the commercial voltage VAC to the liquid discharging apparatus 1 is stopped or the voltage value of the commercial voltage VAC is decreased, the voltage detection circuit 18 generates the voltage detection signal Vdet with an L level and outputs the voltage detection signal Vdet to the head control circuit 110 and the discharge control circuit 52.

When the voltage detection signal Vdet with an L level is input, the head control circuit 110 generates the base drive signal dAi for generating the drive signal COM of which the voltage value is constant at the voltage Vc and outputs the base drive signal dAi to the discharge control circuit 52. The discharge control circuit 52 propagates the input base drive signal dAi and outputs the base drive signal dAi as the base drive signal dAo to the drive signal output circuit 54. As a result, the drive signal output circuit 54 outputs the drive signal COM of which the voltage value is constant at the voltage Vc. In this case, the head control circuit 110 preferably generates and outputs the base drive signal dAi such that the voltage value of the drive signal COM is gradually changed toward the voltage Vc. That is, the voltage value of the drive signal COM output by the drive signal output circuit 54 is preferably gradually changed toward the voltage Vc, and then is constant at the voltage Vc.

Further, after the voltage detection signal Vdet with an L level is input, and after time T20 at which a predetermined period Δt has elapsed, the discharge control circuit 52 outputs the discharge stop processing signal DIe1 as the head control signal DIo at time T30 when the latch signal LATo rises. Specifically, the voltage detection signal Vdet is input to the processor 710 included in the discharge control circuit 52. Further, the latch signal LATo is also input to the processor 710. After the voltage detection signal Vdet with an L level is input, and after the predetermined period Δt has elapsed, the processor 710 outputs, to the multiplexer 730, the signal selection signal Sel-t for selecting the discharge stop processing signal DIe1 output by the discharge stop signal output circuit 720 as the head control signal DIo at the timing at which the latch signal LATo first rises. As a result, the multiplexer 730 selects the discharge stop processing signal DIe1 output by the discharge stop signal output circuit 720 as the head control signal DIo and outputs the discharge stop processing signal DIe1 to the print head 30.

Here, the predetermined period Δt corresponds to a standby period of waiting until the voltage value of the drive signal COM, which is output by the drive signal output circuit 54, is constant at the voltage Vc. Therefore, the predetermined period Δt is set to be a period longer than the period from the time T10 until the voltage value of the drive signal COM, which is output by the drive signal output circuit 54, is constant at the voltage Vc. Therefore, at the time T20, the voltage value of the drive signal COM output by the drive signal output circuit 54 is constant at the voltage Vc.

After the time T30, at time T40 when the latch signal LATo rises, the head control signals DIo based on the discharge stop processing signal DIe1 are latched all at once in the drive signal selection circuit 200 included in the print head 30. As a result, the drive signal selection circuit 200 generates the selection signal S for controlling all of the selection circuits 230 corresponding to each of the plurality of discharging portions 600 to be conductive in response to the head control signal DIo based on the discharge stop processing signal DIe1, and outputs the selection signal S to the corresponding selection circuit 230. As a result, at the time T40, the drive signal VOUT, which is based on the drive signal COM of which the voltage value is constant at the voltage Vc, is supplied to one electrode of the piezoelectric element 60 included in each of the plurality of discharging portions 600.

At time T50 after all of the selection circuits 230 corresponding to each of the plurality of discharging portions 600 are controlled to be conductive, the head control circuit 110 generates the base drive signal dAi for generating the drive signal COM of which the voltage value is constant at a voltage Vb of a voltage value equivalent to the voltage value of the reference voltage signal VBS, and outputs the base drive signal dAi to the discharge control circuit 52. The discharge control circuit 52 propagates the input base drive signal dAi and outputs the base drive signal dAi as the base drive signal dAo to the drive signal output circuit 54. As a result, the drive signal output circuit 54 outputs the drive signal COM of which the voltage value is constant at the voltage Vb. In this case, the head control circuit 110 generates and outputs the base drive signal dAi such that the voltage value of the drive signal COM is gradually changed toward the voltage Vb. That is, the voltage value of the drive signal COM output by the drive signal output circuit 54 is gradually changed from the voltage Vc toward the voltage Vb, and then is constant at the voltage Vb.

Here, at the time T40 when the voltage value of the drive signal COM is gradually changed from the voltage Vc toward the voltage Vb, all of the selection circuits 230 corresponding to each of the plurality of discharging portions 600 are controlled to be conductive. Therefore, at the time T50, when the voltage value of the drive signal COM is gradually changed from the voltage Vc toward the voltage Vb, the voltage value of one end of the piezoelectric element 60 included in each of the plurality of discharging portions 600 is also gradually changed from the voltage Vc to the voltage Vb. When the voltage value of the drive signal COM is constant at the voltage Vb, the voltage value of one end of the piezoelectric element 60 included in each of the plurality of discharging portions 600 is also constant at the voltage Vb. In this case, a reference voltage signal VBS is supplied to the other end of the piezoelectric element 60 included in each of the plurality of discharging portions 600. That is, at the time T50, the voltage value of the electrode 611 of the piezoelectric element 60 is changed to approach the voltage value of the electrode 612 of the piezoelectric element 60.

Further, at the time T40, the discharge control circuit 52 outputs the discharge stop processing signal DIe2 as the head control signal DIo. Specifically, after the time T30, and at the time T40 when the input latch signal LATo rises, the processor 710 generates the signal selection signal Sel-t for selecting the discharge stop processing signal DIe2 output by the discharge stop signal output circuit 720 as the head control signal DIo, and outputs the signal selection signal Sel-t to the multiplexer 730. As a result, the multiplexer 730 selects the discharge stop processing signal DIe2 as the head control signal DIo and outputs the discharge stop processing signal DIe2 to the print head 30.

After the time T40 and the time T50, at time T60 when the latch signal LATo rises, the head control signals DIo based on the discharge stop processing signal DIe2 are latched all at once in the drive signal selection circuit 200 included in the print head 30. As a result, the drive signal selection circuit 200 generates the selection signal S for controlling all of the selection circuits 230 corresponding to each of the plurality of discharging portions 600 to be non-conductive in response to the head control signal DIo based on the discharge stop processing signal DIe2, and outputs the selection signal S to the corresponding selection circuit 230. As a result, the drive signal selection circuit 200 is controlled not to supply the drive signal VOUT based on the drive signal COM to the plurality of discharging portions 600. As a result, one electrode of the piezoelectric element 60 included in each of the plurality of discharging portions 600 stores the voltage Vb, which is the immediately preceding voltage value.

That is, when the logic level of the voltage detection signal Vdet is an L level, and when the voltage detection signal Vdet includes information indicating an abnormality in the commercial voltage VAC, which is the power supply voltage supplied to the liquid discharging apparatus 1, the multiplexer 730 selects the discharge stop processing signal DIe2 as the head control signal DIo, and the discharge control circuit 52 outputs a head control signal DIo based on the discharge stop processing signal DIe2 for controlling the drive signal selection circuit 200 not to supply the drive signal COM to the corresponding discharging portion 600.

In the liquid discharging apparatus 1 of the first embodiment that is operated as described above, when the supply of the commercial voltage VAC, which is the power supply voltage to the liquid discharging apparatus 1, is stopped, the discharge control circuit 52 controls the selection circuit 230 of the drive signal selection circuit 200 to be non-conductive regardless of the control of the main control circuit 14 and head control circuit 110.

That is, when the logic level of the voltage detection signal Vdet input to the discharge control circuit 52 included in the liquid discharging module 20-1 is an H level, and when the voltage detection signal Vdet does not include the information indicating an abnormality in the commercial voltage VAC, which is the power supply voltage supplied to the liquid discharging apparatus 1, the multiplexer 730 included in the discharge control circuit 52 included in the liquid discharging module 20-1 selects the head control signal DIi1 as the head control signal DIo1, and the discharge control circuit 52 included in the liquid discharging module 20-1 outputs the head control signal DIo1 based on the head control signal DIi1. When the logic level of the voltage detection signal Vdet input to the discharge control circuit 52 included in the liquid discharging module 20-1 is an L level, and when the voltage detection signal Vdet includes the information indicating an abnormality in the commercial voltage VAC, which is the power supply voltage supplied to the liquid discharging apparatus 1, the multiplexer 730 included in the discharge control circuit 52 of the liquid discharging module 20-1 selects the discharge stop processing signal DIe2 as the head control signal DIo1, and the discharge control circuit 52 included in the liquid discharging module 20-1 outputs the head control signal DIo1 based on the discharge stop processing signal DIe2 for controlling the drive signal selection circuit 200 not to supply the drive signal COM1 to the corresponding discharging portion 600.

Further, when the logic level of the voltage detection signal Vdet input to the discharge control circuit 52 included in the liquid discharging module **20-*n* is an H level, and when the voltage detection signal Vdet does not include the information indicating an abnormality in the commercial voltage VAC, which is the power supply voltage supplied to the liquid discharging apparatus 1, the multiplexer 730 included in the discharge control circuit 52 included in the liquid discharging module 20-*n* selects the head control signal DIin as the head control signal DIon, and the discharge control circuit 52 included in the liquid discharging module 20-*n* outputs the head control signal DIon based on the head control signal DIin. When the logic level of the voltage detection signal Vdet input to the discharge control circuit 52 included in the liquid discharging module 20-*n* is an L level, and when the voltage detection signal Vdet includes the information indicating an abnormality in the commercial voltage VAC, which is the power supply voltage supplied to the liquid discharging apparatus 1, the multiplexer 730 included in the discharge control circuit 52 of the liquid discharging module 20-*n* selects the discharge stop processing signal DIe2 as the head control signal DIon, and the discharge control circuit 52 included in the liquid discharging module 20-*n* outputs the head control signal DIon based on the discharge stop processing signal DIe2 for controlling the drive signal selection circuit 200 not to supply the drive signal COMn to the corresponding discharging portion 600**.

Here, a configuration including the main control circuit 14 and the head control circuit 110 is an example of a first control circuit, a configuration including the main control circuit substrate 12 provided with the main control circuit 14 and the discharge control circuit substrate 100 provided with the head control circuit 110 is an example of a first substrate, the discharge control circuit 52 included in the liquid discharging module 20-1 is an example of a second control circuit, the drive signal output circuit 54 included in the liquid discharging module 20-1 is an example of a first drive circuit, the print head 30 included in the liquid discharging module 20-1 is an example of a first discharging head, the discharging portion 600 of the print head 30 included in the liquid discharging module 20-1 is an example of a first discharging portion, the drive signal selection circuit 200 of the print head 30 included in the liquid discharging module 20-1 is an example of a first switching circuit, and the drive circuit substrate 700 included in the liquid discharging module 20-1 is an example of a second substrate. Further, the discharge control circuit 52 included in the liquid discharging module **20-*n* is an example of a third control circuit, the drive signal output circuit 54 included in the liquid discharging module 20-*n* is an example of a second drive circuit, the print head 30 included in the liquid discharging module 20-*n* is an example of a second discharging head, the discharging portion 600 of the print head 30 included in the liquid discharging module 20-*n* is an example of a second discharging portion, the drive signal selection circuit 200 of the print head 30 included in the liquid discharging module 20-*n* is an example of a second switching circuit, and the drive circuit substrate 700 included in the liquid discharging module 20-*n* is an example of a third substrate. Further, the discharge stop signal output circuit 720 included in the discharge control circuit 52 included in the liquid discharging module 20-1 is an example of a non-discharge signal output circuit, and the multiplexer 730** is an example of a discharge control signal selection circuit.

Further, the voltage detection signal Vdet is an example of a state information signal, the head control signal DIi1 is an example of a first discharge control signal, the head control signal DIo1 is an example of a second discharge control signal, the head control signal DIin is an example of a third discharge control signal, the head control signal DIon is an example of a fourth discharge control signal, the base drive signal dAi1 is an example of a first base drive signal, the base drive signal dAo1 is an example of a second base drive signal, the base drive signal dAin is an example of a third base drive signal, the base drive signal dAon is an example of a fourth base drive signal, the drive signal COM1 is an example of a first drive signal, the drive signal COMn is an example of a second drive signal, the discharge stop processing signal DIe2 is an example of a non-discharge control signal, and the commercial voltage VAC is an example of a power supply voltage.

1.8 Operational Effect

As described above, in the liquid discharging apparatus 1 of the first embodiment, when the commercial voltage VAC, which is the power supply voltage supplied to the liquid discharging apparatus 1, is normal, and when the voltage detection signal Vdet does not include the information indicating an abnormality in the commercial voltage VAC, which is the power supply voltage supplied to the liquid discharging apparatus 1, the voltage detection signal Vdet with an H level is input to the discharge control circuit 52 included in the liquid discharging module 20-1. During the period in which the voltage detection signal Vdet with an H level is input to the discharge control circuit 52 included in the liquid discharging module 20-1, the multiplexer 730 included in the discharge control circuit 52 included in the liquid discharging module 20-1 selects the head control signal DIi1 as the head control signal DIo1. As a result, the discharge control circuit 52 included in the liquid discharging module 20-1 outputs the head control signal DIo1 based on the head control signal DIi1, and the image forming processing is executed.

On the other hand, when the commercial voltage VAC, which is the power supply voltage supplied to the liquid discharging apparatus 1, is not normal, and when the voltage detection signal Vdet includes the information indicating an abnormality in the commercial voltage VAC, which is the power supply voltage supplied to the liquid discharging apparatus 1, the voltage detection signal Vdet with an L level is input to the discharge control circuit 52 included in the liquid discharging module 20-1. Further, by inputting the voltage detection signal Vdet with an L level to the discharge control circuit 52 included in the liquid discharging module 20-1, the multiplexer 730 included in the discharge control circuit 52 included in the liquid discharging module 20-1 selects the discharge stop processing signal DIe2 as the head control signal DIo1. As a result, the discharge control circuit 52 included in the liquid discharging module 20-1 outputs the head control signal DIo1 based on the discharge stop processing signal DIe2 for controlling the drive signal selection circuit 200 not to supply the drive signal COM1 to the corresponding discharging portion 600. That is, the stop processing is executed.

As mentioned above, in the liquid discharging apparatus 1 of the first embodiment, when a state of the commercial voltage VAC, which is the power supply voltage supplied to the liquid discharging apparatus 1, is normal, the discharge control circuit 52 included in the liquid discharging module 20-1 controls the print head 30 such that the ink is discharged onto the medium P, and when the state of the commercial voltage VAC, which is the power supply voltage supplied to the liquid discharging apparatus 1, is abnormal, the discharge control circuit 52 included in the liquid discharging module 20-1 controls the print head 30 such that the ink is not discharged onto the medium P. That is, the discharge control circuit 52 included in the liquid discharging module 20-1 is responsible for processing of stopping the discharge of the ink from the print head 30, which is a part of the stop processing executed when the state of the commercial voltage VAC supplied to the liquid discharging apparatus 1 is not normal. In other words, the discharge control circuit 52 included in the liquid discharging module 20-1 executes at least a part of the stop processing of stopping the operation of the liquid discharging apparatus 1. As a result, processing loads of the main control circuit 14, which controls the entire operation of the liquid discharging apparatus 1, and the head control circuit 110 are reduced. As a result, even when the number of nozzles included in the liquid discharging apparatus 1 is increased, the possibility that the operation delay or the like occurs in the main control circuit 14 and the head control circuit 110 can be reduced, and the stop processing in the liquid discharging apparatus 1 can be executed in a short time.

Here, in the first embodiment, although a description has been made using the voltage detection signal Vdet including the information indicating the presence or absence of an abnormality in the voltage value of the commercial voltage VAC supplied to the liquid discharging apparatus 1 as a trigger for the discharge control circuit 52 to execute the stop processing, the trigger for the discharge control circuit 52 to execute the stop processing is not limited to the voltage detection signal Vdet including the information indicating the presence or absence of an abnormality in the voltage value of the commercial voltage VAC supplied to the liquid discharging apparatus 1, and the trigger may be information such as the presence or absence of an overvoltage abnormality, the presence or absence of an overcurrent abnormality, and the presence or absence of a temperature abnormality in the liquid discharging apparatus 1.

However, as shown in the first embodiment, the discharge control circuit 52 preferably executes the stop processing based on the voltage detection signal Vdet including the information indicating the presence or absence of an abnormality in the commercial voltage VAC, which is the power supply voltage supplied to the liquid discharging apparatus 1, as information indicating the state of the liquid discharging apparatus 1.

When the supply of the commercial voltage VAC to the liquid discharging apparatus 1 is stopped, the liquid discharging apparatus 1 needs to complete the stop processing in a short time until the charge stored in the liquid discharging apparatus 1 is released. When the stop processing of the liquid discharging apparatus 1 takes time and the liquid discharging apparatus 1 is stopped while the stop processing is being executed, the state of the liquid discharging apparatus 1 during the stop period becomes unstable, and as a result, an unintended abnormality may occur in the liquid discharging apparatus 1. On the other hand, as shown in the liquid discharging apparatus 1 of the first embodiment, by the discharge control circuit 52 executing a part of the stop processing based on the voltage detection signal Vdet including the information indicating an abnormality in the commercial voltage VAC, which is the power supply voltage supplied to the liquid discharging apparatus 1, the processing loads on the main control circuit 14, which controls the entire operation of the liquid discharging apparatus 1, and the head control circuit 110 can be reduced and the time required for the stop processing can be shortened, and even when the supply of commercial voltage VAC is stopped, the possibility that the liquid discharging apparatus 1 is stopped during the execution of the stop processing is reduced, and as a result, the possibility that the state of the liquid discharging apparatus 1 during the stop period becomes unstable is reduced, and the possibility that an unintended abnormality occurs in the liquid discharging apparatus 1 is further reduced.

Further, the liquid discharging apparatus 1 of the first embodiment includes n liquid discharging modules 20. When the commercial voltage VAC, which is the power supply voltage supplied to the liquid discharging apparatus 1, is normal, and when the voltage detection signal Vdet does not include the information indicating an abnormality in the commercial voltage VAC, which is the power supply voltage supplied to the liquid discharging apparatus 1, the voltage detection signal Vdet with an H level is input to the discharge control circuit 52 included in the liquid discharging module 20-*n*. During the period in which the voltage detection signal Vdet with an H level is input to the discharge control circuit 52 included in the liquid discharging module 20-*n*, the multiplexer 730 included in the discharge control circuit 52 included in the liquid discharging module 20-*n* selects the head control signal DIin as the head control signal DIon. As a result, the discharge control circuit 52 included in the liquid discharging module 20-*n* outputs the head control signal DIon based on the head control signal DIin, and the image forming processing is executed.

On the other hand, when the commercial voltage VAC, which is the power supply voltage supplied to the liquid discharging apparatus 1, is not normal, and when the voltage detection signal Vdet includes the information indicating an abnormality in the commercial voltage VAC, which is the power supply voltage supplied to the liquid discharging apparatus 1, the voltage detection signal Vdet with an L level is input to the discharge control circuit 52 included in the liquid discharging module 20-*n*. Further, by inputting the voltage detection signal Vdet with an L level to the discharge control circuit 52 included in the liquid discharging module 20-*n*, the multiplexer 730 included in the discharge control circuit 52 included in the liquid discharging module 20-*n* selects the discharge stop processing signal DIe2 as the head control signal DIon. As a result, the discharge control circuit 52 included in the liquid discharging module 20-*n* outputs the head control signal DIon based on the discharge stop processing signal DIe2 for controlling the drive signal selection circuit 200 not to supply the drive signal COMn to the corresponding discharging portion 600. That is, the stop processing is executed.

That is, even when the liquid discharging apparatus 1 of the first embodiment includes n liquid discharging modules 20, the stop processing is executed by the discharge control circuit 52, which is included in each of the n liquid discharging modules 20, outputting the head control signal DIo based on the discharge stop processing signal DIe2 for controlling the individually corresponding drive signal selection circuit 200 so as not to supply the drive signal COM to the corresponding discharging portion 600. As a result, even when the liquid discharging apparatus 1 of the first embodiment includes n liquid discharging modules 20, the discharge control circuits 52 included in each of the n liquid discharging modules 20 can execute the stop processing in parallel, and as a result, even when the number of nozzles included in the liquid discharging apparatus 1 is increased and the number of liquid discharging modules 20 included in the liquid discharging apparatus 1 is increased, the possibility that the operation delay or the like occurs in the main control circuit 14 and the head control circuit 110 can be reduced, and the stop processing in the liquid discharging apparatus 1 can be executed in a short time.

2. Second Embodiment

Next, a liquid discharging apparatus 1 of a second embodiment will be described. In the liquid discharging apparatus 1 of the second embodiment, a configuration of the discharge control circuit 52 included in the liquid discharging module 20 is different from that of the liquid discharging apparatus 1 of the first embodiment. In describing the liquid discharging apparatus 1 of the second embodiment, the same reference numerals are given to the same configurations as those of the liquid discharging apparatus 1 of the first embodiment, and the description thereof will be simplified or omitted.

Figure 25:
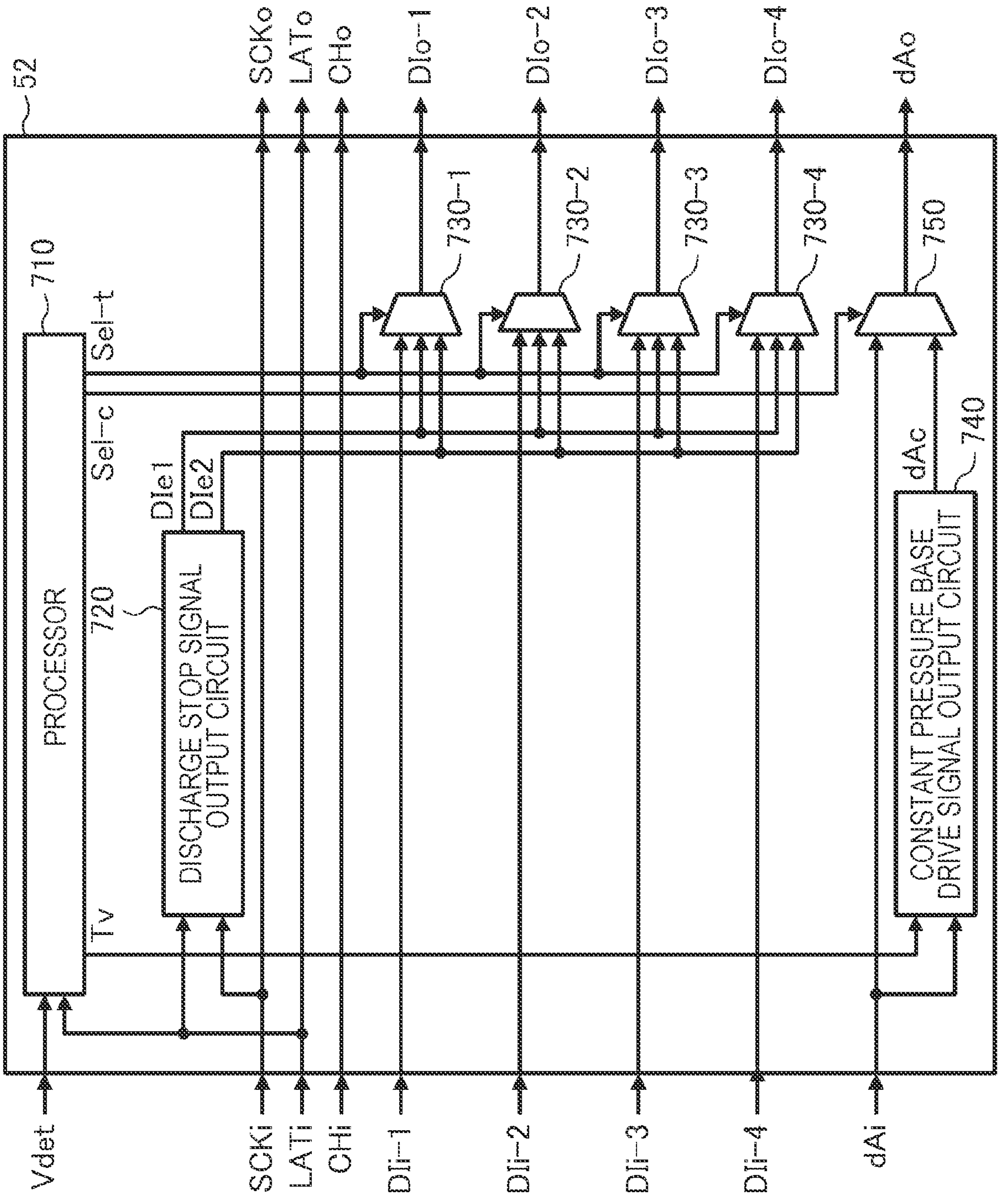
FIG. 25 is a diagram illustrating a configuration of a discharge control circuit according to a second embodiment.

FIG. 25 is a diagram illustrating a configuration of the discharge control circuit 52 according to the second embodiment. As illustrated in FIG. 25, the discharge control circuit 52 included in the liquid discharging apparatus 1 of the second embodiment further includes a constant pressure base drive signal output circuit 740 and a multiplexer 750 in addition to the configuration of the discharge control circuit 52 of the first embodiment.

In the liquid discharging apparatus 1 of the second embodiment, the voltage detection signal Vdet and the latch signal LATi are input to the processor 710 included in the discharge control circuit 52. Similar to the discharge control circuit 52 of the first embodiment, the processor 710 generates the signal selection signal Sel-t for controlling signal selection in each of the multiplexers 730-1 to 730-4 and outputs the signal selection signal Sel-t to corresponding multiplexers 730-1 to 730-4. Further, the processor 710 generates a signal selection signal Sel-c for controlling the signal selection in the multiplexer 750 based on the voltage detection signal Vdet and the latch signal LATi and outputs the signal selection signal Sel-c to the multiplexer 750 described later, and also generates an output voltage value control signal Tv for controlling a constant pressure base drive signal dAc, which is output by the constant pressure base drive signal output circuit 740 described later, and outputs the output voltage value control signal Tv to the constant pressure base drive signal output circuit 740.

Similar to the discharge control circuit 52 of the first embodiment, the discharge stop signal output circuit 720 generates discharge stop processing signals DIe1 and DIe2 synchronized with the clock signal SCKi for each cycle tp defined based on the latch signal LATi and outputs the discharge stop processing signals DIe1 and DIe2 to the multiplexers 730-1 to 730-4. Similar to the discharge control circuit 52 of the first embodiment, each of the multiplexers 730-1 to 730-4 selects any one of the corresponding head control signals DIi-1 to DIi-4, the discharge stop processing signal DIe1, and the discharge stop processing signal DIe2 in response to the input signal selection signal Sel-t, and outputs the selected signals as the head control signals DIo-1 to DIo-4.

The output voltage value control signal Tv and the base drive signal dAi are input to the constant pressure base drive signal output circuit 740. The constant pressure base drive signal output circuit 740 generates the constant pressure base drive signal dAc for controlling the drive signal output circuit 54 such that the voltage value of the drive signal COM is constant at the voltage value defined based on the output voltage value control signal Tv to be input, and outputs the constant pressure base drive signal dAc to the multiplexer 750.

Specifically, the constant pressure base drive signal output circuit 740 calculates the voltage value of the current drive signal COM based on the input base drive signal dAi. The constant pressure base drive signal output circuit 740 outputs the constant pressure base drive signal dAc in which the voltage value of the drive signal COM output by the drive signal output circuit 54 is gradually changed from the calculated current voltage value of the drive signal COM to the voltage value defined by the output voltage value control signal Tv. Thereafter, by making the voltage value of the drive signal COM output by the drive signal output circuit 54 to the voltage value defined by the output voltage value control signal Tv, the constant pressure base drive signal output circuit 740 generates and outputs the constant pressure base drive signal dAc in which the voltage value of the drive signal COM output by the drive signal output circuit 54 is constant at the voltage value defined by the output voltage value control signal Tv. That is, the discharge control circuit 52 includes the constant pressure base drive signal output circuit 740 that outputs the constant pressure base drive signal dAc for controlling the voltage value of the drive signal COM output from the drive signal output circuit 54 to a constant voltage value.

The base drive signal dAi input to the discharge control circuit 52, the constant pressure base drive signal dAc output by the constant pressure base drive signal output circuit 740, and the signal selection signal Sel-c output by the processor 710 are input to the multiplexer 750. The multiplexer 750 selects the base drive signal dAi and the constant pressure base drive signal dAc in response to the input signal selection signal Sel-c and outputs the base drive signal dAi and the constant pressure base drive signal dAc as the base drive signal dAo. That is, the discharge control circuit 52 includes the multiplexer 750 that receives the base drive signal dAi and the constant pressure base drive signal dAc and that selects whether to output the base drive signal dAi as the base drive signal dAo or to output the constant pressure base drive signal dAc as the base drive signal dAo.

The discharge control circuit 52 of the second embodiment configured as described above outputs the clock signal SCKi as the clock signal SCKo, outputs the latch signal LATi as the latch signal LATo, outputs the change signal CHo as the change signal CHo, selects any one of the head control signal DIi-1, the discharge stop processing signal DIe1, and the discharge stop processing signal DIe2 and outputs the selected signal as the head control signal DIo-1, selects any one of the head control signal DIi-2, the discharge stop processing signal DIe1, and the discharge stop processing signal DIe2 and outputs the selected signal as the head control signal DIo-2, selects any one of the head control signal DIi-3, the discharge stop processing signal DIe1, and the discharge stop processing signal DIe2 and outputs the selected signal as the head control signal DIo-3, selects any one of the head control signal DIi-4, the discharge stop processing signal DIe1, and the discharge stop processing signal DIe2 and outputs the selected signal as the head control signal DIo-4, and selects one of the base drive signal dAi and the constant pressure base drive signal dAc and outputs as the base drive signal dAo, based on a logic level of the voltage detection signal Vdet.

Figure 26:
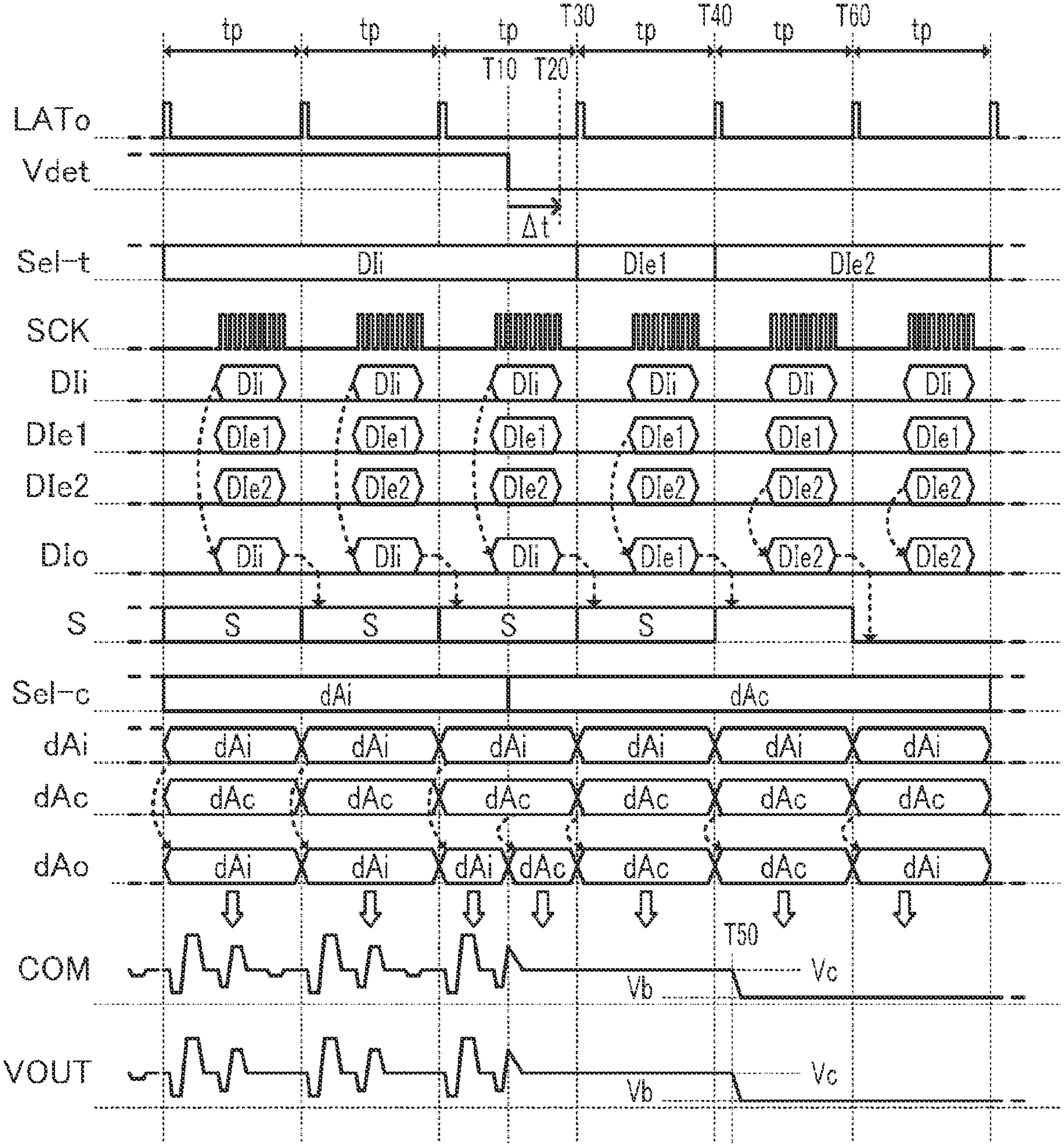
FIG. 26 is a diagram for describing a relationship between an operation of a liquid discharging apparatus and an operation of a multiplexer of the second embodiment.

Next, the operation of the discharge control circuit 52 in the second embodiment will be described in association with the operation of the liquid discharging apparatus 1. FIG. 26 is a diagram for describing a relationship between the operation of the liquid discharging apparatus 1 and the operation of the multiplexer 730 of the second embodiment.

As illustrated in FIG. 26, before the time T10, the voltage detection circuit 18 outputs the voltage detection signal Vdet with an H level. In this case, when the image data DATA is input to the liquid discharging apparatus 1 from the external apparatus, the liquid discharging apparatus 1 starts the image forming processing of forming an image in accordance with the image data DATA input to the medium P. Specifically, before the time T10, the voltage detection circuit 18 outputs the voltage detection signal Vdet with an H level. The voltage detection signal Vdet with an H level output by the voltage detection circuit 18 is input to at least the head control circuit 110 and the discharge control circuit 52.

The discharge control circuit 52 outputs the input head control signal DIi to the print head 30 as the head control signal DIo during the period before the time T10 when the voltage detection signal Vdet with an H level is input similar to the first embodiment.

Further, the discharge control circuit 52 outputs the input base drive signal dAi as the base drive signal dAo during the period before the time T10 when the voltage detection signal Vdet with an H level is input. Specifically, the voltage detection signal Vdet is input to the processor 710 included in the discharge control circuit 52. When the logic level of the input voltage detection signal Vdet is an H level, the processor 710 generates the signal selection signal Sel-c for selecting the base drive signal dAi as the base drive signal dAo and outputs the signal selection signal Sel-c to the multiplexer 750. As a result, the multiplexer 750 selects the base drive signal dAi as the base drive signal dAo and outputs the base drive signal dAi to the drive signal output circuit 54. As a result, the drive signal output circuit 54 generates a drive signal COM including the trapezoidal waveforms Adp, Bdp, and Cdp as illustrated in FIG. 11 during the period before the time T10 and outputs the drive signal COM to the print head 30.

That is, before the time T10 when the voltage detection circuit 18 outputs an H level voltage detection signal Vdet, a plurality of signals, which include the drive signal COM including the trapezoidal waveforms Adp, Bdp, and Cdp, and the head control signal DIo based on the head control signal DIi, are input to the print head 30. As a result, the drive signal selection circuit 200 included in the print head 30 generates the selection signal S corresponding to each of the plurality of discharging portions 600 in response to the head control signal DIo based on the input head control signal DIi, and outputs the selection signal S to the corresponding selection circuit 230. As a result, the drive signal selection circuit 200 outputs the drive signal VOUT corresponding to each of the plurality of discharging portions 600. As a result, the image in accordance with the image data DATA is formed on the medium P.

That is, when the logic level of the voltage detection signal Vdet is an H level, and when the voltage detection signal Vdet does not include information indicating an abnormality in the commercial voltage VAC, which is the power supply voltage supplied to the liquid discharging apparatus 1, the multiplexer 730 selects the head control signal DIi as the head control signal DIo, the discharge control circuit 52 outputs a head control signal DIo based on the head control signal DIi, the multiplexer 750 selects the base drive signal dAi as the base drive signal dAo, and the discharge control circuit 52 outputs the base drive signal dAi based on the base drive signal dAi.

At the time T10, when the supply of the commercial voltage VAC to the liquid discharging apparatus 1 is stopped or the voltage value of the commercial voltage VAC is decreased, the voltage detection circuit 18 sets the logic level of the voltage detection signal Vdet to an L level. As a result, the liquid discharging apparatus 1 starts the stop processing.

Specifically, at the time T10, the voltage detection circuit 18 generates the voltage detection signal Vdet with an L level and outputs the voltage detection signal Vdet to the head control circuit 110 and the discharge control circuit 52.

When the voltage detection signal Vdet with an L level is input, the discharge control circuit 52 outputs the constant pressure base drive signal dAc as the base drive signal dAo. Specifically, the voltage detection signal Vdet is input to the processor 710 included in the discharge control circuit 52. At the time T10 when the voltage detection signal Vdet with an L level is input, the processor 710 generates the output voltage value control signal Tv for the constant pressure base drive signal output circuit 740 to generate the constant pressure base drive signal dAc for controlling the voltage value of the drive signal COM to be constant at the voltage Vc, and outputs the output voltage value control signal Tv to the constant pressure base drive signal output circuit 740. Further, the processor 710 generates the signal selection signal Sel-c for selecting the constant pressure base drive signal dAc output by the constant pressure base drive signal output circuit 740 as the base drive signal dAo at the time T10 when the voltage detection signal Vdet with an L level is input, and outputs the signal selection signal Sel-c to the multiplexer 750. As a result, the multiplexer 750 selects the constant pressure base drive signal dAc for controlling the voltage value of the drive signal COM to be constant at the voltage Vc as the base drive signal dAo, and outputs the constant pressure base drive signal dAc to the drive signal output circuit 54. Therefore, the drive signal output circuit 54 outputs the drive signal COM of which the voltage value is constant at the voltage Vc to the print head 30. In this case, the constant pressure base drive signal dAc output by the constant pressure base drive signal output circuit 740, which is the base drive signal dAo output by the discharge control circuit 52, controls the drive signal output circuit 54 such that the voltage value of the drive signal COM is gradually changed toward the voltage Vc. That is, at the time T10, the voltage value of the drive signal COM output by the drive signal output circuit 54 is gradually changed toward the voltage Vc, and then is constant at the voltage Vc.

Further, similar to the first embodiment, after the voltage detection signal Vdet with an L level is input, and after time T20 at which a predetermined period Δt has elapsed, the discharge control circuit 52 outputs the discharge stop processing signal DIe1 as the head control signal DIo at time T30 when the latch signal LATo rises. Further, after the time T30, at time T40 when the latch signal LATo rises, the head control signals DIo based on the discharge stop processing signal DIe1 are latched all at once in the drive signal selection circuit 200 included in the print head 30. As a result, the drive signal selection circuit 200 generates the selection signal S for controlling all of the selection circuits 230 corresponding to each of the plurality of discharging portions 600 to be conductive in response to the head control signal DIo based on the discharge stop processing signal DIe1, and outputs the selection signal S to the corresponding selection circuit 230. As a result, at the time T40, the drive signal VOUT, which is based on the drive signal COM of which the voltage value is constant at the voltage Vc, is supplied to one electrode of the piezoelectric element 60 included in each of the plurality of discharging portions 600.

At the time T50 after all of the selection circuits 230 corresponding to each of the plurality of discharging portions 600 are controlled to be conductive, the processor 710 generates the output voltage value control signal Tv for the constant pressure base drive signal output circuit 740 to generate the constant pressure base drive signal dAc for controlling the voltage value of the drive signal COM to be constant at the voltage Vb, and outputs the output voltage value control signal Tv to the constant pressure base drive signal output circuit 740. Further, the processor 710 generates the signal selection signal Sel-c for selecting the constant pressure base drive signal dAc output by the constant pressure base drive signal output circuit 740 as the base drive signal dAo and outputs the signal selection signal Sel-c to the multiplexer 750. Therefore, the multiplexer 750 selects the constant pressure base drive signal dAc for controlling the voltage value of the drive signal COM to be constant at the voltage Vb as the base drive signal dAo, and outputs the constant pressure base drive signal dAc to the drive signal output circuit 54. As a result, the drive signal output circuit 54 outputs the drive signal COM of which the voltage value is constant at the voltage Vb. In this case, the constant pressure base drive signal dAc output by the constant pressure base drive signal output circuit 740, which is the base drive signal dAo output by the discharge control circuit 52, controls the drive signal output circuit 54 such that the voltage value of the drive signal COM is gradually changed toward the voltage Vb. Therefore, the voltage value of the drive signal COM output by the drive signal output circuit 54 is gradually changed from the voltage Vc toward the voltage Vb, and then is constant at the voltage Vb.

Here, at the time T40 when the voltage value of the drive signal COM is gradually changed from the voltage Vc toward the voltage Vb, similar to the first embodiment, all of the selection circuits 230 corresponding to each of the plurality of discharging portions 600 are controlled to be conductive. Therefore, at the time T50, when the voltage value of the drive signal COM is gradually changed from the voltage Vc toward the voltage Vb, the voltage value of one end of the piezoelectric element 60 included in each of the plurality of discharging portions 600 is also gradually changed from the voltage Vc to the voltage Vb, and the voltage value of one end of the piezoelectric element 60 included in each of the plurality of discharging portions 600 is constant at the voltage Vb. In this case, a reference voltage signal VBS is supplied to the other end of the piezoelectric element 60 included in each of the plurality of discharging portions 600. That is, at the time T50, the voltage value of the electrode 611 of the piezoelectric element 60 is changed to approach the voltage value of the electrode 612 of the piezoelectric element 60.

Further, similar to the first embodiment, at the time T40, the discharge control circuit 52 outputs the discharge stop processing signal DIe2 as the head control signal DIo. As a result, the multiplexer 730 selects the discharge stop processing signal DIe2 as the head control signal DIo and outputs the discharge stop processing signal DIe2 to the print head 30. After the time T40 and the time T50, at time T60 when the latch signal LATo rises, the head control signals DIo based on the discharge stop processing signal DIe2 are latched all at once in the drive signal selection circuit 200 included in the print head 30, and all of the selection circuits 230 corresponding to each of the plurality of discharging portions 600 are controlled to be non-conductive. That is, the drive signal selection circuit 200 is controlled so as not to supply the drive signal VOUT based on the drive signal COM to the plurality of discharging portions 600, and one electrode of the piezoelectric element 60 included in each of the plurality of discharging portions 600 stores the voltage Vb, which is the immediately preceding voltage value.

That is, in the liquid discharging apparatus 1 of the second embodiment, when the logic level of the voltage detection signal Vdet is an L level, and when the voltage detection signal Vdet includes the information indicating an abnormality in the commercial voltage VAC, which is the power supply voltage supplied to the liquid discharging apparatus 1, the multiplexer 730 selects the discharge stop processing signal DIe2 as the head control signal DIo, the discharge control circuit 52 outputs the head control signal DIo based on the discharge stop processing signal DIe2 for controlling the drive signal selection circuit 200 not to supply the drive signal COM to the corresponding discharging portion 600, the multiplexer 750 selects the constant pressure base drive signal dAc for causing the drive signal output circuit 54 to output the drive signal COM having the constant voltage value as the base drive signal dAo, and the discharge control circuit 52 outputs a base drive signal dAo based on the constant pressure base drive signal dAc for causing the drive signal output circuit 54 to output the drive signal COM having the constant voltage value.

In the liquid discharging apparatus 1 of the second embodiment that is operated as described above, when the supply of the commercial voltage VAC, which is the power supply voltage to the liquid discharging apparatus 1, is stopped, the discharge control circuit 52 controls the selection circuit 230 of the drive signal selection circuit 200 to be non-conductive regardless of the control of the main control circuit 14 and head control circuit 110, and the output of the drive signal COM including the trapezoidal waveforms Adp, Bdp, and Cdp is stopped from the drive signal output circuit 54.

That is, when the logic level of the voltage detection signal Vdet, which is input to the discharge control circuit 52 included in the liquid discharging module 20-1, is an H level, and when the voltage detection signal Vdet does not include the information indicating an abnormality in the commercial voltage VAC, which is the power supply voltage supplied to the liquid discharging apparatus 1, the multiplexer 730, which is included in the discharge control circuit 52 included in the liquid discharging module 20-1, selects the head control signal DIi1 as the head control signal DIo1, the discharge control circuit 52, which is included in the liquid discharging module 20-1, outputs a head control signal DIo1 based on the head control signal DIi1, the multiplexer 750, which is included in the discharge control circuit 52 included in the liquid discharging module 20-1, selects the base drive signal dAi1 as the base drive signal dAo1, and the discharge control circuit 52 outputs the base drive signal dAo1 based on the base drive signal dAi1.

On the other hand, when the logic level of the voltage detection signal Vdet, which is input to the discharge control circuit 52 included in the liquid discharging module 20-1, is an L level, and when the voltage detection signal Vdet includes the information indicating an abnormality in the commercial voltage VAC, which is the power supply voltage supplied to the liquid discharging apparatus 1, the multiplexer 730, which is included in the discharge control circuit 52 included in the liquid discharging module 20-1, selects the discharge stop processing signal DIe2 as the head control signal DIo1, the discharge control circuit 52, which is included in the liquid discharging module 20-1, outputs the head control signal DIo1 based on the discharge stop processing signal DIe2 for controlling the drive signal selection circuit 200 not to supply the drive signal COM1 to the corresponding discharging portion 600, the multiplexer 750, which is included in the discharge control circuit 52 included in the liquid discharging module 20-1, selects the constant pressure base drive signal dAc for causing the drive signal output circuit 54 to output the drive signal COM1 having the constant voltage value as the base drive signal dAo1, and the discharge control circuit 52 outputs a base drive signal dAo1 based on the constant pressure base drive signal dAc for causing the drive signal output circuit 54 to output the drive signal COM1 having the constant voltage value.

Further, when the logic level of the voltage detection signal Vdet, which is input to the discharge control circuit 52 included in the liquid discharging module **20-*n*, is an H level, and when the voltage detection signal Vdet does not include the information indicating an abnormality in the commercial voltage VAC, which is the power supply voltage supplied to the liquid discharging apparatus 1, the multiplexer 730, which is included in the discharge control circuit 52 included in the liquid discharging module 20-*n*, selects the head control signal DIin as the head control signal DIon, the discharge control circuit 52, which is included in the liquid discharging module 20-*n*, outputs a head control signal DIon based on the head control signal DIin, the multiplexer 750, which is included in the discharge control circuit 52 included in the liquid discharging module 20-*n*, selects the base drive signal dAin as the base drive signal dAon, and the discharge control circuit 52** outputs the base drive signal dAon based on the base drive signal dAin.

On the other hand, when the logic level of the voltage detection signal Vdet, which is input to the discharge control circuit 52 included in the liquid discharging module **20-*n*, is an L level, and when the voltage detection signal Vdet includes the information indicating an abnormality in the commercial voltage VAC, which is the power supply voltage supplied to the liquid discharging apparatus 1, the multiplexer 730, which is included in the discharge control circuit 52 included in the liquid discharging module 20-*n*, selects the discharge stop processing signal DIe2 as the head control signal DIon, the discharge control circuit 52, which is included in the liquid discharging module 20-*n*, outputs the head control signal DIon based on the discharge stop processing signal DIe2 for controlling the drive signal selection circuit 200 not to supply the drive signal COMn to the corresponding discharging portion 600, the multiplexer 750, which is included in the discharge control circuit 52 included in the liquid discharging module 20-*n*, selects the constant pressure base drive signal dAc for causing the drive signal output circuit 54 to output the drive signal COMn having the constant voltage value as the base drive signal dAon, and the discharge control circuit 52 outputs a base drive signal dAon based on the constant pressure base drive signal dAc for causing the drive signal output circuit 54** to output the drive signal COMn having the constant voltage value.

In the liquid discharging apparatus 1 of the second embodiment configured as above, when the liquid discharging apparatus 1 executes the stop processing, the discharge control circuit 52 included in the liquid discharging module 20 is also responsible for controlling the voltage value of the drive signal COM output by the drive signal output circuit 54. As a result, the processing loads of the main control circuit 14, which controls the entire operation of the liquid discharging apparatus 1, and the head control circuit 110 are further reduced. As a result, even when the number of nozzles included in the liquid discharging apparatus 1 is increased, the possibility that the operation delay or the like occurs in the main control circuit 14 and the head control circuit 110 can be further reduced, and the stop processing in the liquid discharging apparatus 1 can be executed in a shorter time.

Here, the constant pressure base drive signal output circuit 740 included in the discharge control circuit 52 of the second embodiment is an example of a constant voltage base drive signal output circuit, the multiplexer 750 is an example of a base drive signal selection circuit, the constant pressure base drive signal dAc output by the constant pressure base drive signal output circuit 740 is an example of a constant voltage base drive signal.

The embodiments and the modification examples were described above, but the present disclosure is not limited to the embodiments, and can be implemented in various aspects without departing from the gist thereof. For example, the above embodiments can be combined as appropriate.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. Further, the present disclosure includes configurations that achieve the same operational effects or configurations that can achieve the same objects as those of the configurations described in the embodiment. The present disclosure includes a configuration in which a well-known technique is added to the configuration described in the embodiment.

The following contents are derived from the above-described embodiment.

In an aspect of a liquid discharging apparatus, there is provided a liquid discharging apparatus that discharges liquid on a medium including: a first control circuit outputting a first discharge control signal, a first base drive signal, and a transport control signal for controlling transport of the medium; a second control circuit receiving the first discharge control signal, the first base drive signal, and a state information signal indicating a state of the liquid discharging apparatus, and outputting a second discharge control signal and a second base drive signal; a first drive circuit outputting a first drive signal based on the second base drive signal; a first substrate provided with the first control circuit; a second substrate provided with the second control circuit and the first drive circuit; and a first discharging head including a first discharging portion that discharges liquid in response to the first drive signal and a first switching circuit that switches whether or not to supply the first drive signal to the first discharging portion based on the second discharge control signal, in which when the state information signal does not include information indicating an abnormality in the state, the second control circuit outputs the second discharge control signal based on the first discharge control signal, and when the state information signal includes the information indicating an abnormality in the state, the second control circuit outputs the second discharge control signal for controlling the first switching circuit not to supply the first drive signal to the first discharging portion.

According to the liquid discharging apparatus, the liquid discharging apparatus includes the second control circuit independent of the first control circuit that controls transport of the medium, and when the state information signal includes the information indicating an abnormality in the state, the second control circuit outputs the second discharge control signal for controlling the first switching circuit not to supply the first drive signal to the first discharging portion. As a result, the second control circuit can execute the stop processing of the liquid discharging apparatus 1 regardless of the first control circuit. That is, the stop processing in the liquid discharging apparatus is distributed to the first control circuit and the second control circuit. As a result, the load of the stop processing in the first control circuit is reduced and the possibility of the occurrence of problems such as a delay in an operation of the liquid discharging apparatus and an inability to complete the corresponding processing within predetermined time is reduced even when the number of nozzles included in the liquid discharging apparatus is increased.

In an aspect of the liquid discharging apparatus, the state information signal may include information on a voltage value of a power supply voltage, which is supplied to the liquid discharging apparatus, as information indicating the state.

When the supply of the power supply voltage is stopped, it is required that the stop processing is completed in a particularly short time.

According to the liquid discharging apparatus, the load of the stop processing in the first control circuit can be reduced, the possibility of the occurrence of problems such as a delay in an operation of the liquid discharging apparatus and an inability to complete the corresponding processing within predetermined time can be reduced even when the number of nozzles included in the liquid discharging apparatus is increased, and the stop processing can be completed in a short time based on a charge stored by the power supply voltage even when the supply of the power supply voltage is stopped.

In an aspect of the liquid discharging apparatus, the second substrate and the first discharging head may be electrically coupled with a B-to-B connector.

According to the liquid discharging apparatus, since the second substrate and the first discharging head are electrically coupled with the B-to-B connector, the second discharge control signal and the second base drive signal, which are output by the second control circuit provided on the second substrate to the first discharging head, and the first drive signal, which is output by the first drive circuit to the first discharging head, are input to the first discharging head without going through a cable. As a result, the possibility that the influence of the impedance generated in the cable contributes to the second discharge control signal, the second base drive signal, and the first drive signal, which are input to the first discharging head, is reduced, and the signal accuracy of the second discharge control signal, the second base drive signal, and the first drive signal, which are input to the first discharging head, is improved. As a result, the discharge accuracy of the ink discharged from the first discharging head is improved.

In an aspect of the liquid discharging apparatus, the first substrate and the second substrate may be electrically coupled via a flexible flat cable.

In an aspect of the liquid discharging apparatus, the second control circuit may include a non-discharge signal output circuit that outputs a non-discharge control signal for controlling the first switching circuit not to supply the first drive signal to the first discharging portion, and a discharge control signal selection circuit that receives the first discharge control signal and the non-discharge control signal and that selects whether to output the first discharge control signal as the second discharge control signal or to output the non-discharge control signal as the second discharge control signal, when the state information signal does not include the information indicating an abnormality in the state, the discharge control signal selection circuit may select the first discharge control signal as the second discharge control signal, and when the state information signal includes the information indicating an abnormality in the state, the discharge control signal selection circuit may select the non-discharge control signal as the second discharge control signal.

According to the liquid discharging apparatus, it is possible to selectively control whether the first discharge control signal is output as the second discharge control signal or the non-discharge control signal is output as the second discharge control signal, and it is possible to reliably execute the stop processing.

In an aspect of the liquid discharging apparatus, when the state information signal does not include the information indicating an abnormality in the state, the second control circuit may output the second base drive signal based on the first base drive signal, and when the state information signal includes the information indicating an abnormality in the state, the second control circuit may output the second base drive signal for causing the first drive circuit to output the first drive signal having a constant voltage value.

According to the liquid discharging apparatus, since the second control circuit is also responsible for executing the stop processing of the first drive signal, the load of the stop processing in the first control circuit is further reduced and the possibility of the occurrence of problems such as a delay in an operation of the liquid discharging apparatus and an inability to complete the corresponding processing within predetermined time is further reduced even when the number of nozzles included in the liquid discharging apparatus is increased.

In an aspect of the liquid discharging apparatus, the second control circuit may include a constant voltage base drive signal output circuit that outputs a constant voltage base drive signal for controlling a voltage value of the first drive signal, which is output from the first drive circuit, to be a constant voltage value, and a base drive signal selection circuit that receives the first base drive signal and the constant voltage base drive signal and that selects whether to output the first base drive signal as the second base drive signal or to output the constant voltage base drive signal as the second base drive signal, when the state information signal does not include the information indicating an abnormality in the state, the base drive signal selection circuit may select the first base drive signal as the second base drive signal, and when the state information signal includes the information indicating an abnormality in the state, the base drive signal selection circuit may select the constant voltage base drive signal as the second base drive signal.

According to the liquid discharging apparatus, it is possible to selectively control whether the first base drive signal is output as the second base drive signal or the constant voltage base drive signal is output as the second base drive signal, and it is possible to reliably execute the stop processing.

In an aspect of the liquid discharging apparatus, the first control circuit may output a third discharge control signal and a third base drive signal, the liquid discharging apparatus may further include: a third control circuit receiving the third discharge control signal, the third base drive signal, and the state information signal, and outputting a fourth discharge control signal and a fourth base drive signal; a second drive circuit outputting a second drive signal based on the fourth base drive signal; a third substrate provided with the third control circuit and the second drive circuit; and a second discharging head including a second discharging portion that discharges liquid in response to the second drive signal and a second switching circuit that switches whether or not to supply the second drive signal to the second discharging portion based on the fourth discharge control signal, when the state information signal does not include the information indicating an abnormality in the state, the third control circuit may output the fourth discharge control signal based on the third discharge control signal, and when the state information signal includes the information indicating an abnormality in the state, the third control circuit may output the fourth discharge control signal for controlling the second switching circuit not to supply the second drive signal to the second discharging portion.

According to the liquid discharging apparatus, even when the second discharging head is further provided, since the third control circuit corresponding to the second discharging head is included, and the third control circuit is responsible for a part of the stop processing of the second discharging head, the stop processing of the first discharging head and the stop processing of the second discharging head can be executed in parallel, and the load of the stop processing on the first control circuit is further reduced. As a result, the possibility of the occurrence of problems such as a delay in an operation of the liquid discharging apparatus and an inability to complete the corresponding processing within predetermined time is further reduced even when the number of nozzles included in the liquid discharging apparatus is increased.

In an aspect of the liquid discharging apparatus, when the state information signal does not include the information indicating an abnormality in the state, the third control circuit may output the fourth base drive signal based on the third base drive signal, and when the state information signal includes the information indicating an abnormality in the state, the third control circuit may output the fourth base drive signal for causing the second drive circuit to output the second drive signal having a constant voltage value.

According to the liquid discharging apparatus, even when the second discharging head is further provided, since the third control circuit corresponding to the second discharging head is included, and the third control circuit is responsible for a part of the stop processing of the second discharging head, the stop processing of the first discharging head and the stop processing of the second discharging head can be executed in parallel, and the load of the stop processing on the first control circuit is further reduced. As a result, the possibility of the occurrence of problems such as a delay in an operation of the liquid discharging apparatus and an inability to complete the corresponding processing within predetermined time is further reduced even when the number of nozzles included in the liquid discharging apparatus is increased.

What is claimed is:

1. A liquid discharging apparatus that is configured to discharge liquid on a medium comprising: a first control circuit configured to output a first discharge control signal, a first base drive signal, and a transport control signal for controlling transport of the medium; a second control circuit configured to receive the first discharge control signal, the first base drive signal, and a state information signal indicating a state of the liquid discharging apparatus, and configured to output a second discharge control signal and a second base drive signal; a first drive circuit configured to output a first drive signal based on the second base drive signal; a first substrate provided with the first control circuit; a second substrate provided with the second control circuit and the first drive circuit; and a first discharging head including a first discharging portion that is configured to discharge liquid in response to the first drive signal and a first switching circuit that is configured to switch whether or not to supply the first drive signal to the first discharging portion based on the second discharge control signal, wherein when the state information signal does not include information indicating an abnormality in the state, the second control circuit is configured to output the second discharge control signal based on the first discharge control signal, and when the state information signal includes the information indicating an abnormality in the state, the second control circuit is configured to output the second discharge control signal for controlling the first switching circuit not to supply the first drive signal to the first discharging portion.

2. The liquid discharging apparatus according to claim 1, wherein the state information signal includes information on a voltage value of a power supply voltage, which is supplied to the liquid discharging apparatus, as information indicating the state.

3. The liquid discharging apparatus according to claim 1, wherein the second substrate and the first discharging head are electrically coupled with a B-to-B connector.

4. The liquid discharging apparatus according to claim 3, wherein the first substrate and the second substrate are electrically coupled via a flexible flat cable.

5. The liquid discharging apparatus according to claim 1, wherein the second control circuit includes a non-discharge signal output circuit that is configured to output a non-discharge control signal for controlling the first switching circuit not to supply the first drive signal to the first discharging portion, and a discharge control signal selection circuit that is configured to receive the first discharge control signal and the non-discharge control signal and that selects whether to output the first discharge control signal as the second discharge control signal or to output the non-discharge control signal as the second discharge control signal, when the state information signal does not include the information indicating an abnormality in the state, the discharge control signal selection circuit is configured to select the first discharge control signal as the second discharge control signal, and when the state information signal includes the information indicating an abnormality in the state, the discharge control signal selection circuit is configured to select the non-discharge control signal as the second discharge control signal.

6. The liquid discharging apparatus according to claim 1, wherein when the state information signal does not include the information indicating an abnormality in the state, the second control circuit is configured to output the second base drive signal based on the first base drive signal, and when the state information signal includes the information indicating an abnormality in the state, the second control circuit is configured to output the second base drive signal for causing the first drive circuit to output the first drive signal having a constant voltage value.

7. The liquid discharging apparatus according to claim 6, wherein the second control circuit includes a constant voltage base drive signal output circuit that is configured to output a constant voltage base drive signal for controlling a voltage value of the first drive signal, which is output from the first drive circuit, to be a constant voltage value, and a base drive signal selection circuit that is configured to receive the first base drive signal and the constant voltage base drive signal and that is configured to select whether to output the first base drive signal as the second base drive signal or to output the constant voltage base drive signal as the second base drive signal, when the state information signal does not include the information indicating an abnormality in the state, the base drive signal selection circuit is configured to select the first base drive signal as the second base drive signal, and when the state information signal includes the information indicating an abnormality in the state, the base drive signal selection circuit is configured to select the constant voltage base drive signal as the second base drive signal.

8. The liquid discharging apparatus according to claim 1, wherein the first control circuit is configured to output a third discharge control signal and a third base drive signal, the liquid discharging apparatus further comprises: a third control circuit configured to receive the third discharge control signal, the third base drive signal, and the state information signal, and configured to output a fourth discharge control signal and a fourth base drive signal; a second drive circuit configured to output a second drive signal based on the fourth base drive signal; a third substrate provided with the third control circuit and the second drive circuit; and a second discharging head including a second discharging portion that is configured to discharge liquid in response to the second drive signal and a second switching circuit that is configured to switch whether or not to supply the second drive signal to the second discharging portion based on the fourth discharge control signal, when the state information signal does not include the information indicating an abnormality in the state, the third control circuit is configured to output the fourth discharge control signal based on the third discharge control signal, and when the state information signal includes the information indicating an abnormality in the state, the third control circuit is configured to output the fourth discharge control signal for controlling the second switching circuit not to supply the second drive signal to the second discharging portion.

9. The liquid discharging apparatus according to claim 8, wherein when the state information signal does not include the information indicating an abnormality in the state, the third control circuit is configured to output the fourth base drive signal based on the third base drive signal, and when the state information signal includes the information indicating an abnormality in the state, the third control circuit is configured to output the fourth base drive signal for causing the second drive circuit to output the second drive signal having a constant voltage value.

* * * * *